(12) United States Patent
Esenlik et al.

(10) Patent No.: US 11,343,533 B2
(45) Date of Patent: May 24, 2022

(54) CODING METHOD, DEVICE, SYSTEM WITH MERGE MODE

(71) Applicant: Huawei Technologies Co., Ltd., Shenzhen (CN)

(72) Inventors: Semih Esenlik, Munich (DE); Han Gao, Munich (DE); Jianle Chen, San Diego, CA (US); Anand Meher Kotra, Munich (DE); Biao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/190,025

(22) Filed: Mar. 2, 2021

(65) Prior Publication Data

US 2021/0203980 A1 Jul. 1, 2021

Related U.S. Application Data

(63) Continuation of application No. PCT/CN2019/103145, filed on Aug. 28, 2019.
(Continued)

(51) Int. Cl.
*H04N 19/56* (2014.01)
*H04N 19/105* (2014.01)
(Continued)

(52) U.S. Cl.
CPC ........... *H04N 19/56* (2014.11); *H04N 19/105* (2014.11); *H04N 19/109* (2014.11); *H04N 19/176* (2014.11); *H04N 19/96* (2014.11)

(58) Field of Classification Search
None
See application file for complete search history.

(56) References Cited

U.S. PATENT DOCUMENTS

2013/0128978 A1* 5/2013 Yie ..................... H04N 19/137
375/240.16
2013/0208799 A1 8/2013 Srinivasamurthy et al.
(Continued)

FOREIGN PATENT DOCUMENTS

CN 102685477 A 9/2012
CN 104349170 A 2/2015
(Continued)

OTHER PUBLICATIONS

Huawei Technologies, "CE4: Parallel Merge Estimation for VVC (CE4.3.2)," JVET-M0289, Joint Video Experts Team (JVET) of ITU-T SG 16 WP 3 and ISO/IEC JTC 1/SC 29/WG11, 13th Meeting: Marrakech, MA, Jan. 9-18, 2019, 11 pages.
(Continued)

*Primary Examiner* — Chikaodili E Anyikire
(74) *Attorney, Agent, or Firm* — Conley Rose, P.C.

(57) ABSTRACT

An apparatus and method for marking availability of a candidate coding block for merge estimation of a current coding block within a coding tree unit (CTU). The candidate block may be marked as unavailable if a splitting depth of the current coding block is equal to or larger than a predetermined threshold and a first location of the candidate block and a second location of the current block are included in a same merge estimation region (MER). Otherwise, the candidate block is marked as available. A candidate block may be marked as unavailable also, when a parent block "parentCurr" of the current block and a parent block "parentCand" of the candidate block, with both parent blocks obtained by splitting, are the same block and when the size of the parentCand is smaller than a threshold.

20 Claims, 19 Drawing Sheets

Related U.S. Application Data

(60) Provisional application No. 62/757,720, filed on Nov. 8, 2018, provisional application No. 62/726,973, filed on Sep. 4, 2018, provisional application No. 62/726,424, filed on Sep. 3, 2018.

(51) Int. Cl.
*H04N 19/109* (2014.01)
*H04N 19/176* (2014.01)
*H04N 19/96* (2014.01)

(56) References Cited

U.S. PATENT DOCUMENTS

| | | |
|---|---|---|
| 2013/0242046 A1 | 9/2013 | Zhang et al. |
| 2013/0279595 A1 | 10/2013 | Lee et al. |
| 2014/0192883 A1 | 7/2014 | Seregin |
| 2014/0301470 A1 | 10/2014 | Yie et al. |
| 2019/0182491 A1* | 6/2019 | Lee .................. H04N 19/51 |
| 2020/0045306 A1* | 2/2020 | Lee .................. H04N 19/51 |
| 2020/0059659 A1* | 2/2020 | Chen .................. H04N 19/56 |
| 2020/0204812 A1* | 6/2020 | Wang ................ H04N 19/172 |

FOREIGN PATENT DOCUMENTS

| | | |
|---|---|---|
| EP | 3496400 A1 | 6/2019 |
| EP | 3837841 A1 | 6/2021 |
| WO | 2018026222 A1 | 2/2018 |
| WO | 2020048366 A1 | 3/2020 |

OTHER PUBLICATIONS

SZ DJI Technology Co., Ltd., Peking University, CE4-related: Quadtree-based Merge Estimation Region for VVC, JVET-M0350_v2, Joint Video Experts Team (JVET) of ITU-T SG 16 WP 3 and ISO/IECJTC 1/SC 29/WG11, 13th Meeting: Marrakech, MA, Jan. 9-18, 2019, 5 pages.

Sze, V., et al., "5.2.2 Inter-picture Prediction Block Merging, In High Efficiency Video Coding (HEVC), Algorithms and Architectures," 2014, 384 pages.

Bross, B., et al., "Chapter 5 Inter-Picture Prediction in HEVC, In High Efficiency Video Coding (HEVC), Algorithms and Architectures," 2014, 384 page.

Zhang, L., et al., "CE4-related: History-based Motion Vector Prediction," Joint Video Experts Team (JVET) of ITU-T SG 16 WP 3 and ISO/IEC JTC 1/SC 29/WG 11, 11th Meeting: Ljubljana, SI, Jul. 10-18, 2018, JVET-K0104v5, 7 pages.

ITU-T H.223, "H: Audiovisual and Multimedia Systems, Infrastructure of audiovisual services—Transmission multiplexing and synchronization, Multiplexing protocol for low bit rate multimedia communication," Jul. 2001, 74 pages.

ITU-T H.263, "Series H: Audiovisual and Multimedia Systems, Infrastructure of audiovisual services—Coding of moving video, Video coding for low bit rate communication," Jan. 2005, 226 pages.

ITU-T H.264, "Series H: Audiovisual and Multimedia Systems, Infrastructure of audiovisual services—Coding of moving video, Advanced video coding for generic audiovisual services," Apr. 2017, 812 pages.

ITU-T H.265, "Series H: Audiovisual and Multimedia Systems, Infrastructure of audiovisual services—Coding of moving video High efficiency video coding," Feb. 2018, 692 pages.

* cited by examiner

CODING METHOD, DEVICE, SYSTEM WITH MERGE MODE

CROSS-REFERENCE TO RELATED APPLICATIONS

This application is a continuation of International Patent Application No. PCT/CN2019/103145 filed on Aug. 28, 2019, which claims priority from U.S. Provisional Application No. 62/726,424 filed on Sep. 3, 2018, U.S. Provisional Application No. 62/726,973 filed on Sep. 4, 2018, and U.S. Provisional Application No. 62/757,720 filed on Nov. 8, 2018, all of which are hereby incorporated by reference in their entireties.

TECHNICAL FIELD

The embodiments of the present application (disclosure) generally relates to the field of video coding and more particularly to the field of inter-prediction with merge mode.

BACKGROUND

The amount of video data needed to depict even a relatively short video can be substantial, which may result in difficulties when the data is to be streamed or otherwise communicated across a communications network with limited bandwidth capacity. Thus, video data is generally compressed before being communicated across modern day telecommunications networks. The size of a video could also be an issue when the video is stored on a storage device because memory resources may be limited. Video compression devices often use software and/or hardware at the source to code the video data prior to transmission or storage, thereby decreasing the quantity of data needed to represent digital video images. The compressed data is then received at the destination by a video decompression device that decodes the video data. With limited network resources and ever increasing demands of higher video quality, improved compression and decompression techniques that improve compression ratio with little to no sacrifice in image quality are desirable. High Efficiency Video Coding (HEVC) is the latest video compression issued by International Organization for Standardization (ISO)/International Electrotechnical Commission (IEC) Moving Picture Experts Group (MPEG) and International Telecommunication Union-Telecommunication Standardization Sector (ITU-T) Video Coding Experts Group as ISO/IEC 23008-2 MPEG-H Part 2 or called ITU-T H.265, and offers about double the data compression ratio at the same level of video quality, or substantially improved video quality at the same bit rate. Several coding tools were developed and adopted by HEVC, and one of them is merge mode that is used in the inter-prediction to estimate a proper motion vector (MV) for current prediction block from spatial or temporal candidate blocks. Specifically, the merge mode in HEVC is composed of 2 parts.

First Part.

Merge list construction which includes (for a current block to be predicted) (1) inserting motion information of spatial candidates up to four candidates are inserted in the merge list by sequentially checking candidate A1 (at the bottom of the left boundary of the current block), B1 (on the right side of the top boundary), B0 (diagonally adjacent at the top right), A0 (diagonally adjacent at the bottom left), and B2 (diagonally adjacent at the top left), (2) one temporal merge candidate is derived from two temporal, co-located blocks, (3) additional merge candidates including combined bi-predictive candidates, and (4) zero motion vector candidates (MVCs).

Second Part.

Index signaling, one entry that in the merge list is selected as the motion information of the current block and signaled to a decoding side to deriving the MV of current prediction block correspondingly.

A parallel merge estimation level was introduced in HEVC that indicates the region in which merge candidate lists can be independently derived by checking whether a candidate block is located in that merge estimation region (MER). A candidate block that is in the same MER is not included in the merge candidate list. Hence, its motion data does not need to be available at the time of the list construction. When this level is e.g. 32, all prediction units (PUs) in a 32×32 area can construct the merge candidate list in parallel since all merge candidates that are in the same 32×32 MER, are not inserted in the list.

As shown in FIG. 6, there is a coding tree unit (CTU) partitioning with seven coding units (CUs) (square) and ten PUs (square or rectangular). All potential merge candidates for the first PU0 are available because they are outside the first 32×32 MER. For the second MER, merge candidate lists of PUs 2-6 cannot include motion data from these PUs when the merge estimation inside that MER should be independent. Therefore, when looking at a PU5 for example, no merge candidates are available and hence not inserted in the merge candidate list. In that case, the merge list of PU5 consists only of the temporal candidate (if available) and zero MV candidates. In order to enable an encoder to trade-off parallelism and coding efficiency, the parallel merge estimation level is adaptive and signaled as log 2_parallel_merge_level_minus2 in the picture parameter set.

In HEVC quad tree (QT) partitions are used, that always result in partitions that satisfy one of the following conditions (where N is 4, 8, 16, 32 or 64). All of the samples of a coding block are contained in an N×N region. All of the samples of an N×N region are contained in a coding block. However, in the newest developing of Versatile Video Coding (VVC), those conditions the merge mode relays on are not always satisfied because new partitions patterns are used, for instance, Binary-Tree (BT) and Triple-Tree (TT) partitions are allowed with which non-square partition is allowed, and the checking of whether a candidate block belongs to a MER is not accurately applicable anymore and the coding performance is degenerated, especially the parallel processing the merge estimation will be severely impacted.

SUMMARY

Embodiments of the disclosure are defined by the features of the independent claims, and further advantageous implementations of the embodiments by the features of the dependent claims.

Throughout the present disclosure, the terms candidate block, potential candidate block, candidate coding block, potential candidate prediction block and potential candidate coding block are used synonymously. Similar applies for the terms current block, current prediction block, and current coding block. Similar applies for the terms CTU and coding tree block (CTB). In particular, the terms CTU and CTB are used synonymously in the present disclosure.

Embodiments of the present application (or the present disclosure) provide inter prediction apparatuses and methods for encoding and decoding an image which can mitigate even eliminate the problem mentioned above.

According to an aspect of the present disclosure, an apparatus is provided for marking availability of a candidate coding block for merge estimation of a current coding block within a CTU, wherein the apparatus comprises a processing circuitry configured to mark the candidate coding block as unavailable, when a splitting depth of the current coding block is equal to or larger than a predetermined threshold, and a first location of the candidate coding block and when a second location of the current coding block are included within a same MER, and mark the candidate coding block as available otherwise.

The otherwise marking the candidate block as available means that if one or more MER condition(s) for marking the candidate block as unavailable are not fulfilled, the candidate block is marked as available. The respective available-marked candidate block may then be used for prediction of the current block.

Instead of making the available-marking of a candidate block an integral part of the conditions (here worded in terms of "otherwise"), a candidate block may alternatively be marked as available (e.g. by default) before applying the MER conditions for the marking the candidate block as unavailable.

According to an aspect of the present disclosure, the splitting depth corresponds to a QT partition depth, cqtDepth, of the current coding block.

This may provide an advantage of performing merge estimation for a candidate block even if a CTU is partitioned into irregular patterns (non-square coding blocks) as result of using BT and/or TT, so that a candidate block may be processed in parallel when marked as unavailable. Further, the use of splitting depth of the current block combined with testing of first and second locations being in a same MER, may provide an advantage of improving the accuracy of the merge estimation, in particular when QT is mixed with BT and/or TT partitioning (mixed splitting).

According to an aspect of the present disclosure, whether a width and a height of the MER belonging to a fixed MER grid are determined by MER-width=(width of CTU)/2qtDepthThr, and MER-height=(height of CTU)/2qtDepthThr, wherein qtDepthThr corresponds to the threshold.

The fixed MER grid refers to a grid along the x and y direction of the CTU, where the grid length (i.e. the grid spacing) may be defined in terms of the width and height of the MER. This means that an area (given in terms of the number of pixels) of the MER is determined by MER-width and MER-height. As implied be the above formulas for the MER width and height, each depends in turn on the width and height of the CTU, as well as on the predetermined threshold depth qtDepthThr. Thus, a CTU (or its respective pixel area) may be represented by multiple MER grid cells, including the same MER, with the (pixel) area of said cell being determined by the MER-width and MER-height.

The threshold qtDepthThr may be signaled, for example, in the bitstream.

According to an aspect of the present disclosure, the processing circuitry is configured to obtain, as the second location, coordinates (x, y) of a corner of the current coding block, and obtain, as the first location, the coordinates of a specific point (x+a, y+b) in the candidate coding block, wherein a∈(−1,0,1), b∈(−1,0,1), and a and b are selected in dependence on the relationship of the relative position between the specific point and the corner, select, for the one candidate coding block, one value from (−1,0,1) as the a, and one value from the (−1,0,1) as the b.

The coordinates of the specific point and/or a corner of the candidate block and/or the current block may be along a horizontal axis (x direction/axis), going from left (negative x) to right (positive x) and a vertical axis (y direction/axis, gravity axis), going from up (negative y) to down (positive y). The coordinates x, y may be in units of pixels. A pixel refers also to a sample. This means that a value of x=10 and/or y=−5 corresponds to 10 pixels/samples along the positive x axis (right) and 5 pixels/samples along the negative y axis (upward).

According to an aspect of the present disclosure, the corner is a bottom-left corner, and the specific point is located on where there is left to the current coding block, a=−1, b=0, or the corner is a bottom-left corner, and the specific point is located on where there is bottom-left to the current coding block, a=−1, b=1, or the corner is an upper-left corner, and the specific point is located on where there is upper-left to the current coding block, a=−1, b=−1, or the corner is an upper-right corner, and the specific point is located on where there is upper-right to the current coding block, a=1, b=−1, or the corner is an upper-right corner, and the specific point is located on where there is upper to the current coding block, a=0, b=−1.

This may provide an advantage of improving the accuracy of the merge estimation by selecting the values of a and/or b in dependence on the positional relation between the candidate block neighboring the current block. Moreover, the MER conditions in relation to the one or two axial directions may provide an advantage of making the merge estimation more flexible. This means that the merge estimation may be tuned, for example, whether or not a CTU is divided horizontally or vertically in a homogeneous or non-homogeneous manner, as relevant for BT and/or TT partitions.

According to an aspect of the present disclosure, the processing circuitry is configured to obtain, as the second location, coordinates (x, y) of a corner of the current coding block, obtain, as the first location, the coordinates of a specific point (x1, y1) in the candidate coding block, wherein the specific point is a top-left corner or a bottom-right corner of the candidate coding block.

According to an aspect of the present disclosure, the corner of the candidate coding block is a top-left corner and the specific point is the top-left corner.

According to an aspect of the present disclosure, an apparatus is provided for marking availability of a candidate coding block for merge estimation of a current coding block within a CTU, wherein the apparatus comprises a processing circuitry configured to obtain a parent block, parentCurr, of the current coding block, wherein the current coding block is obtained by splitting of the parentCurr, obtain a parent block, parentCand, of the candidate coding block, wherein the candidate coding block is obtained by splitting of the parentCand, and mark the candidate coding block as unavailable, when the parentCand and the parentCurr are the same block, and when a size of the parentCand is smaller than a threshold, and mark the candidate coding block as available otherwise.

In one exemplary embodiment, the splitting process may be performed one time or multiple times according to a recursive process.

For example, the size of the parentCand is obtained according to the width multiplied by the height of the parentCand.

According to an aspect of the present disclosure, motion information of the candidate coding block is not used in the prediction of the current coding block, when the candidate coding block is marked unavailable.

This may provide an advantage of pre-selecting or arranging candidate blocks into available and unavailable candidate blocks, by the prediction of a current block is performed only with those candidate block(s) that are marked as available. Unavailable marked candidate blocks may in turn be processed in parallel as they are not need for the prediction. Thus, the encoding/decoding processing may be performed faster.

According to an aspect of the present disclosure, motion information of the candidate coding block is not used in the prediction of the current coding block, when the current coding block is predicted using merge prediction mode, and when the candidate coding block is marked unavailable.

According to an aspect of the present disclosure, an apparatus is provided for marking availability of a candidate coding block for merge estimation of a current coding block within a CTU, wherein the apparatus comprises a processing circuitry configured to obtain a parent block, parentCurr, of the current coding block, wherein the current coding block is obtained by splitting of the parentCurr, obtain a parent block, parentCand, of the candidate coding block, wherein the candidate coding block is obtained by splitting of the parentCand, and mark the candidate coding block as unavailable, when the parentCand and the parentCurr are the same block, and when a function of a number of QT, TT, and BT splitting operations that are performed to obtain parentCand block is greater than a threshold, and mark the candidate coding block as available otherwise.

According to an aspect of the present disclosure, the processing circuitry is further configured to derive MVCs from the candidate coding blocks marked as available, and code the current coding block by referring to the MVCs.

Coding the current coding block means that the current block is predicted using the MVCs.

The various forms of MER conditions of the above different aspects of the present disclosure may provide an advantage of adapting and optimizing the merge estimation to the particular partitioning pattern (i.e. the splitting), using QT, TT, and/or BT in particular when these are used in a mixed manner.

According to an aspect of the present disclosure, an encoder is provided for encoding a current coding block within a CTU, comprising a candidate list generator for generating a list of prediction candidates, and the apparatus for marking availability of a candidate coding block for merge estimation of the current coding block within the CTU according to any of the previous aspects of the present disclosure, a PU for determining prediction of the current coding block according to at least one prediction candidate out of the generated list, and a compression unit for encoding the current coding block by using the prediction of the current coding block.

According to an aspect of the present disclosure, a decoder is provided for decoding a current coding block within a CTU, comprising a candidate list generator for generating a list of prediction candidates, and the apparatus for marking availability of a candidate coding block for merge estimation of the current coding block within the CTU according to any of the previous aspects of the present disclosure, a PU for determining prediction of the current coding block according to at least one prediction candidate out of the generated list, and a decompression unit for decoding the current coding block by using the prediction of the current coding block.

According to an aspect of the present disclosure, the encoder and/or decoder according to the above aspects of the present disclosure, wherein the list of prediction candidates is a list of motion vectors, MVs.

The list may be a list of intra-prediction modes (directional with a certain direction, planar, and/or direct current (DC)).

According to an aspect of the present disclosure, a method is provided for marking availability of a candidate coding block for merge estimation of a current coding block within a CTU, comprising the steps of marking the candidate coding block as unavailable, when a splitting depth of the current coding block is equal to or larger than a predetermined threshold, and a first location of the candidate coding block and a second location of the current coding block are included within a same MER, and marking the candidate coding block as available otherwise.

According to an aspect of the present disclosure, a method is provided for marking the availability of a candidate coding block for merge estimation of a current coding block within a CTU, comprising the steps of obtaining a parent block, parentCurr, of the current coding block, wherein the current coding block is obtained by splitting of the parentCurr, obtaining a parent block, parentCand, of a candidate coding block (denoted as parentCand), wherein the candidate coding block is obtained by splitting of the parentCand, and marking the candidate coding block as unavailable, when the parentCand and the parentCurr are the same block, and when a size of the parentCand is smaller than a threshold, and marking the candidate coding block as available otherwise.

According to an aspect of the present disclosure, a method is provided for marking availability of a candidate coding block for merge estimation of a current coding block within an CTU, comprising the steps of obtaining a parent block, parentCurr, of the current coding block, wherein the current coding block is obtained by splitting of the parentCurr, obtaining a parent block, parentCand, of a candidate coding block, wherein the candidate coding block is obtained by splitting of the parentCand, marking the candidate coding block as unavailable, when the parentCand and the parentCurr are the same block, and when a function of number of QT, TT, and BT splitting operations that are performed to obtain the parentCand block is greater than a threshold, and marking the candidate coding block as available otherwise.

According to an aspect of the present disclosure, a computer-readable non-transitory medium is provided for storing a program, including instructions which when executed on a processor cause the processor to perform the method according to any of the previous methods.

By the present disclosure provided above, more coding blocks can be parallel processed during the merge estimation, therefore improving the performance of coding/decoding technology, especially, the VVC.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 15 is applied.

FIG. 17 is applied.

DETAILED DESCRIPTION OF THE EMBODIMENTS

Figure 1A:
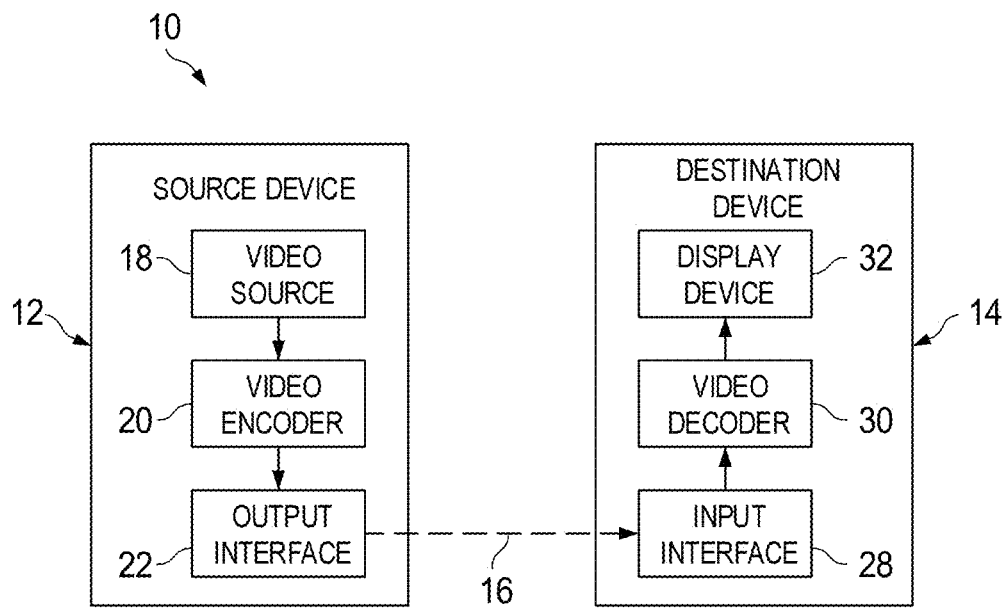
FIG. 1A is a block diagram illustrating an example coding system that may implement embodiments of the disclosure.

In the following description, reference is made to the accompanying figures, which form part of the disclosure, and which show, by way of illustration, specific aspects of embodiments of the disclosure or specific aspects in which embodiments of the present disclosure may be used. It is understood that embodiments of the disclosure may be used in other aspects and comprise structural or logical changes not depicted in the figures. The following detailed description, therefore, is not to be taken in a limiting sense, and the scope of the present disclosure is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As mentioned before, when a coding block is no longer partitioned based on QT partitions as in HEVC, but rather on BT or TT as in VVC, the HEVC conditions for merge mode may be no longer suitable, and/or may not be satisfied because the new partition patterns of the coding block resulting from the use of BT and/or TT, are no longer consistent with the HEVC conditions which rely on square pattern partition of the coding block. In other words, the HEVC conditions are inconsistent with the non-square patterns, so that a check whether or not a candidate block (i.e. a candidate coding block) belongs to a MER can no longer be performed accurately or in the worst case may even be impossible. As a result, the coding performance may degenerate severely, in particular the parallel processing of the merge estimation.

In order to illustrate the above conflict in applying HEVC conditions in VVC in conjunction with BT and/or TT partitions, three different scenarios are chosen to show exemplarily how the MER based merge estimation in HEVC impact the parallelism of the merge estimation in VVC.

Scenario 1.

Figure 7:
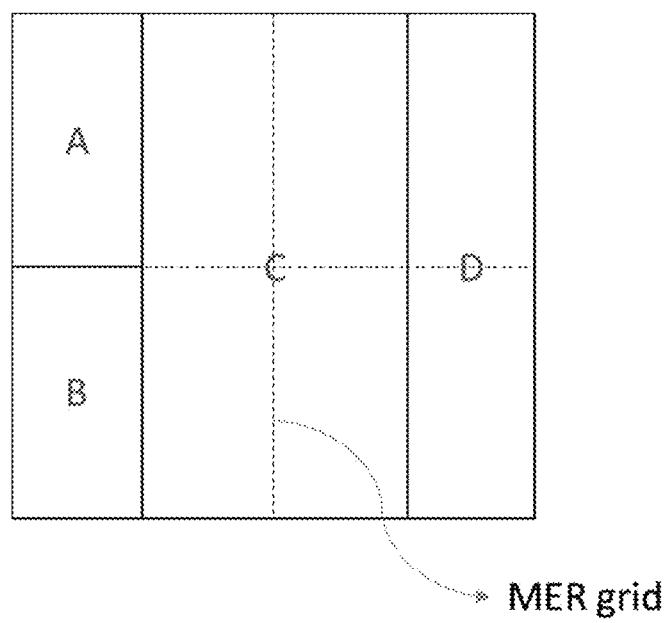
FIG. 7 to FIG. 9 are partition results based on the partition modes allowed in VVC.

FIG. 7 illustrates a partition result based on partition modes allowed in VVC, If a top-left sample of blk1 (A) and a top-left sample of blk2 (B) are in same MER (N×N grid), then motion information of blk1 is set unavailable for prediction by blk2 whit a processing order blk1→blk2. Based on the MER based estimation in HEVC, the for prediction dependencies of coding blocks A, B, C, and D are C can be predicted from B. D can be predicted from C. B can be predicted from A. C cannot be predicted from A.

However, based on HEVC, none pair of those coding blocks can be processed in parallel with the proceeding order A→B→C→D.

According to the HEVC rule, two blocks are considered to be in the same MER if their top-left coordinates are in the same MER. Block B can be predicted from block A (since they are in different MER). Therefore, block B needs to wait for block A to be available Hence, they cannot be processed in parallel. Block D can be predicted from block C (since they are in different MER). Hence they cannot be processed in parallel. Block C cannot be predicted from block A (since they are in the same MER). However, C and A still cannot be processed in parallel since block C can be predicted from block B, and block B can be predicted from block A. Therefore, in Scenario 1, parallel processing of those coding block is impossible which will cost more coding time to do the merge estimation for each of those coding blocks.

Scenario 2.

Figure 8:
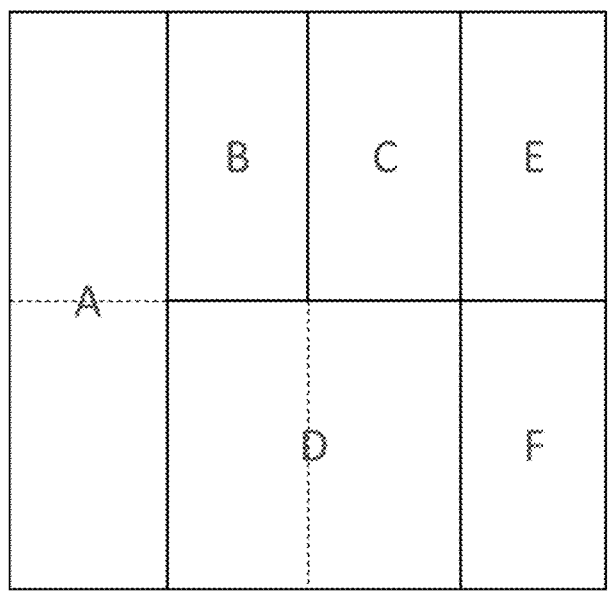

FIG. 8 illustrates another partition result based on partition modes allowed in VVC, where only coding blocks A and B can be processed in parallel with a processing order A→B→C→D→E→F. According to the HEVC rule, two blocks are considered to be in the same MER if their top-left coordinates are in the same MER, therefore, coding blocks C and E are supposed to be processed in parallel. As contrast, in this scenario 2, coding blocks C and E cannot be processed in parallel although they are in the same MER, because coding block E can be predicted from coding block D, and coding block D can be predicted from coding block C, which results the later one coding block waiting until the prior one's MV according to the processing order is available. Therefore, in Scenario 1, parallel processing of those coding block is limited which will still cost more coding time to do the merge estimation for those coding blocks.

Scenario 3.

Figure 9:
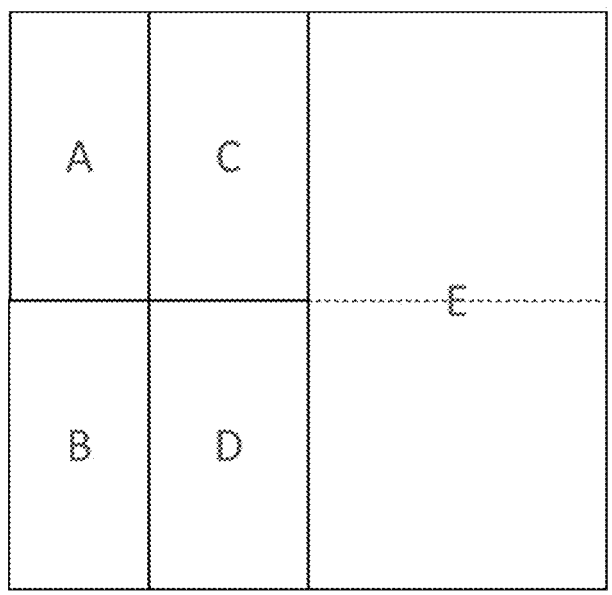

FIG. 9 illustrates another partition result based on partition modes allowed in VVC, where none pair of coding blocks can be processed in parallel. Based on the HEVC rule, coding block C cannot be predicted from coding block A, but coding block C and coding block A still cannot be processed in parallel, since coding block C can be predicted from coding block B and coding block B can be predicted from coding block A. Based on the HEVC rule, coding block D cannot be predicted from coding block B, but coding block B and coding block D still cannot be processed in parallel, since coding block C can be predicted from coding block B and coding block D can be predicted from coding block C. Therefore, in similar as Scenario 1, in Scenario 3, parallel processing of those coding block is impossible which will cost more coding time to do the merge estimation for each of those coding blocks.

The present disclosure provides a method of coding implemented by an encoding/decoding device, for marking the availability of a potential candidate coding block for merge estimation of a current coding block. The method includes, based on a predefined principle which is made based on the closeness of two respective points within the potential candidate coding block and the current coding block, adoptively obtaining the coordination (x, y) of a specific of the current coding block, and the coordination of a specific point in the potential candidate coding block, wherein the coordination of the specific point in the potential candidate coding block is (x1, y1), marking the potential candidate coding block as unavailable, if floor(x1/mer_width) is equal to floor(x/mer_width), or if floor(y1/mer_height) is equal to floor(y/mer_height), where the mer_width and mer_height are the width and height of a MER, and the function that takes as input a real number X and gives as output the greatest integer less than or equal to X.

Specifically, the method comprising obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0,1), and a and b are selected depends on the relationship of the relative position between the potential candidate coding block and the current coding block, and for one potential candidate coding block, one value from (−1, 0,1) is selected as the a, and one value from the (−1,0,1) is selected as the b, marking the potential candidate coding block as unavailable, if floor((x+a)/mer_width) is equal to floor(x/mer_width), or if floor((y+b)/mer_height) is equal to floor(y/mer_height), where the mer_width and mer_height are the width and height of a MER, and the function that takes as input a real number X and gives as output the greatest integer less than or equal to X.

Alternatively, the present disclosure further provides a method of coding implemented by a decoding device for marking the availability of a potential candidate coding block for merge estimation of a current coding block. The method includes, obtaining the coordination (x, y) of a corner of the current coding block, and the coordination of a specific point in the potential candidate coding block, wherein the coordination of the specific point in the potential candidate coding block is the coordination (x1, y1) of the bottom right corner of the potential candidate coding block or the top-left corner of the potential candidate coding block, marking the potential candidate coding block as unavailable, if floor(x1/mer_width) is equal to floor(x/mer_width), or if floor(y1/mer_height) is equal to floor(y/mer_height), where the mer_width and mer_height are the width and height of a MER, and the function that takes as input a real number X and gives as output the greatest integer less than or equal to X.

Alternatively, the condition used for marking the unavailability of the potential candidate coding block could be extended as if floor((x+a)/mer_width) is equal to floor(x/mer_width) and floor((y+b)/mer_height)>=floor(y/mer_height) or if floor((y+b)/mer_height) is equal to floor(y/mer_height) and floor((x+a)/mer_width)>=floor(x/mer_width).

Alternatively, the condition used for marking the unavailability of the potential candidate coding block could be extended as if floor(x1/mer_width) is equal to floor(x/mer_width) and floor(y1/mer_height)>=floor(y/mer_height) or if floor(y1/mer_height) is equal to floor(y/mer_height) and floor(x1/mer_width)>=floor(x/mer_width).

Alternatively, the present disclosure further provides a method of coding implemented by an encoding/decoding device for marking the availability of a potential candidate coding block for merge estimation of a current coding block. The method includes, obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0, 1), and a and b are selected depends on the relationship of the relative position between the potential candidate coding block and the current coding block, and for one potential candidate coding block, one value from (−1,0,1) is selected as the a, and one value from the (−1,0,1) is selected as the b, marking the potential candidate coding block as unavailable, when the (x, y) and the (x+a, y+b) are located within one MER, and the cqtDepth of the current coding block is greater or equal to a threshold, where the cqtDepth is a parameter that decide the QT partition depth of a CTB to which the current coding block belongs. Alternatively, if the potential candidate coding block comes from a history list, then the coordination of the specific point in the potential candidate coding block is the coordination (x1, y1) of the top-left corner of the potential candidate coding block, or the bottom-right corner of the potential candidate coding block.

The present disclosure provides a method of coding implemented by an encoding/decoding device for marking the availability of a potential candidate coding block for merge estimation of a current coding block. The method includes, based on the closeness of two respective points within the potential candidate coding block and the current coding block, adoptively obtaining the coordination (x, y) of a specific of the current coding block, and the coordination of a specific point in the potential candidate coding block, wherein the coordination of the specific point in the potential candidate coding block is (x1, y1), marking the potential candidate coding block as unavailable, if floor(x1/mer_width) is equal to floor(x/mer_width), or if floor(y1/mer_height) is equal to floor(y/mer_height), where the mer_width and mer_height are the width and height of a MER, and the function that takes as input a real number X and gives as output the greatest integer less than or equal to X.

Specifically, the method comprising obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0,1), and a and b are selected depends on the relationship of the relative position between the potential candidate coding block and the current coding block, and for one potential candidate coding block, one value from (−1,0,1) is selected as the a, and one value from the (−1,0,1) is selected as the b, marking the potential candidate coding block as unavailable, if floor((x+a)/mer_width) is equal to floor(x/mer_width), or if floor((y+b)/mer_height) is equal to floor(y/mer_height), where the mer_width and mer_height are the width and height of a MER, and the function that takes as input a real number X and gives as output the greatest integer less than or equal to X.

Alternatively, the present disclosure further provides a method of coding implemented by a decoding device, for marking the availability of a potential candidate coding block for merge estimation of a current coding block. The method includes, obtaining the coordination (x, y) of a corner of the current coding block, and the coordination of a specific point in the potential candidate coding block, wherein the coordination of the specific point in the potential candidate coding block is the coordination (x1, y1) of the bottom right corner of the potential candidate coding block or the top-left corner of the potential candidate coding block, marking the potential candidate coding block as unavailable, if floor(x1/mer_width) is equal to floor(x/mer_width), or if floor(y1/mer_height) is equal to floor(y/mer_height), where the mer_width and mer_height are the width and height of a MER, and the function that takes as input a real number X and gives as output the greatest integer less than or equal to X.

Alternatively, the condition used for marking the unavailability of the potential candidate coding block could be extended as if floor((x+a)/mer_width) is equal to floor(x/mer_width) and floor((y+b)/mer_height)>=floor(y/mer_height) or if floor((y+b)/mer_height) is equal to floor(y/mer_height) and floor((x+a)/mer_width)>=floor(x/mer_width).

Alternatively, the condition used for marking the unavailability of the potential candidate coding block could be extended as if floor(x1/mer_width) is equal to floor(x/mer_width) and floor(y1/mer_height)>=floor(y/mer_height) or if floor(y1/mer_height) is equal to floor(y/mer_height) and floor(x1/mer_width)>=floor(x/mer_width).

Alternatively, the present disclosure further provides a method of coding implemented by an encoding/decoding device, for marking the availability of a potential candidate coding block for merge estimation of a current coding block. The method includes, obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0,1), and a and b are selected depends on the relationship of the relative position between the potential candidate coding block and the current coding block, and for one potential candidate coding block, one value from (−1,0,1) is selected as the a, and one value from the (−1,0,1) is selected as the b, marking the potential candidate coding block as unavailable, when the (x, y) and the (x+a, y+b) are located within one MER, and the cqtDepth of the current coding block is greater or equal to a threshold, where the cqtDepth is a parameter that decide the QT partition depth of a CTB to which the current coding block belongs. Alternatively, if the potential candidate coding block comes from a history list, then the coordination of the specific point in the potential candidate coding block is the coordination (x1, y1) of the top-left corner of the potential candidate coding block, or the bottom-right corner of the potential candidate coding block.

The present disclosure further provides a decoding device and an encoding device for performing the methods above.

FIG. 1A is a block diagram illustrating an example coding system 10 that may utilize bidirectional prediction techniques. As shown in FIG. 1A, the coding system 10 includes a source device 12 that provides encoded video data to be decoded at a later time by a destination device 14. In particular, the source device 12 may provide the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, BLU-RAY discs, digital versatile discs (DVDs), compact disc read-only memory (CD-ROMs), flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), a file transfer protocol (FTP) server, network attached storage (NAS) devices, or a local disk drive. Destination device 14 may access the encoded video data through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as Dynamic Adaptive Streaming over hypertext transfer protocol (HTTP) (DASH), digital video that is encoded onto a data storage medium, decoding of digital video stored on a data storage medium, or other applications. In some examples, coding system 10 may be configured to support one-way or two-way video transmission to support applications such as video streaming, video playback, video broadcasting, and/or video telephony.

In the example of FIG. 1A, source device 12 includes video source 18, video encoder 20, and output interface 22. Destination device 14 includes input interface 28, video decoder 30, and display device 32. In accordance with this disclosure, video encoder 200 of source device 12 and/or the video decoder 300 of the destination device 14 may be configured to apply the techniques for bidirectional prediction. In other examples, a source device and a destination device may include other components or arrangements. For example, source device 12 may receive video data from an external video source, such as an external camera. Likewise, destination device 14 may interface with an external display device, rather than including an integrated display device.

The illustrated coding system 10 of FIG. 1A is merely one example. Techniques for bidirectional prediction may be performed by any digital video encoding and/or decoding device. Although the techniques of this disclosure generally are performed by a video coding device, the techniques may also be performed by a video encoder/decoder (codec). Moreover, the techniques of this disclosure may also be performed by a video preprocessor. The video encoder and/or the decoder may be a graphics processing unit (GPU) or a similar device.

Source device 12 and destination device 14 are merely examples of such coding devices in which source device 12 generates coded video data for transmission to destination device 14. In some examples, source device 12 and destination device 14 may operate in a substantially symmetrical manner such that each of the source and destination devices 12, 14 includes video encoding and decoding components. Hence, coding system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video.

In some cases, when video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, BLU-RAY disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., group of pictures (GOPs). Display device 32 displays the decoded video data to a user, and may comprise any of a variety of display devices such as a cathode-ray tube (CRT), a liquid-crystal display (LCD), a plasma display, an organic light-emitting diode (OLED) display, or another type of display device.

Video encoder 200 and video decoder 300 may operate according to a video coding standard, such as the HEVC standard presently under development, and may conform to the HEVC Test Model (HM). Alternatively, video encoder 200 and video decoder 300 may operate according to other proprietary or industry standards, such as the ITU-T H.264 standard, alternatively referred to as MPEG-4, Part 10, Advanced Video Coding (AVC), H.265/HEVC, or extensions of such standards. The techniques of this disclosure, however, are not limited to any particular coding standard. Other examples of video coding standards include MPEG-2 and ITU-T H.263. Although not shown in FIG. 1A, in some aspects, video encoder 200 and video decoder 300 may each be integrated with an audio encoder and decoder, and may include appropriate multiplexer-demultiplexer (MUX-DEMUX) units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined codec in a respective device. A device including video encoder 200 and/or video decoder 300 may comprise an integrated circuit (IC), a microprocessor, and/or a wireless communication device, such as a cellular telephone.

Figure 1B:
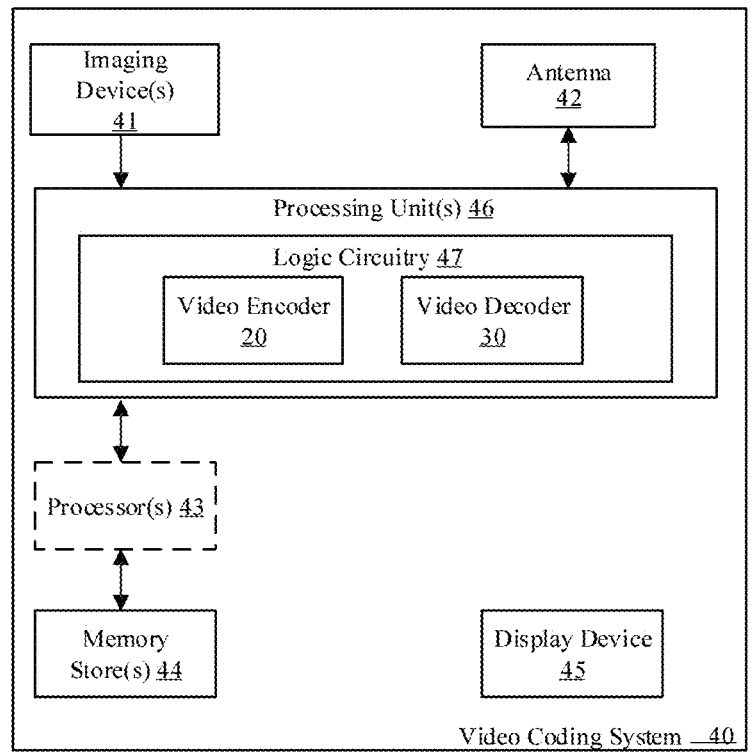
FIG. 1B is a block diagram illustrating another example coding system that may implement embodiments of the disclosure.
Figure 2:
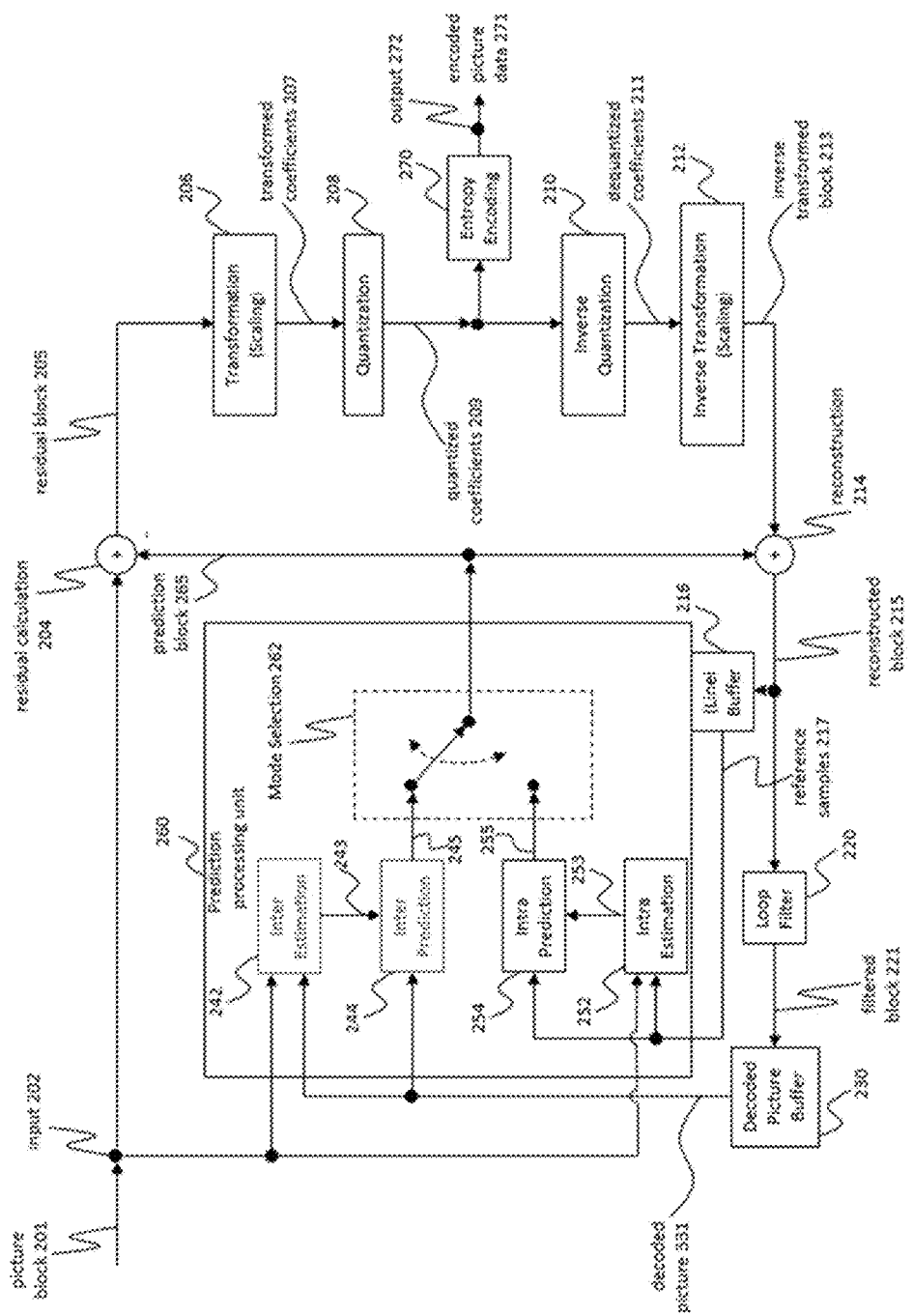
FIG. 2 is a block diagram illustrating an example video encoder that may implement embodiments of the disclosure.
Figure 3:
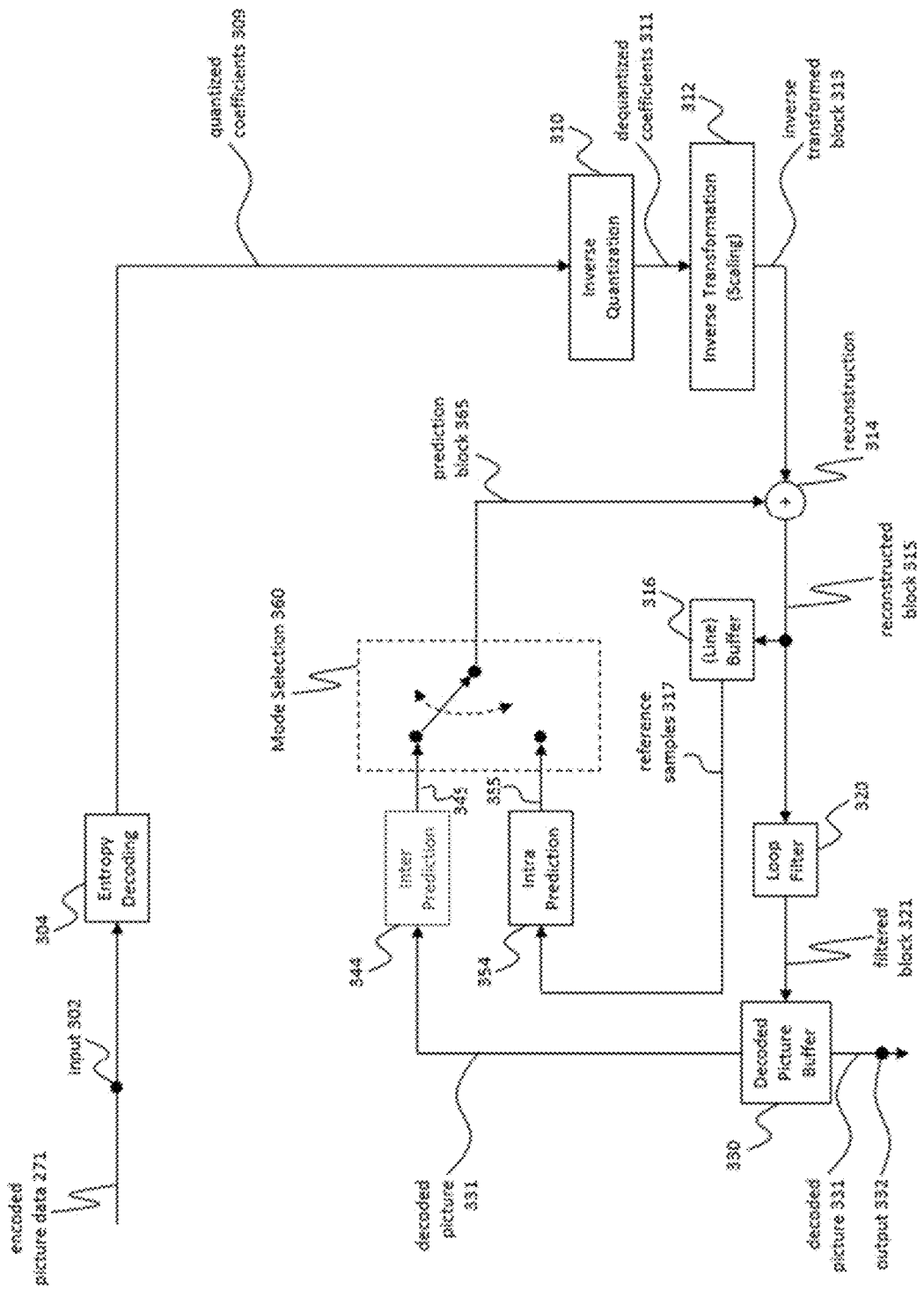
FIG. 3 is a block diagram illustrating an example of a video decoder that may implement embodiments of the disclosure.

FIG. 1B is an illustrative diagram of an example video coding system 40 including encoder 200 of FIG. 2 and/or decoder 300 of FIG. 3 according to an exemplary embodiment. The system 40 can implement techniques of this present application, e.g. the merge estimation in the inter prediction. In the illustrated implementation, video coding system 40 may include imaging device(s) 41, video encoder 20, video decoder 300 (and/or a video coder implemented via logic circuitry 47 of processing unit(s) 46), an antenna 42, one or more processor(s) 43, one or more memory store(s) 44, and/or a display device 45.

As illustrated, imaging device(s) 41, antenna 42, processing unit(s) 46, logic circuitry 47, video encoder 20, video decoder 30, processor(s) 43, memory store(s) 44, and/or display device 45 may be capable of communication with one another. As discussed, although illustrated with both video encoder 200 and video decoder 30, video coding system 40 may include only video encoder 200 or only video decoder 300 in various practical scenario.

As shown, in some examples, video coding system 40 may include antenna 42. Antenna 42 may be configured to transmit or receive an encoded bitstream of video data, for example. Further, in some examples, video coding system 40 may include display device 45. Display device 45 may be configured to present video data. As shown, in some examples, logic circuitry 54 may be implemented via processing unit(s) 46. Processing unit(s) 46 may include ASIC logic, graphics processor(s), general purpose processor(s), or the like. Video coding system 40 also may include optional processor(s) 43, which may similarly include ASIC logic, graphics processor(s), general purpose processor(s), or the like. In some examples, logic circuitry 54 may be implemented via hardware, video coding dedicated hardware, or the like, and processor(s) 43 may implemented general purpose software, operating systems, or the like. In addition, memory store(s) 44 may be any type of memory such as volatile memory (e.g., static random-access memory (SRAM), dynamic random-access memory (DRAM), etc.) or non-volatile memory (e.g., flash memory, etc.), and so forth. In a non-limiting example, memory store(s) 44 may be implemented by cache memory. In some examples, logic circuitry 54 may access memory store(s) 44 (for implementation of an image buffer for example). In other examples, logic circuitry 47 and/or processing unit(s) 46 may include memory stores (e.g., cache or the like) for the implementation of an image buffer or the like.

In some examples, video encoder 200 implemented via logic circuitry may include an image buffer (e.g., via either processing unit(s) 46 or memory store(s) 44)) and a GPU (e.g., via processing unit(s) 46). The GPU may be communicatively coupled to the image buffer. The GPU may include video encoder 200 as implemented via logic circuitry 47 to embody the various modules as discussed with respect to FIG. 2 and/or any other encoder system or subsystem described herein. The logic circuitry may be configured to perform the various operations as discussed herein.

Video decoder 300 may be implemented in a similar manner as implemented via logic circuitry 47 to embody the various modules as discussed with respect to decoder 300 of FIG. 3 and/or any other decoder system or subsystem described herein. In some examples, video decoder 300 may be implemented via logic circuitry may include an image buffer (e.g., via either processing unit(s) 46 or memory store(s) 44)) and a GPU (e.g., via processing unit(s) 46). The GPU may be communicatively coupled to the image buffer. The GPU may include video decoder 300 as implemented via logic circuitry 47 to embody the various modules as discussed with respect to FIG. 3 and/or any other decoder system or subsystem described herein.

In some examples, antenna 42 of video coding system 40 may be configured to receive an encoded bitstream of video data. As discussed, the encoded bitstream may include data, indicators, index values, mode selection data, or the like associated with encoding a video frame as discussed herein, such as data associated with the coding partition (e.g., transform coefficients or quantized transform coefficients, optional indicators (as discussed), and/or data defining the coding partition). Video coding system 40 may also include video decoder 300 coupled to antenna 42 and configured to decode the encoded bitstream. The display device 45 configured to present video frames.

FIG. 2 is a block diagram illustrating an example of video encoder 200 that may implement the techniques of the present application. Video encoder 200 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

FIG. 2 shows a schematic/conceptual block diagram of an example video encoder 200 that is configured to implement the techniques of the present disclosure. In the example of FIG. 2, the video encoder 200 comprises a residual calculation unit 204, a transform processing unit 206, a quantization unit 208, an inverse quantization unit 210, and inverse transform processing unit 212, a reconstruction unit 214, a buffer 216, a loop filter unit 220, a decoded picture buffer 230, a prediction processing unit 260 and an entropy encoding unit 270. The prediction processing unit 260 may include an inter estimation 242, inter PU 244, an intra estimation 252, an intra PU 254 and a mode selection unit 262. Inter PU 244 may further include a motion compensation unit (not shown). A video encoder 200 as shown in FIG. 2 may also be referred to as hybrid video encoder or a video encoder according to a hybrid video codec.

For example, the residual calculation unit 204, the transform processing unit 206, the quantization unit 208, the prediction processing unit 260 and the entropy encoding unit 270 form a forward signal path of the encoder 200, whereas, for example, the inverse quantization unit 210, the inverse transform processing unit 212, the reconstruction unit 214, the buffer 216, the loop filter 220, the decoded picture buffer 230, prediction processing unit 260 form a backward signal path of the encoder, wherein the backward signal path of the encoder corresponds to the signal path of the decoder (see decoder 300 in FIG. 3).

The encoder 200 is configured to receive, e.g. by input 202, a picture 201 or a block 203 of the picture 201, e.g. picture of a sequence of pictures forming a video or video sequence. The picture block 203 may also be referred to as current picture block or picture block to be coded, and the picture 201 as current picture or picture to be coded (in particular in video coding to distinguish the current picture from other pictures, e.g. previously encoded and/or decoded pictures of the same video sequence, i.e. the video sequence which also comprises the current picture).

Partitioning.

Embodiments of the encoder 200 may comprise a partitioning unit (not depicted in FIG. 2) configured to partition the picture 201 into a plurality of blocks, e.g. blocks like block 203, typically into a plurality of non-overlapping blocks. The partitioning unit may be configured to use the same block size for all pictures of a video sequence and the corresponding grid defining the block size, or to change the block size between pictures or subsets or groups of pictures, and partition each picture into the corresponding blocks.

In HEVC and other video coding specifications, to generate an encoded representation of a picture, a set of CTUs may be generated. Each of the CTUs may comprise a CTB of luma samples, two corresponding CTBs of chroma samples, and syntax structures used to code the samples of the CTBs. In monochrome pictures or pictures having three separate color planes, a CTU may comprise a single CTB and syntax structures used to code the samples of the CTB. A CTB may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more CUs. A slice may include an integer number of CTUs ordered consecutively in a raster scan order.

In HEVC, a CTU is split into CUs by using a QT structure denoted as coding tree to adapt to various local characteristics. The decision whether to code a picture area using inter-picture (temporal) or intra-picture (spatial) prediction is made at the CU level. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block. A coding block is an N×N block of samples. In some examples, a CU may be the same size of a CTU. Each CU is coded with one coding mode, which could be, e.g., an intra coding mode or an inter coding mode. Other coding modes are also possible. Encoder 200 receives video data. Encoder 200 may encode each CTU in a slice of a picture of the video data. As part of encoding a CTU, prediction processing unit 260 or another processing unit (Including but not limited to unit of encoder 200 shown in FIG. 2) of encoder 200 may perform partitioning to divide the CTBs of the CTU into progressively-smaller blocks 203. The smaller blocks may be coding blocks of CUs.

Syntax data within a bitstream may also define a size for the CTU. A slice includes a number of consecutive CTUs in coding order. A video frame or image or picture may be partitioned into one or more slices. As mentioned above, each tree block may be split into CUs according to a QT. In general, a QT data structure includes one node per CU, with a root node corresponding to the treeblock (e.g., CTU). If a CU is split into four sub-CUs, the node corresponding to the CU includes four child nodes, each of which corresponds to one of the sub-CUs. The plurality of nodes in a QT structure includes leaf nodes and non-leaf nodes. The leaf nodes have no child nodes in the tree structure (i.e., the leaf nodes are not further split). The, non-leaf nodes include a root node of the tree structure. For each respective non-root node of the plurality of nodes, the respective non-root node corresponds to a sub-CU of a CU corresponding to a parent node in the tree structure of the respective non-root node. Each respective non-leaf node has one or more child nodes in the tree structure.

Each node of the QT data structure may provide syntax data for the corresponding CU. For example, a node in the QT may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. If a block of CU is split further, it may be generally referred to as a non-leaf-CU. As shown in FIG. 2, each level of partitioning is a QT split into four sub-CUs. The black CU is an example of a leaf-node (i.e., a block that is not further split).

A CU has a similar purpose as a macroblock of the H.264 standard, except that a CU does not have a size distinction. For example, a tree block may be split into four child nodes (also referred to as sub-CUs), and each child node may in turn be a parent node and be split into another four child nodes. A final, unsplit child node, referred to as a leaf node of the QT, comprises a coding node, also referred to as a leaf-CU. Syntax data associated with a coded bitstream may define a maximum number of times a tree block may be split, referred to as a maximum CU depth, and may also define a minimum size of the coding nodes. Accordingly, a bitstream may also define a smallest CU (SCU). The term "block" is used to refer to any of a CU, PU, or transform unit (TU), in the context of HEVC, or similar data structures in the context of other standards (e.g., macroblocks and sub-blocks thereof in H.264/AVC).

In HEVC, each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into TUs according to another QT structure similar to the coding tree for the CU. One of key feature of the HEVC structure is that it has the multiple partition conceptions including CU, PU, and TU. PUs may be partitioned to be non-square in shape. Syntax data associated with a CU may also describe, for example, partitioning of the CU into one or more PUs. A TU can be square or non-square (e.g., rectangular) in shape, syntax data associated with a CU may describe, for example, partitioning of the CU into one or more TUs according to a QT. Partitioning modes may differ between whether the CU is skip or direct mode encoded, intra-prediction mode encoded, or inter-prediction mode encoded.

While VVC removes the separation of the PU and TU concepts, and supports more flexibility for CU partition shapes. A size of the CU corresponds to a size of the coding node and may be square or non-square (e.g., rectangular) in shape. The size of the CU may range from 4×4 pixels (or 8×8 pixels) up to the size of the tree block with a maximum of 128×128 pixels or greater (for example, 256×256 pixels).

After encoder 200 generates a predictive block (e.g., luma, Cb, and Cr predictive block) for CU, encoder 200 may generate a residual block for the CU. For instance, encoder 100 may generate a luma residual block for the CU. Each sample in the CU's luma residual block indicates a difference between a luma sample in the CU's predictive luma block and a corresponding sample in the CU's original luma coding block. In addition, encoder 200 may generate a Cb residual block for the CU. Each sample in the Cb residual block of a CU may indicate a difference between a Cb sample in the CU's predictive Cb block and a corresponding sample in the CU's original Cb coding block. Encoder 100 may also generate a Cr residual block for the CU. Each sample in the CU's Cr residual block may indicate a difference between a Cr sample in the CU's predictive Cr block and a corresponding sample in the CU's original Cr coding block.

In some examples, encoder 100 skips application of the transforms to the transform block. In such examples, encoder 200 may treat residual sample values in the same way as transform coefficients. Thus, in examples where encoder 100 skips application of the transforms, the following discussion of transform coefficients and coefficient blocks may be applicable to transform blocks of residual samples.

After generating a coefficient block (e.g., a luma coefficient block, a Cb coefficient block or a Cr coefficient block), encoder 200 may quantize the coefficient block to possibly reduce the amount of data used to represent the coefficient block, potentially providing further compression. Quantization generally refers to a process in which a range of values is compressed to a single value. After encoder 200 quantizes a coefficient block, encoder 200 may entropy encode syntax elements indicating the quantized transform coefficients. For example, encoder 200 may perform context-adaptive binary arithmetic coding (CABAC) or other entropy coding techniques on the syntax elements indicating the quantized transform coefficients.

Encoder 200 may output a bitstream of encoded picture data 271 that includes a sequence of bits that forms a representation of coded pictures and associated data. Thus, the bitstream comprises an encoded representation of video data.

In J. An et al., "Block partitioning structure for next generation video coding", ITU, COM16-C966, September 2015 (hereinafter, "VCEG proposal COM16-C966"), QTBT partitioning techniques were proposed for future video coding standard beyond HEVC. Simulations have shown that the proposed QTBT structure is more efficient than the QT structure in used HEVC. In HEVC, inter prediction for small blocks is restricted to reduce the memory access of motion compensation, such that bi-prediction is not supported for 4×8 and 8×4 blocks, and inter prediction is not supported for 4×4 blocks. In the QTBT of the Joint Exploration Model (JEM), these restrictions are removed.

Figure 10:
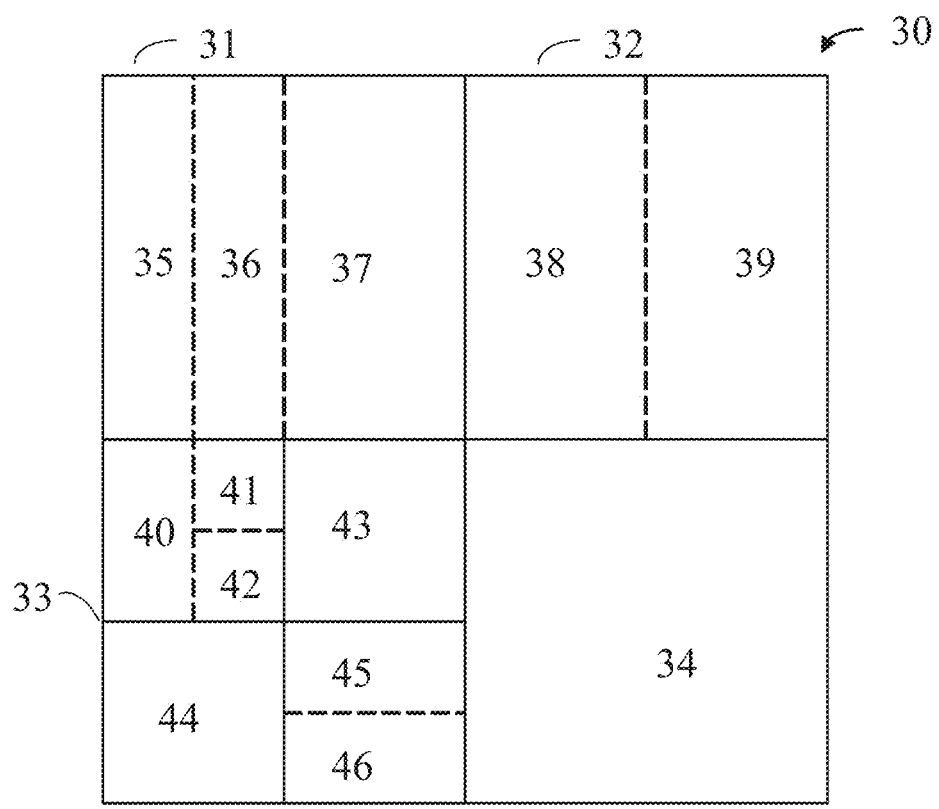
FIG. 10 illustrates a diagram of an example of block partitioning using a QT-BT (QTBT) structure.

In the QTBT, a CU can have either a square or rectangular shape. As shown in FIG. 10, a CTU is first partitioned by a QT structure. The QT leaf nodes can be further partitioned by a BT structure. There are two splitting types, symmetric horizontal splitting and symmetric vertical splitting, in the BT splitting. In each case, a node is split by dividing the node down the middle, either horizontally or vertically. The BT leaf nodes are called CUs, and that segmentation is used for prediction and transform processing without any further partitioning. This means that the CU, PU and TU have the same block size in the QTBT coding block structure. A CU sometimes consists of coding blocks of different color components, e.g. one CU contains one luma coding block and two chroma coding blocks in the case of P and B slices of the 4:2:0 chroma format and sometimes consists of a coding block of a single component, e.g., one CU contains only one luma coding block or just two chroma coding blocks in the case of intra-slices (I slices).

The following parameters are defined for the QTBT partitioning scheme.
   CTU size: the root node size of a QT, the same concept as in HEVC
   MinQTSize: the minimum allowed QT leaf node size
   MaxBTSize: the maximum allowed BT root node size
   MaxBTDepth: the maximum allowed BT depth
   MinBTSize: the minimum allowed BT leaf node size.

In one example of the QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The QT partitioning is applied to the CTU first to generate QT leaf nodes. The QT leaf nodes may have a size from 16×16 (i.e., the MinQTSize) to 128×128 (i.e., the CTU size). When the QT node has size equal to MinQTSize, no further QT is considered. If the leaf QT node is 128×128, it will not be further split by the BT since the size exceeds the MaxBTSize (i.e., 64×64). Otherwise, the leaf QT node could be further partitioned by the BT. Therefore, the QT leaf node is also the root node for the BT and it has the BT depth as 0. When the BT depth reaches MaxBTDepth (i.e., 4), no further splitting is considered. When the BT node has width equal to MinBTSize (i.e., 4), no further horizontal splitting is considered. Similarly, when the BT node has height equal to MinBTSize, no further vertical splitting is considered. The leaf nodes of the BT are further processed by prediction and transform processing without any further partitioning. In the JEM, the maximum CTU size is 256×256 luma samples. The leaf nodes of the BT (i.e., the CUs) may be further processed (e.g., by performing a prediction process and a transform process) without any further partitioning.

Figure 11A:
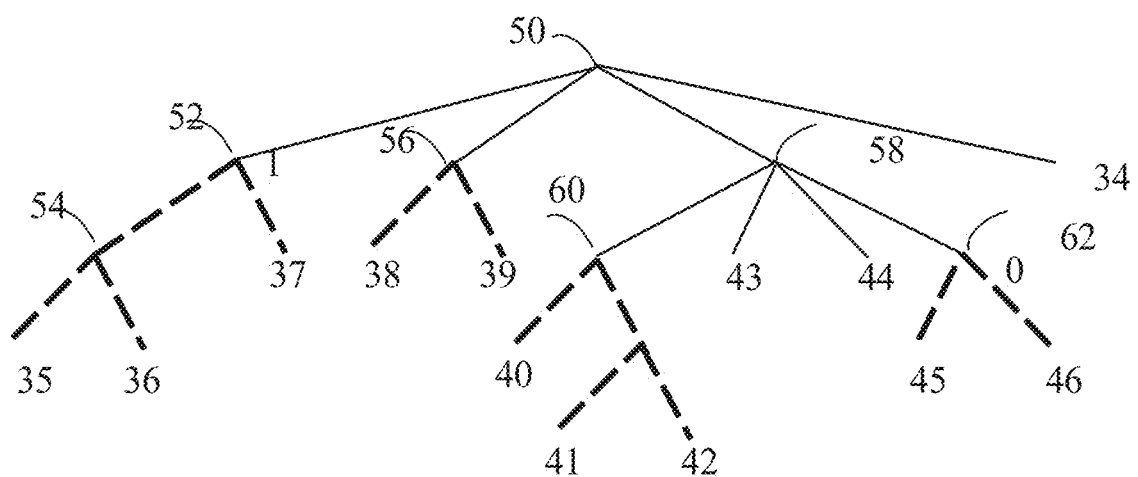
FIG. 11A illustrates a diagram of an example of tree structure corresponding to the block partitioning using the QTBT structure of FIG. 10.

FIG. 10 illustrates an example of a block 30 (e.g., a CTB) partitioned using QTBT partitioning techniques. As shown in FIG. 10, using QTBT partition techniques, each of the blocks is split symmetrically through the center of each block. FIG. 11A illustrates the tree structure corresponding to the block partitioning of FIG. 11B and FIG. 11C. The solid lines in FIG. 11A indicate QT splitting and dotted lines indicate BT splitting. In one example, in each splitting (i.e., non-leaf) node of the BT, a syntax element (e.g., a flag) is signaled to indicate the type of splitting performed (e.g., horizontal or vertical), where 0 indicates horizontal splitting and 1 indicates vertical splitting. For the QT splitting, there is no need to indicate the splitting type, as QT splitting always splits a block horizontally and vertically into 4 sub-blocks with an equal size.

Figure 4:
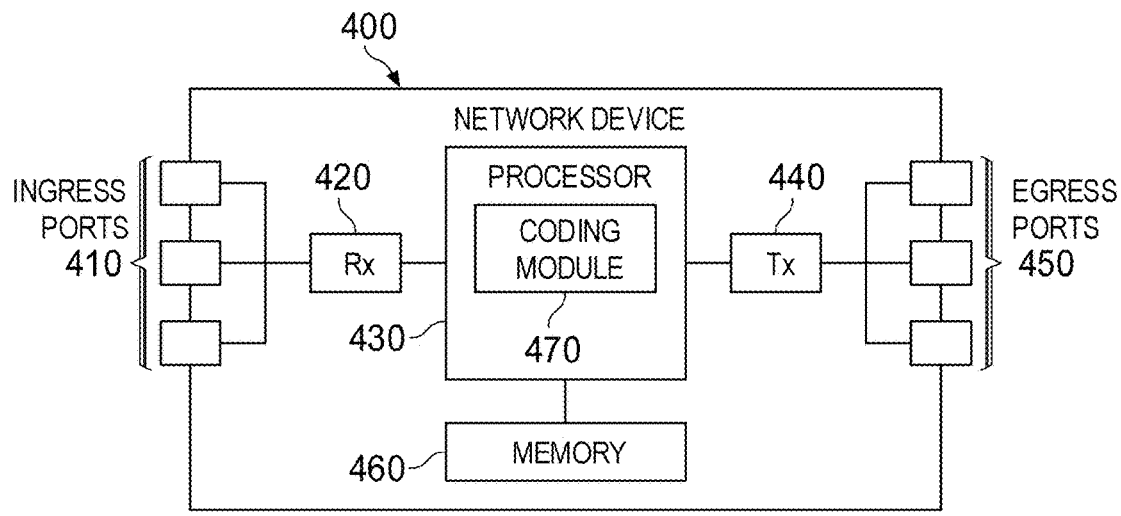
FIG. 4 is a schematic diagram of a network device.

As shown in FIG. 11A, at node 50, block 30 is split into the four blocks 31, 32, 33, and 34, shown in FIG. 10, using QT partitioning. Block 34 is not further split, and is therefore a leaf node. At node 52, block 31 is further split into two blocks using BT partitioning. As shown in FIG. 4, node 52 is marked with a 1, indicating vertical splitting. As such, the splitting at node 52 results in block 37 and the block including both blocks 35 and 36. Blocks 35 and 36 are created by a further vertical splitting at node 54. At node 56, block 32 is further split into two blocks 38 and 39 using BT partitioning.

At node 58, block 33 is split into 4 equal size blocks using QT partitioning. Blocks 43 and 44 are created from this QT partitioning and are not further split. At node 60, the upper left block is first split using vertical BT splitting resulting in block 40 and a right vertical block. The right vertical block is then split using horizontal BT splitting into blocks 41 and 42. The lower right block created from the QT splitting at node 58, is split at node 62 using horizontal BT splitting into blocks 45 and 46. As shown in FIG. 11A, node 62 is marked with a 0, indicating vertical splitting.

In addition, the QTBT scheme supports the ability for the luma and chroma to have a separate QTBT structure. Currently, for P and B slices, the luma and chroma CTBs in one CTU may share the same QTBT structure. However, for I slices, the luma CTB is partitioned into CUs by a QTBT structure, and the chroma CTBs may be partitioned into chroma CUs by another QTBT structure. This means that a CU in an I slice consists of a coding block of the luma component or coding blocks of two chroma components, and a CU in a P or B slice consists of coding blocks of all three color components.

The encoder 200 applies a rate-distortion optimization (RDO) process for the QTBT structure to determine the block partitioning.

In addition, a block partitioning structure named multi-type-tree (MTT) is proposed in U.S. Patent Application Publication No. 20170208336 to replace QT, BT, and/or QTBT based CU structures. The MTT partitioning structure is still a recursive tree structure. In MTT, multiple different partition structures (e.g., three or more) are used. For example, according to the MTT techniques, three or more different partition structures may be used for each respective non-leaf node of a tree structure, at each depth of the tree structure.

The depth of a node in a tree structure may refer to the length of the path (e.g., the number of splits) from the node to the root of the tree structure. A partition structure may generally refer to how many different blocks a block may be divided into. A partition structure may be, for example, a QT partitioning structure where a block may be divided into four blocks, a BT partitioning structure where a block may be divided into two blocks, or a TT partitioning structure where a block may be divided into three blocks, furthermore, TT partitioning structure may be without dividing the block through the center. A partition structure may have multiple different partition types. A partition type may additionally define how a block is divided, including symmetric or asymmetric partitioning, uniform or non-uniform partitioning, and/or horizontal or vertical partitioning.

In MTT, at each depth of the tree structure, encoder 200 may be configured to further split sub-trees using a particular partition type from among one of three more partitioning structures. For example, encoder 100 may be configured to determine a particular partition type from QT, BT, TT and other partitioning structures. In one example, the QT partitioning structure may include square QT or rectangular QT partitioning types. Encoder 200 may partition a square block using square QT partitioning by dividing the block, down the center both horizontally and vertically, into four equal-sized square blocks. Likewise, encoder 200 may partition a rectangular (e.g., non-square) block using rectangular QT partition by dividing the rectangular block, down the center both horizontally and vertically, into four equal-sized rectangular blocs.

The BT partitioning structure may include at least one of horizontal symmetric BT, vertical symmetric BT, horizontal non-symmetric BT, or vertical non-symmetric BT partition types. For the horizontal symmetric BT partition type, encoder 200 may be configured to split a block, down the center of the block horizontally, into two symmetric blocks of the same size. For the vertical symmetric BT partition type, encoder 200 may be configured to split a block, down the center of the block vertically, into two symmetric blocks of the same size. For the horizontal non-symmetric BT partition type, encoder 100 may be configured to split a block, horizontally, into two blocks of differing size. For example, one block may be ¼ the size of the parent block and the other block may be ¾ the size of the parent blocks, similar to the PART_2N×nU or PART_2N×nD partition type. For the vertical non-symmetric BT partition type, encoder 100 may be configured to split a block, vertically, into two blocks of differing size. For example, one block may be ¼ the size of the parent block and the other block may be ¾ the size of the parent blocks, similar to the PART_nL×2N or PART_nR×2N partition type. In other examples, an asymmetric BT partition type may divide a parent block into different size fractions. For example, one sub-block may be ⅜ of the parent block and the other sub-block may be ⅝ of the parent block. Of course, such a partition type may be either vertical or horizontal.

The TT partition structure differs from that of the QT or BT structures, in that the TT partition structure does not split a block down the center. The center region of the block remains together in the same sub-block. Different from QT, which produces four blocks, or BT, which produces two blocks, splitting according to a TT partition structure produces three blocks. Example partition types according to the TT partition structure include symmetric partition types (both horizontal and vertical), as well as asymmetric partition types (both horizontal and vertical). Furthermore, the symmetric partition types according to the TT partition structure may be uneven/non-uniform or even/uniform. The asymmetric partition types according to the TT partition structure are uneven/non-uniform. In one example, a TT partition structure may include at least one of the following partition types horizontal even/uniform symmetric TT, vertical even/uniform symmetric TT, horizontal uneven/non-uniform symmetric TT, vertical uneven/non-uniform symmetric TT, horizontal uneven/non-uniform asymmetric TT, or vertical uneven/non-uniform asymmetric TT partition types.

In general, an uneven/non-uniform symmetric TT partition type is a partition type that is symmetric about a center line of the block, but where at least one of the resultant three blocks is not the same size as the other two. One preferred example is where the side blocks are ¼ the size of the block, and the center block is ½ the size of the block. An even/uniform symmetric TT partition type is a partition type that is symmetric about a center line of the block, and the resultant blocks are all the same size. Such a partition is possible if the block height or width, depending on a vertical or horizontal split, is a multiple of 3. An uneven/non-uniform asymmetric TT partition type is a partition type that is not symmetric about a center line of the block, and where at least one of the resultant blocks is not the same size as the other two.

Figure 11B:
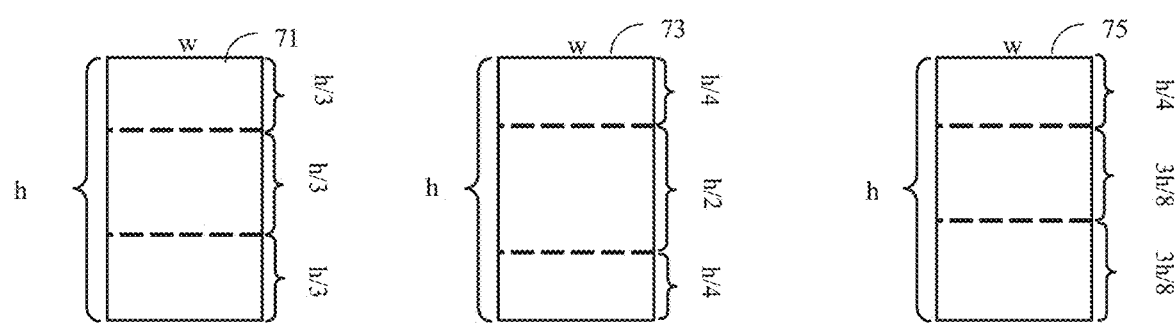
FIG. 11B illustrates a diagram of an example of horizontal TT partition types.
Figure 11C:
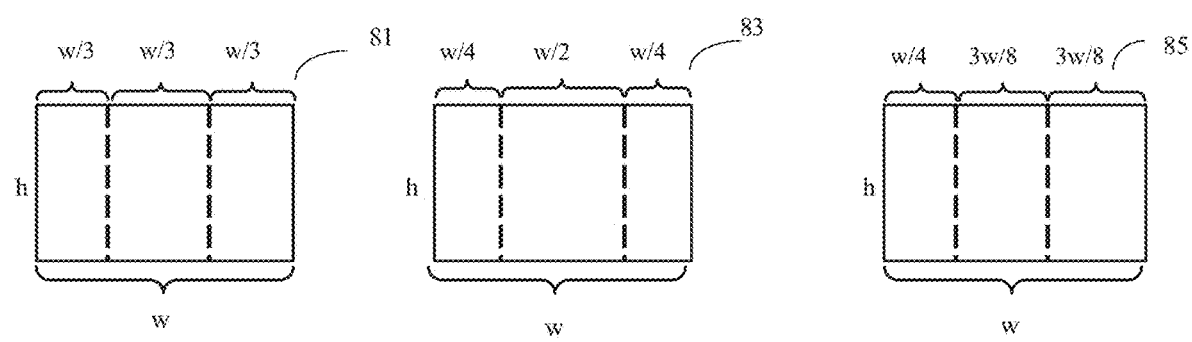
FIG. 11C illustrates a diagram of an example of vertical TT partition types.

FIG. 11B is a conceptual diagram illustrating example horizontal TT partition types. FIG. 11C is a conceptual diagram illustrating example vertical TT partition types. In both FIG. 11B and FIG. 11C, h represents the height of the block in luma or chroma samples and w represents the width of the block in luma or chroma samples. Note that the respective center line of a block do not represent the boundary of the block (i.e., the TT partitions do not spit a block through the center line). Rather, the center line\ are used to depict whether or not a particular partition type is symmetric or asymmetric relative to the center line of the original block. The center line are also along the direction of the split.

As shown in FIG. 11B, block 71 is partitioned with a horizontal even/uniform symmetric partition type. The horizontal even/uniform symmetric partition type produces symmetrical top and bottom halves relative to the center line of block 71. The horizontal even/uniform symmetric partition type produces three sub-blocks of equal size, each with a height of h/3 and a width of w. The horizontal even/uniform symmetric partition type is possible when the height of block 71 is evenly divisible by 3.

Block 73 is partitioned with a horizontal uneven/non-uniform symmetric partition type. The horizontal uneven/non-uniform symmetric partition type produces symmetrical top and bottom halves relative to the center line of block 73. The horizontal uneven/non-uniform symmetric partition type produces two blocks of equal size (e.g., the top and bottom blocks with a height of h/4), and a center block of a different size (e.g., a center block with a height of h/2). In one example, according to the horizontal uneven/non-uniform symmetric partition type, the area of the center block is equal to the combined areas of the top and bottom blocks. In some examples, the horizontal uneven/non-uniform symmetric partition type may be preferred for blocks having a height that is a power of 2 (e.g., 2, 4, 8, 16, 32, etc.).

Block 75 is partitioned with a horizontal uneven/non-uniform asymmetric partition type. The horizontal uneven/non-uniform asymmetric partition type does not produce a symmetrical top and bottom half relative to the center line of block 75 (i.e., the top and bottom halves are asymmetric). In the example of FIG. 7, the horizontal uneven/non-uniform asymmetric partition type produces a top block with height of h/4, a center block with height of 3h/8, and a bottom block with a height of 3h/8. Of course, other asymmetric arrangements may be used.

As shown in FIG. 11C, block 81 is partitioned with a vertical even/uniform symmetric partition type. The vertical even/uniform symmetric partition type produces symmetrical left and right halves relative to the center line of block 81. The vertical even/uniform symmetric partition type produces three sub-blocks of equal size, each with a width of w/3 and a height of h. The vertical even/uniform symmetric partition type is possible when the width of block 81 is evenly divisible by 3.

Block 83 is partitioned with a vertical uneven/non-uniform symmetric partition type. The vertical uneven/non-uniform symmetric partition type produces symmetrical left and right halves relative to the center line of block 83. The vertical uneven/non-uniform symmetric partition type produces symmetrical left and right halves relative to the center line of 83. The vertical uneven/non-uniform symmetric partition type produces two blocks of equal size (e.g., the left and right blocks with a width of w/4), and a center block of a different size (e.g., a center block with a width of w/2). In one example, according to the vertical uneven/non-uniform symmetric partition type, the area of the center block is equal to the combined areas of the left and right blocks. In some examples, the vertical uneven/non-uniform symmetric partition type may be preferred for blocks having a width that is a power of 2 (e.g., 2, 4, 8, 16, 32, etc.).

Block 85 is partitioned with a vertical uneven/non-uniform asymmetric partition type. The vertical uneven/non-uniform asymmetric partition type does not produce a symmetrical left and right half relative to the center line of block 85 (i.e., the left and right halves are asymmetric). In the example of FIG. 8, the vertical uneven/non-uniform asymmetric partition type produces a left block with width of w/4, a center block with width of 3w/8, and a bottom block with a width of 3w/8. Of course, other asymmetric arrangements may be used.

In examples where a block (e.g., at a sub-tree node) is split to a non-symmetric TT partition type, encoder 200 and/or decoder 300 may apply a restriction such that two of the three partitions have the same size. Such a restriction may correspond to a limitation to which encoder 200 must comply when encoding video data. Furthermore, in some examples, encoder 200 and decoder 300 may apply a restriction whereby the sum of the area of two partitions is equal to the area of the remaining partition when splitting according to a non-symmetric TT partition type.

In some examples, encoder 200 may be configured to select from among all the of the aforementioned partition types for each of the QT, BT, and TT partition structures. In other examples, encoder 200 may be configured to only determine a partition type from among a subset of the aforementioned partition types. For example, a subset of the above-discussed partition types (or other partition types) may be used for certain block sizes or for certain depths of a QT structure. The subset of supported partition types may be signaled in the bitstream for use by decoder 200 or may be predefined such that encoder 200 and decoder 300 may determine the subsets without any signaling.

In other examples, the number of supported partitioning types may be fixed for all depths in all CTUs. That is, encoder 200 and decoder 300 may be preconfigured to use the same number of partitioning types for any depth of a CTU. In other examples, the number of supported partitioning types may vary and may be dependent on depth, slice type, or other previously coded information. In one example, at depth 0 or depth 1 of the tree structure, only the QT partition structure is used. At depths greater than 1, each of the QT, BT, and TT partition structures may be used.

In some examples, encoder 200 and/or decoder 300 may apply preconfigured constraints on supported partitioning types in order to avoid duplicated partitioning for a certain region of a video picture or region of a CTU. In one example, when a block is split with non-symmetric partition type, encoder 200 and/or decoder 300 may be configured to not further split the largest sub-block that is split from the current block. For example, when a square block is split according to a non-symmetric partition type (similar to the PART_2N×nU partition type), the largest sub-block among all sub-blocks (similar to the largest sub-block of PART_2N×nU partition type) is the noted leaf node and cannot be further split. However, the smaller sub-block (similar to the smaller sub-block of PART_2N×nU partition type) can be further split.

As another example where constraints on supported partitioning types may be applied to avoid duplicated partitioning for a certain region, when a block is split with non-symmetric partition type, the largest sub-block that is split from the current block cannot be further split in the same direction. For example, when a square block is split non-symmetric partition type (similar to the PART_2N×nU partition type), encoder 200 and/or 3ecoder 200 may be configured to not split the large sub-block among all sub-blocks (similar to the largest sub-block of PART_2N×nU partition type) in the horizontal direction.

As another example where constraints on supported partitioning types may be applied to avoid difficulty in further splitting, encoder 200 and/or decoder 300 may be configured to not split a block, either horizontally or vertically, when the width/height of a block is not a power of 2 (e.g., when the width height is not 2, 4, 8, 16, etc.).

The above examples describe how encoder 200 may be configured to perform MTT partitioning. Decoder 300 may also then apply the same MTT partitioning as was performed by encoder 200. In some examples, how a picture of video data was partitioned by encoder 200 may be determined by applying the same set of predefined rules at decoder 300. However, in many situations, encoder 200 may determine a particular partition structure and partition type to use based on rate-distortion criteria for the particular picture of video data being coded. As such, in order for decoder 300 to determine the partitioning for a particular picture, encoder 200 may signal syntax elements in the encoded bitstream that indicate how the picture, and CTUs of the picture, are to be partitioned. Decoder 200 may parse such syntax elements and partition the picture and CTUs accordingly.

In one example, the prediction processing unit 260 of video encoder 200 may be configured to perform any combination of the partitioning techniques described above, especially, for the motion estimation, and the details will be described later.

Like the picture 201, the block 203 again is or can be regarded as a two-dimensional array or matrix of samples with intensity values (sample values), although of smaller dimension than the picture 201. In other words, the block 203 may comprise, e.g., one sample array (e.g. a luma array in case of a monochrome picture 201) or three sample arrays (e.g. a luma and two chroma arrays in case of a color picture 201) or any other number and/or kind of arrays depending on the color format applied. The number of samples in horizontal and vertical direction (or axis) of the block 203 define the size of block 203.

Encoder 200 as shown in FIG. 2 is configured encode the picture 201 block by block, e.g. the encoding and prediction is performed per block 203.

Residual Calculation.

The residual calculation unit 204 is configured to calculate a residual block 205 based on the picture block 203 and a prediction block 265 (further details about the prediction block 265 are provided later), e.g. by subtracting sample values of the prediction block 265 from sample values of the picture block 203, sample by sample (pixel by pixel) to obtain the residual block 205 in the sample domain.

Transform.

The transform processing unit 206 is configured to apply a transform, e.g. a discrete cosine transform (DCT) or discrete sine transform (DST), on the sample values of the residual block 205 to obtain transform coefficients 207 in a transform domain. The transform coefficients 207 may also be referred to as transform residual coefficients and represent the residual block 205 in the transform domain.

The transform processing unit 206 may be configured to apply integer approximations of DCT/DST, such as the transforms specified for HEVC/H.265. Compared to an orthogonal DCT transform, such integer approximations are typically scaled by a certain factor. In order to preserve the norm of the residual block which is processed by forward and inverse transforms, additional scaling factors are applied as part of the transform process. The scaling factors are typically chosen based on certain constraints like scaling factors being a power of two for shift operation, bit depth of the transform coefficients, tradeoff between accuracy and implementation costs, etc. Specific scaling factors are, for example, specified for the inverse transform, e.g. by inverse transform processing unit 212, at a decoder 300 (and the corresponding inverse transform, e.g. by inverse transform processing unit 212 at an encoder 20) and corresponding scaling factors for the forward transform, e.g. by transform processing unit 206, at an encoder 200 may be specified accordingly.

Quantization.

The quantization unit 208 is configured to quantize the transform coefficients 207 to obtain quantized transform coefficients 209, e.g. by applying scalar quantization or vector quantization. The quantized transform coefficients 209 may also be referred to as quantized residual coefficients 209. The quantization process may reduce the bit depth associated with some or all of the transform coefficients 207. For example, an n-bit Transform coefficient may be rounded down to an m-bit Transform coefficient during quantization, where n is greater than m. The degree of quantization may be modified by adjusting a quantization parameter (QP). For example for scalar quantization, different scaling may be applied to achieve finer or coarser quantization. Smaller quantization step sizes correspond to finer quantization, whereas larger quantization step sizes correspond to coarser quantization. The applicable quantization step size may be indicated by a QP. The QP may for example be an index to a predefined set of applicable quantization step sizes. For example, small QPs may correspond to fine quantization (small quantization step sizes) and large QPs may correspond to coarse quantization (large quantization step sizes) or vice versa. The quantization may include division by a quantization step size and corresponding or inverse dequantization, e.g. by inverse quantization 210, may include multiplication by the quantization step size. Embodiments according to some standards, e.g. HEVC, may be configured to use a QP to determine the quantization step size. Generally, the quantization step size may be calculated based on a QP using a fixed point approximation of an equation including division. Additional scaling factors may be introduced for quantization and dequantization to restore the norm of the residual block, which might get modified because of the scaling used in the fixed point approximation of the equation for quantization step size and QP. In one example implementation, the scaling of the inverse transform and dequantization might be combined. Alternatively, customized quantization tables may be used and signaled from an encoder to a decoder, e.g. in a bitstream. The quantization is a lossy operation, wherein the loss increases with increasing quantization step sizes.

The inverse quantization unit 210 is configured to apply the inverse quantization of the quantization unit 208 on the quantized coefficients to obtain dequantized coefficients 211, e.g. by applying the inverse of the quantization scheme applied by the quantization unit 208 based on or using the same quantization step size as the quantization unit 208. The dequantized coefficients 211 may also be referred to as dequantized residual coefficients 211 and correspond—although typically not identical to the transform coefficients due to the loss by quantization—to the transform coefficients 207.

The inverse transform processing unit 212 is configured to apply the inverse transform of the transform applied by the transform processing unit 206, e.g. an inverse DCT or inverse DST, to obtain an inverse transform block 213 in the sample domain. The inverse transform block 213 may also be referred to as inverse transform dequantized block 213 or inverse transform residual block 213.

The reconstruction unit 214 (e.g. reconstruction 214) is configured to add the inverse transform block 213 (i.e. reconstructed residual block 213) to the prediction block 265 to obtain a reconstructed block 215 in the sample domain, e.g. by adding the sample values of the reconstructed residual block 213 and the sample values of the prediction block 265.

Optional, the buffer unit 216 (or short "buffer" 216), e.g. a line buffer 216, is configured to buffer or store the reconstructed block 215 and the respective sample values, for example for intra prediction. In further embodiments, the encoder may be configured to use unfiltered reconstructed blocks and/or the respective sample values stored in buffer unit 216 for any kind of estimation and/or prediction, e.g. intra prediction.

Embodiments of the encoder 200 may be configured such that, e.g. the buffer unit 216 is not only used for storing the reconstructed blocks 215 for intra prediction 254 but also for the loop filter unit 220 (not shown in FIG. 2), and/or such that, e.g. the buffer unit 216 and the decoded picture buffer unit 230 form one buffer. Further embodiments may be configured to use filtered blocks 221 and/or blocks or samples from the decoded picture buffer 230 (both not shown in FIG. 2) as input or basis for intra prediction 254.

The loop filter unit 220 (or short "loop filter" 220), is configured to filter the reconstructed block 215 to obtain a filtered block 221, e.g. to smooth pixel transitions, or otherwise improve the video quality. The loop filter unit 220 is intended to represent one or more loop filters such as a de-blocking filter, a sample-adaptive offset (SAO) filter or other filters, e.g. a bilateral filter or an adaptive loop filter (ALF) or a sharpening or smoothing filters or collaborative filters. Although the loop filter unit 220 is shown in FIG. 2 as being an in loop filter, in other configurations, the loop filter unit 220 may be implemented as a post loop filter. The filtered block 221 may also be referred to as filtered reconstructed block 221. Decoded picture buffer 230 may store the reconstructed coding blocks after the loop filter unit 220 performs the filtering operations on the reconstructed coding blocks.

Embodiments of the encoder 200 (respectively loop filter unit 220) may be configured to output loop filter parameters (such as SAO information), e.g. directly or entropy encoded via the entropy encoding unit 270 or any other entropy CU, so that, e.g., a decoder 300 may receive and apply the same loop filter parameters for decoding.

The decoded picture buffer 230 may be a reference picture memory that stores reference picture data for use in encoding video data by video encoder 20. The decoded picture buffer 230 may be formed by any of a variety of memory devices, such as DRAM, including synchronous DRAM (SDRAM), magneto-resistive random-access memory (MRAM), resistive random-access memory (RRAM), or other types of memory devices. The decoded picture buffer 230 and the buffer 216 may be provided by the same memory device or separate memory devices. In some example, the decoded picture buffer 230 is configured to store the filtered block 221. The decoded picture buffer 230 may be further configured to store other previously filtered blocks, e.g. previously reconstructed and filtered blocks 221, of the same current picture or of different pictures, e.g. previously reconstructed pictures, and may provide complete previously reconstructed, i.e. decoded, pictures (and corresponding reference blocks and samples) and/or a partially reconstructed current picture (and corresponding reference blocks and samples), for example for inter prediction. In some example, if the reconstructed block 215 is reconstructed but without in-loop filtering, the decoded picture buffer 230 is configured to store the reconstructed block 215.

The prediction processing unit 260, also referred to as block prediction processing unit 260, is configured to receive or obtain the block 203 (current block 203 of the current picture 201) and reconstructed picture data, e.g. reference samples of the same (current) picture from buffer 216 and/or reference picture data 231 from one or a plurality of previously decoded pictures from decoded picture buffer 230, and to process such data for prediction, i.e. to provide a prediction block 265, which may be an inter-predicted block 245 or an intra-predicted block 255.

Mode selection unit 262 may be configured to select a prediction mode (e.g. an intra or inter prediction mode) and/or a corresponding prediction block 245 or 255 to be used as prediction block 265 for the calculation of the residual block 205 and for the reconstruction of the reconstructed block 215.

Embodiments of the mode selection unit 262 may be configured to select the prediction mode (e.g. from those supported by prediction processing unit 260), which provides the best match or in other words the minimum residual (minimum residual means better compression for transmission or storage), or a minimum signaling overhead (minimum signaling overhead means better compression for transmission or storage), or which considers or balances both. The mode selection unit 262 may be configured to determine the prediction mode based on RDO, i.e. select the prediction mode which provides a minimum RDO or which associated rate distortion at least a fulfills a prediction mode selection criterion.

In the following the prediction processing (e.g. prediction processing unit 260 and mode selection (e.g. by mode selection unit 262) performed by an example encoder 200 will be explained in more detail.

As described above, the encoder 200 is configured to determine or select the best or an optimum prediction mode from a set of (pre-determined) prediction modes. The set of prediction modes may comprise, e.g., intra-prediction modes and/or inter-prediction modes.

The set of intra-prediction modes may comprise 35 different intra-prediction modes, e.g. non-directional modes like DC (or mean) mode and planar mode, or directional modes, e.g. as defined in H.265, or may comprise 67 different intra-prediction modes, e.g. non-directional modes like DC (or mean) mode and planar mode, or directional modes, e.g. as defined in H.266 under developing.

The set of (or possible) inter-prediction modes depend on the available reference pictures (i.e. previous at least partially decoded pictures, e.g. stored in decoded picture buffer 230) and other inter-prediction parameters, e.g. whether the whole reference picture or only a part, e.g. a search window area around the area of the current block, of the reference picture is used for searching for a best matching reference block, and/or e.g. whether pixel interpolation is applied, e.g. half/semi-pel and/or quarter-pel interpolation, or not.

Additional to the above prediction modes, skip mode and/or direct mode may be applied.

The prediction processing unit 260 may be further configured to partition the block 203 into smaller block partitions or sub-blocks, e.g. iteratively using QT-partitioning, BT partitioning or TT partitioning or any combination thereof, and to perform, e.g. the prediction for each of the block partitions or sub-blocks, wherein the mode selection comprises the selection of the tree-structure of the partitioned block 203 and the prediction modes applied to each of the block partitions or sub-blocks.

The inter PU 244 may include motion estimation unit and motion compensation unit (not shown in FIG. 2). The motion estimation unit is configured to receive or obtain the picture block 203 (current picture block 203 of the current picture 201) and a decoded picture 331, or at least one or a plurality of previously reconstructed blocks, e.g. reconstructed blocks of one or a plurality of other/different previously decoded pictures 331, for motion estimation. E.g. a video sequence may comprise the current picture and the previously decoded pictures 331, or in other words, the current picture and the previously decoded pictures 331 may be part of or form a sequence of pictures forming a video sequence. The encoder 200 may, e.g., be configured to select a reference block from a plurality of reference blocks of the same or different pictures of the plurality of other pictures and provide a reference picture (or reference picture index, . . . ) and/or an offset (spatial offset) between the position (x, y coordinates) of the reference block and the position of the current block as inter prediction parameters to the motion estimation unit (not shown in FIG. 2). This offset is also called MV. Merging is an important motion estimation tool used in HEVC and inherited to VVC. For performing the merge estimation, the first thing should be done is construct a merge candidate list where each of the candidate contains all motion data including the information whether one or two reference picture lists are used as well as a reference index and a motion vector for each list. The merge candidate list is constructed based on the following candidates a. up to four spatial merge candidates that are derived from five spatial neighboring blocks, b. one temporal merge candidate derived from two temporal, co-located blocks, c. additional merge candidates including combined bi-predictive candidates and zero MVCs.

The first candidates in the merge candidate list are the spatial neighbors. Up to four candidates are inserted in the merge list by sequentially checking A1, B1, B0, A0 and B2, in that order, according to the right part of FIG. 12.

Instead of just checking whether a coding block is available and contains motion information, some additional redundancy checks are performed before taking all the motion data of the coding block as a merge candidate. These redundancy checks can be divided into two categories for two different purposes a. avoid having candidates with redundant motion data in the list, b. prevent merging two partitions that could be expressed by other means which would create redundant syntax.

When N is the number of spatial merge candidates, a complete redundancy check would consist of $$\frac{N \cdot (N-1)}{2}$$

motion data comparisons. In case of the five potential spatial merge candidates, ten motion data comparisons would be needed to assure that all candidates in the merge list have different motion data. During the development of HEVC, the checks for redundant motion data have been reduced to a subset in a way that the coding efficiency is kept while the comparison logic is significantly reduced. In the final design, no more than two comparisons are performed per candidate resulting in five overall comparisons. Given the order of {A1, B1, B0, A0, B2}, B0 only checks B1, A0 only A1 and B2 only A1 and B1. In an embodiment of the partitioning redundancy check, the bottom PU of a 2N×N partitioning is merged with the top one by choosing candidate B1. This would result in one CU with two PUs having the same motion data which could be equally signaled as a 2N×2N CU. Overall, this check applies for all second PUs of the rectangular and asymmetric partitions 2N×N, 2N×nU, 2N×nD, N×2N, nR×2N and nL×2N. It is noted that for the spatial merge candidates, only the redundancy checks are performed and the motion data is copied from the candidate blocks as it is. Hence, no motion vector scaling is needed here.

The derivation of the motion vectors for the temporal merge candidate is the same as for the temporal motion vector prediction (TMVP). Since a merge candidate comprises all motion data and the TMVP is only one motion vector, the derivation of the whole motion data only depends on the slice type. For bi-predictive slices, a TMVP is derived for each reference picture list. Depending on the availability of the TMVP for each list, the prediction type is set to bi-prediction or to the list for which the TMVP is available. All associated reference picture indices are set equal to zero. Consequently for uni-predictive slices, only the TMVP for list 0 is derived together with the reference picture index equal to zero.

When at least one TMVP is available and the temporal merge candidate is added to the list, no redundancy check is performed. This makes the merge list construction independent of the co-located picture which improves error resilience. Consider the case where the temporal merge candidate would be redundant and therefore not included in the merge candidate list. In the event of a lost co-located picture, the decoder could not derive the temporal candidates and hence not check whether it would be redundant. The indexing of all subsequent candidates would be affected by this.

For parsing robustness reasons, the length of the merge candidate list is fixed. After the spatial and the temporal merge candidates have been added, it can happen that the list has not yet the fixed length. In order to compensate for the coding efficiency loss that comes along with the non-length adaptive list index signaling, additional candidates are generated. Depending on the slice type, up to two kind of candidates are used to fully populate the list a. Combined bi-predictive candidates, b. Zero MVCs.

In bi-predictive slices, additional candidates can be generated based on the existing ones by combining reference picture list 0 motion data of one candidate with and the list 1 motion data of another one. This is done by copying $\Delta x0$, $\Delta y0$, $\Delta t0$ from one candidate, e.g. the first one, and $\Delta x1$, $\Delta y1$, $\Delta t1$ from another, e.g. the second one. The different combinations are predefined and given in Table 1.1.

TABLE 1.1

| Combination Order | 0 | 1 | 2 | 3 | 4 | 5 | 6 | 7 | 8 | 9 | 10 | 11 |
|---|---|---|---|---|---|---|---|---|---|---|---|---|
| $\Delta x0$, $\Delta y0$, $\Delta t0$ from Cand. | 0 | 1 | 0 | 2 | 1 | 2 | 0 | 3 | 1 | 3 | 2 | 3 |
| $\Delta x1$, $\Delta y1$, $\Delta t1$ from Cand. | 1 | 0 | 2 | 0 | 2 | 1 | 3 | 0 | 3 | 1 | 3 | 2 |

When the list is still not full after adding the combined bi-predictive candidates, or for uni-predictive slices, zero MVCs are calculated to complete the list. All zero MVCs have one zero displacement motion vector for uni-predictive slices and two for bi-predictive slices. The reference indices are set equal to zero and are incremented by one for each additional candidate until the maximum number of reference indices is reached. If that is the case and there are still additional candidates missing, a reference index equal to zero is used to create these. For all the additional candidates, no redundancy checks are performed as it turned out that omitting these checks will not introduce a coding efficiency loss.

For each PU coded in inter-picture prediction mode, a merge_flag indicates that block merging is used to derive the motion data. The merge_idx further determines the candidate in the merge list that provides all the motion data needed for the motion-compensated prediction (MCP). Besides this PU-level signaling, the number of candidates in the merge list is signaled in the slice header. Since the default value is five, it is represented as a difference to five (five_minus_max_num_merge_cand). That way, the five is signaled with a short codeword for the 0 whereas using only one candidate, is signaled with a longer codeword for the 4. Regarding the impact on the merge candidate list construction process, the overall process remains the same although it terminates after the list contains the maximum number of merge candidates. In the initial design, the maximum value for the merge index coding was given by the number of available spatial and temporal candidates in the list. When e.g. only two candidates are available, the index can be efficiently coded as a flag. In order to parse the merge index, the whole merge candidate list has to be constructed to know the actual number of candidates. Assuming unavailable neighboring blocks due to transmission errors, it would not be possible to parse the merge index anymore.

A crucial application of the block merging concept in HEVC is combination with a skip mode. In previous video coding standards, the skip mode was used to indicate for a block that the motion data is inferred instead of explicitly signaled and that the prediction residual is zero, i.e. no transform coefficients are transmitted. In HEVC, at the beginning of each CU in an inter-picture prediction slice, a skip_flag is signaled that implies the following a. the CU only contains one PU (2N×2N partition type), b. the merge mode is used to derive the motion data (merge_flag equal to 1), c. no residual data is present in the bitstream.

Figure 6:
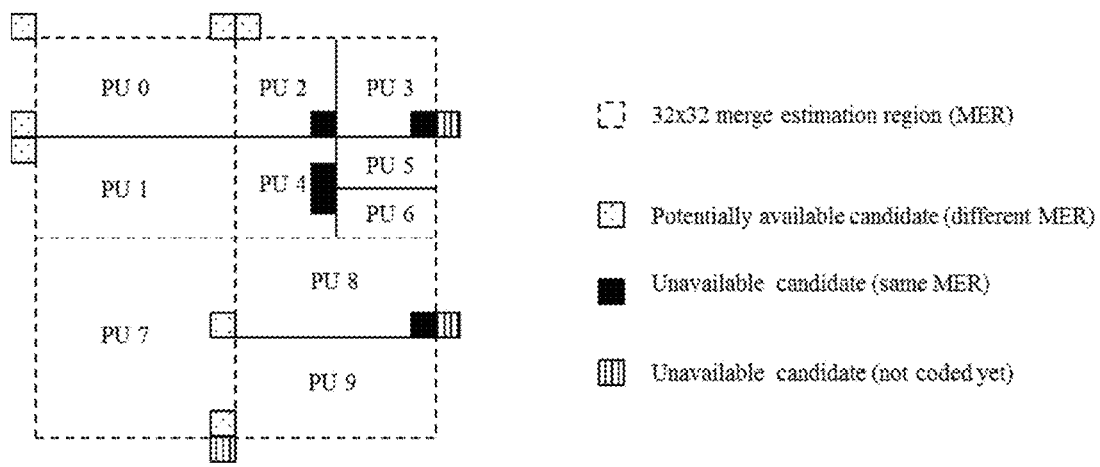
FIG. 6 illustrates an MER based candidate block availability status during a merge estimation.

A parallel merge estimation level was introduced in HEVC, that indicates the region in which merge candidate lists can be independently derived, by checking whether a candidate block is located in that MER. A candidate block that is in the same MER is not included in the merge candidate list. Hence, its motion data does not need to be available at the time of the list construction. When this level is e.g. 32, all PUs in a 32×32 area can construct the merge candidate list in parallel, since all merge candidates that are in the same 32×32 MER, are not inserted in the list. As shown in FIG. 6, there is a CTU partitioning with seven CUs and ten PUs. All potential merge candidates for the first PU0 are available because they are outside the first 32×32 MER. For the second MER, merge candidate lists of PUs 2-6 cannot include motion data from these PUs when the merge estimation inside that MER should be independent. Therefore, when looking at a PU5 for example, no merge candidates are available and hence not inserted in the merge candidate list. In that case, the merge list of PU5 consists only of the temporal candidate (if available) and zero MV candidates. In order to enable an encoder to trade-off parallelism and coding efficiency, the parallel merge estimation level is adaptive and signaled as log 2_parallel_merge_level_minus2 in the picture parameter set.

However, as discussed before, the parallel merge estimation level that is used in HEVC is not efficient anymore, because the VVC introduces more partitions modes which results irregular (no-square) coding blocks, which will hinder the parallel processing for merge estimation of the coding blocks.

The present disclosure provides several solutions to resolve the problems as discussed above.

Solution 1.

Figure 13:
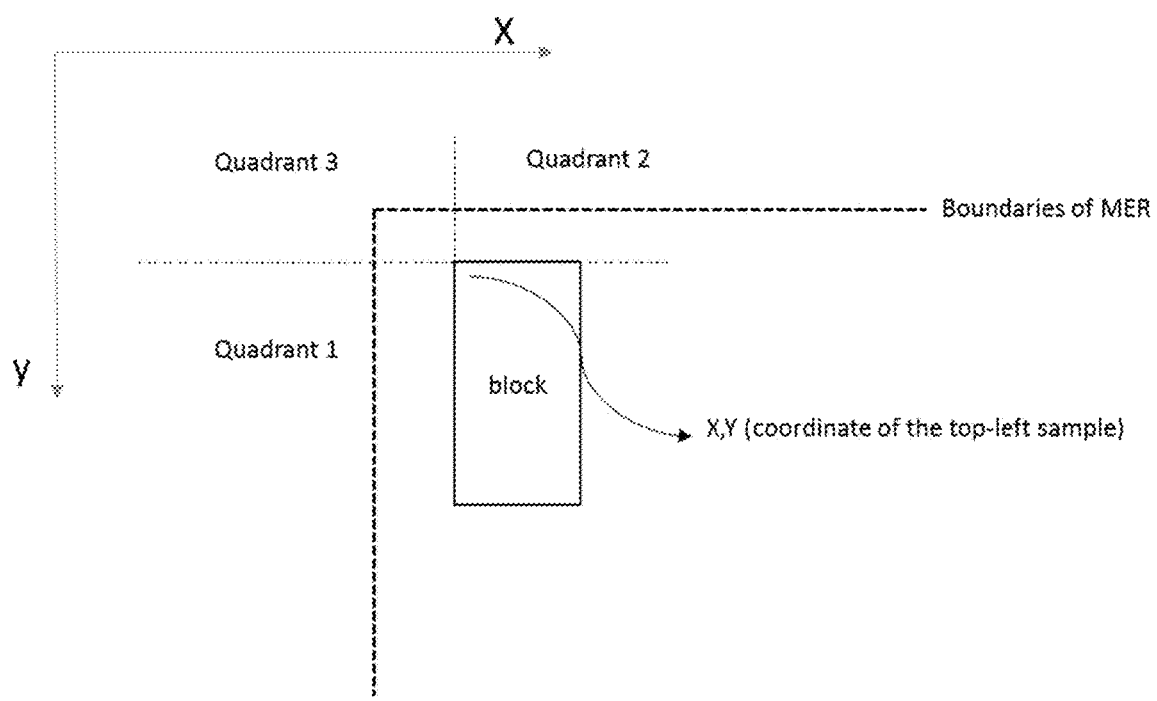
FIG. 13 illustrates a diagram of an example of quadrant partitions for the present disclosure.

FIG. 13 shows a scenario where the present disclosure is applied. The block shown in the FIG. 13 is a current coding block to be merge estimated. The bold dash line is the boundary of a MER for the current coding block, and the thin dash lines are auxiliary lines used for easily referring the locations in that FIG. 13. In the solution 1, a set of new MER conditions is provided. Before the new MER conditions are applied, it is assumed that the top-left coordinate of the current block is [X, Y], and the top-left coordinate of second block is [X2, Y2]. The second block is referred also to the candidate (coding) block. The second block is initially marked/set as available for prediction, which means the second block is in the same picture as the current block, and in the same slice, and is an inter-predicted block. This means that the second block/candidate block may be used in general for prediction of the current (coding) block. Then, the new MER conditions is assume that the [X,Y] are the top-left coordinate of the current block. Assume [X2, Y2] are the top-left coordinate of a second block. First set second block "available for prediction". If [X−1,Y] and [X,Y] are in the same MER, and if X2<X and Y2>=Y, motion information candidates of second block are set unavailable for prediction (quadrant 1). If [X,Y−1] and [X,Y] are in the same MER, and if Y2<Y and X2>=X, motion information candidates of second block are set unavailable for prediction (quadrant 2). If [X−1,Y−1] and [X,Y] are in the same MER, and if Y2<Y and X2<X, motion information candidates of second block are set unavailable for prediction (quadrant 3).

The quadrants 1, 2, and 3 correspond to the extended MER, and the above conditions test whether or not the candidate/second block is within the extended MER.

It is noted that throughout the application it is assumed that the value of x increases from left to right along the horizontal x-axis. The value of y increases from top to bottom along the vertical y-axis.

By the new MER conditions, the dependency with respect to a processing order between the current block and the second block can be broken by setting the second block as unavailable for prediction if the condition is met, which allows the current block and the second block to be processed in a parallel way thereby overcoming the technical problem discussed above. It is noted that the new MER condition breaks both direct and indirect dependencies between the current block and the second block. In other words, if the processing order of blocks are given by second block→a third block→current block, the new MER condition not only breaks the prediction dependency between current block and the second block, also breaks the dependency between the third block and the current block. The following embodiment can exemplify how this new MER conditions works.

Figure 12:
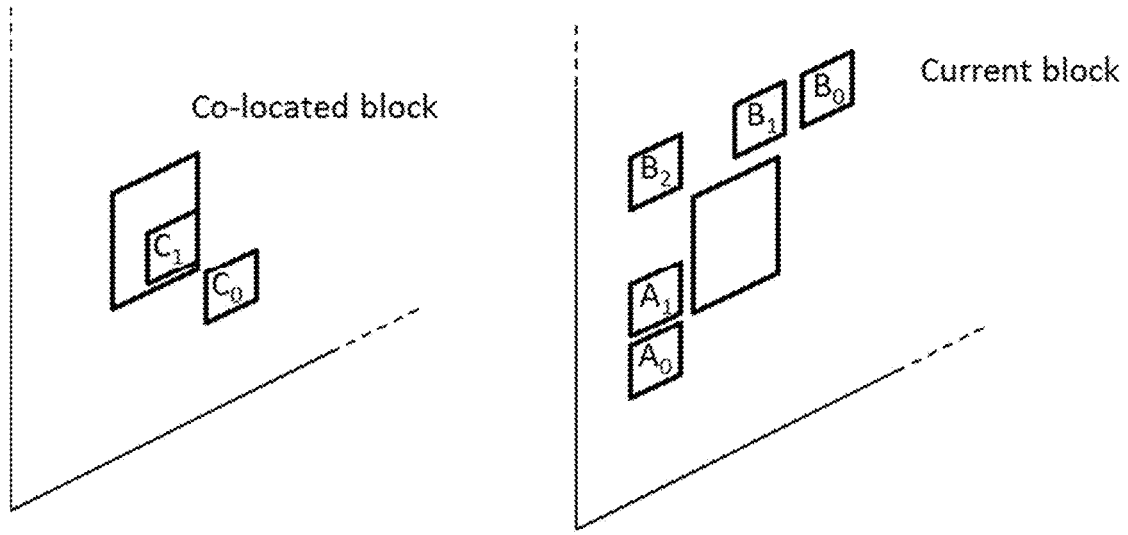
FIG. 12 illustrates potential merge estimation coding blocks in spatial and temporal domains.

In VVC, the merge estimation scheme is mostly inherited from HEVC, and the potential candidate coding blocks in spatial domain (in the other words, the blocks within the same picture) to be used to derive MVs, therefrom to construct a MV candidate list for the inter prediction of a current coding block, those blocks are shown in FIG. 12. Namely, during the merge estimation of a current block, blocks A1, A0, B1, B0, and B2 will be checked in turn to construct a candidate list. A candidate list for a current block is first constructing a spatial candidate list, then a temporal candidate list, and finally additional merge candidates.

The spatial candidate list is constructed by sequentially checking the blocks A1, B1, B0, A0 and B2, in that order, and up to four spatial merge candidates that are derived from A1, B1, B0, A0 and B2.

More specifically, the spatial candidates list is constructed based on the following rule.

(a). When the current candidate coding block is the coding block A1, check the availability of the coding block A1 based on the solution 1 or the following solutions 2~4, and when the coding block A1 is not marked as unavailable (i.e. A1 is marked as being available), then add the MV of the coding block A1 to the motion vector list.

(b). when the current candidate coding block is the coding block B1, check the availability of the coding block B1 based on the solution 1 or the following solutions 2~4, and when the coding block B1 is not marked as unavailable (i.e. B1 is marked as being available), add the MV of the coding block B1 to the motion vector list.

(c). when the current candidate coding block is the coding block B0, check the availability of the coding block B0 based on the solution 1 or the following solutions 2~4, and when the coding block B0 is not marked as unavailable (i.e. B0 is marked as being available), and the MV is different from the MV of the coding block B1 that has been added to the motion vector list, add the motion vector predictor of the coding block B0 to the motion vector list.

(d). when the current candidate coding block is the coding block A0, check the availability of the coding block A0 based on the solution 1 or the following solutions 2~4, and when the coding block A0 is not marked as unavailable (i.e. A0 is marked as being available), and the MV is different from the MV of the coding block A1 that has been added to the motion vector list, add the MV of the coding block A0 to the motion vector list.

(e). when the current candidate coding block is the coding block B2, check the availability of the coding block A0 based on the solution 1 or the following solutions 2~4, and when the coding block A0 is not marked as unavailable (i.e. A0 is marked as being available), and the MV is different from both the MV, of the coding block A1 that has been added to the motion vector list, and the MV, of the coding block B1 that has been added to the motion vector list, and the MV of the coding block A1, add MV of the coding block B2 to the motion vector list.

The spatial candidates list is derived from two temporal, co-located blocks.

The additional merge candidates includes combined bi-predictive candidates and zero MVCs.

As long as the merge candidate list is built, a merge estimation is carried based on each of the MV included in the candidate list, by using an RDO rule or another measure to find the optimal MV as the MV or MV predictor of a current coding block, and the index of the MV within the merge candidate list will added into the bit-stream, to have the decoding side know which MV is the one used for inter-predicting the current block. It should be noted that the number of the spatial merge candidates is not limited to 4 as used in HEVC, it can be changed and signaled in the bit stream to the decoding side. The potential candidate coding blocks used to build the spatial candidate list for a current coding block is not fixed, it can be changed based on any positive gain observed.

Figure 14:
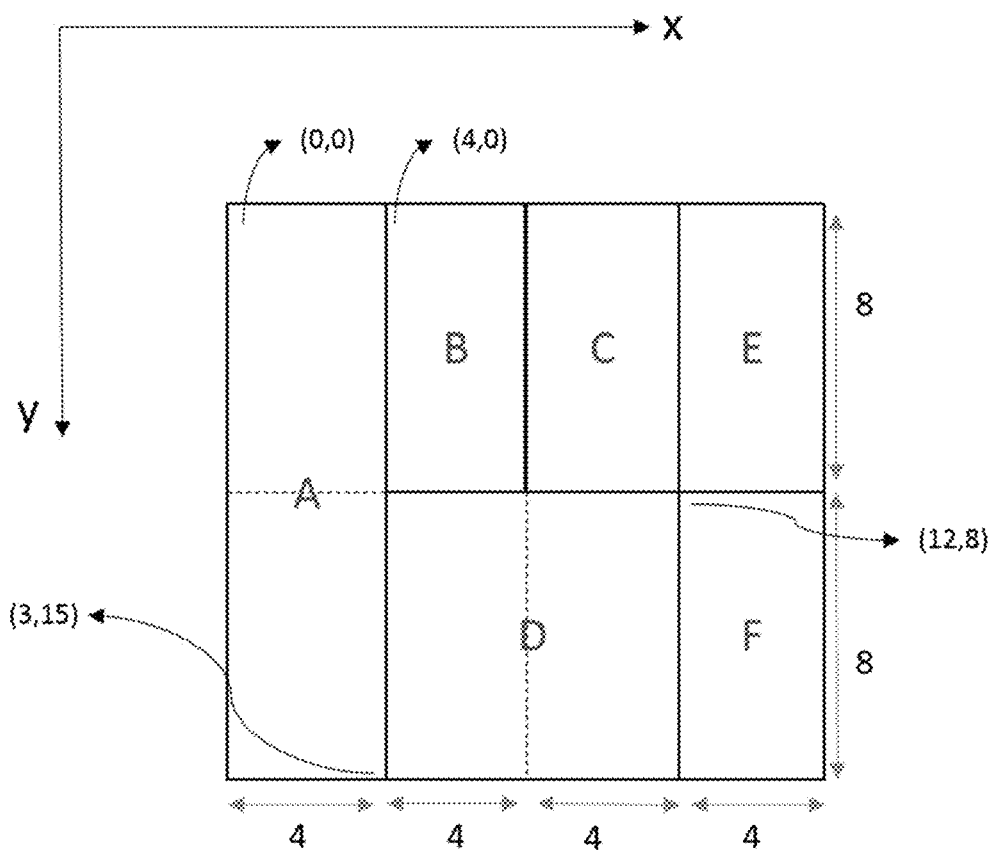
FIG. 14 illustrates a diagram of an example of block partitions of an MER where the present disclosure applied.

FIG. 14 shows a partition result of a picture block with size of 16×16, the dashed line indicate the MER grid which is a size of 8×8. The picture block is partitioned into A~F coding blocks (The processing order of the blocks are A→B→C→D→F). The top-left coordinates of blocks A, B and F are respectively marked in the FIG. 14 as (0, 0), (4, 0), (12, 8). The bottom right coordinate of block A is also marked (3, 15). The widths and heights are also shown in the figure. Based on the new MER of the present disclosure, block B can be processed in parallel with block A, as the top-left coordinates are in the same MER. This is guaranteed by the fact that, the motion information of block A is marked as unavailable for prediction by block B by using the MER condition, therefore the processing of block B does not need to wait the motion information of block A to become available, hence both blocks can be processed at the same time.

Moreover the blocks C and E can also be processed in parallel according to the rule "If [X−1,Y] and [X,Y] are in the same MER, and if X2<X and Y2>=Y, motion information candidates of second block are set unavailable for prediction (quadrant 1)." In the rule, due to the processing order block E is the current block and block C is the second block. Accordingly both blocks C and D are set unavailable for prediction by block E. Which means block E can now be processed in parallel with block C, since no direct and indirect dependency exists. As a result, sever pairs of the blocks A to F can be processed in parallel, which can save the time consuming of the motion estimation, especially, the candidate list construction.

An alternative implementation of the solution 1 can be formulated as follows. The new MER conditions are assume that the [X,Y] are the top-left coordinate of the current block. Assume [X2, Y2] are the top-left coordinate of a second block. First set second block "available for prediction". If [X−1,Y] and [X,Y] are in the same MER, and if X2<X and Y2>=Y, motion information candidates of second block are set unavailable for prediction. If [X,Y−1] and [X,Y] are in the same MER, and if Y2<Y and X2>=X, motion information candidates of second block are set unavailable for prediction. If [X−1,Y−1] and [X,Y] are in the same MER, motion information candidates of second block are set unavailable for prediction.

This alternative implementation is logically identical to the previous implementation, and results in the same neighboring blocks marked as unavailable for prediction. The reason is, since a neighbor block always precedes a current block, therefore since the conditions Y2>=Y and X2>=X cannot hold true at the same time, this alternative implementation results in the same logical outcome for all possible values of X, X2, Y and Y2.

A third alternative implementation of the solution 1 can be formulated as follows. The new MER conditions is assume that the [X,Y] are the top-left coordinate of the current block. Assume [X2, Y2] are the top-left coordinate of a second block. First set second block "available for prediction". If floor(X2/mer_width) is equal to floor(X/mer_width) and floor(Y2/mer_height)>=floor(Y/mer_height), motion information candidates of second block are set unavailable for prediction. If floor(Y2/mer_height) is equal to floor(Y/mer_height) and floor(X2/mer_width)>=floor(X/mer_width), motion information candidates of second block are set unavailable for prediction.

Where mer_width and mer_height are the width and the height of the MER. And where floor is a function that takes as input a real number x and gives as output the greatest integer less than or equal to x.

It should be noted that the third alternative implementation is not identical to first two implementations.

Solution 2.

Based on the same partition as shown in the FIG. 13, solution 2 can provide more parallel processing blocks. The new MER condition is assume that the [X,Y] are the top-left coordinate of the current block. Assume [X2, Y2] are the bottom-right coordinate of a second block. First set second neighbor available for prediction. If [X−1,Y] and [X,Y] are in the same MER, and if X2<X and Y2>=Y, motion information candidates of second block are set unavailable for prediction. If [X,Y−1] and [X,Y] are in the same MER, and if Y2<Y and X2>=X, motion information candidates of second block are set unavailable for prediction. If [X−1,Y−1] and [X,Y] are in the same MER, and if Y2<Y and X2<X, motion information candidates of second block are set unavailable for prediction.

As compared with solution 1, the solution 2 uses the bottom-right coordinate of a second block rather than the top-left coordinate of the second block to perform the availability marking, which can increase the number of blocks which can be parallel processed.

An embodiment based on the solution 2 can be elaborated based on the same partitions as shown in FIG. 14. Based on the new MER of solution 2 of the present disclosure, in addition to A-B and C-E can be processed in a parallel way, A-D, and D-F can also be processed in parallel, since the bottom-right coordination cover more region as compared with the top-left coordination of the second block. It should be noted that the pairs of B&D, C&D, C&F, B&C, E&F cannot be processed in parallel, since they do not belong to the same MER.

The solutions 1 and 2 can be summarized as a method for marking the availability of a potential candidate coding block for a current coding block, which includes determining if a specific reference point (the coordinates of a specific point in the second block) in a potential candidate block is located in a same MER as the current block or not, if a specific reference point (the coordinates of a specific point in the second block) in a potential candidate block is located in a same MER as the current block, the potential candidate block is marked as unavailable for the inter-prediction of the current block, encoding/decoding the current block independent to the potential candidate block.

In summary, it should be noted that the specific reference point can be chosen based on different requirement, for example, in solution 1, the specific reference point is the top-left coordinates of the second block, but in solution 2, the specific reference point is the bottom-right coordination of the second block, and the specific point can also be the middle point of the second block, the top-right coordination of the second block, the bottom-left coordination of the second block.

An alternative implementation of the solution 2 can be formulated as follows. The new MER conditions is assume that the [X,Y] are the top-left coordinate of the current block. Assume [X2, Y2] are the bottom-right coordinate of a second block. First set second block "available for prediction". If [X−1,Y] and [X,Y] are in the same MER, and if X2<X and Y2>=Y, motion information candidates of second block are set unavailable for prediction. If [X,Y−1] and [X,Y] are in the same MER, and if Y2<Y and X2>=X, motion information candidates of second block are set unavailable for prediction. If [X−1,Y−1] and [X,Y] are in the same MER, motion information candidates of second block are set unavailable for prediction.

This alternative implementation is logically identical to the previous implementation and results in the same neighboring blocks marked as unavailable for prediction. The reason is, since a neighbor block always precedes a current block, therefore since the conditions Y2>=Y and X2>=X cannot hold true at the same time, this alternative implementation results in the same logical outcome for all possible values of X, X2, Y and Y2.

A third alternative implementation of the solution 2 can be formulated as follows. The new MER conditions is assume that the [X,Y] are the top-left coordinate of the current block. Assume [X2, Y2] are the bottom-right coordinate of a second block. First set second block "available for prediction". If floor(X2/mer_width) is equal to floor(X/mer_width) and floor(Y2/mer_height)>=floor(Y/mer_height), motion information candidates of second block are set unavailable for prediction. If floor(Y2/mer_height) is equal to floor(Y/mer_height) and floor(X2/mer_width)>=floor(X/mer_width), motion information candidates of second block are set unavailable for prediction.

Where mer_width and mer_height are the width and the height of the MER. And where floor is a function that takes as input a real number x and gives as output the greatest integer less than or equal to x.

The third alternative is identical to the first two alternatives of solution 2 if a neighbor block must be spatially adjacent to the current block. This is the case for instance in the H.265/HEVC video coding standard. If however it is possible for the current block to predict motion vectors from a neighbor block that is not spatially adjacent, then the third alternative implementation can provide superior compression performance with respect to the first two alternatives of solution 2. This case (being able to predict motion information from neighbor blocks) is exemplified in document Joint Video Experts Team (JVET)-K0104 from another approach which is an input document to JVET of ITU-T SG 16 WP 3 and ISO/IEC JTC 1/SC 29/WG 11, 11th Meeting: Ljubljana, SI, 10-18 Jul. 2018. The technique presented in other approaches is explained later on in this application.

In the embodiments of the present application, the initial marking of the candidate coding block as available is an optional step, which is included in order to describe the process when a candidate block is not marked unavailable. The embodiments of the present application describe the conditions for marking a candidate coding block as unavailable, and if a coding block is not marked as unavailable it is marked as available (a candidate coding block is either marked available or unavailable). In other words, the order of the processing steps of marking a coding block as available might be before (initially) or after a coding block is marked unavailable. If the candidate coding block is initially marked as available, then if it belongs to the same extended MER (or MER) as the current coding block, the marking of the candidate block is changed (from available to unavailable). This order of steps generates an identical result when a candidate coding block is marked as available after it is determined that it does not belong to the same extended MER (or MER) as the current block (hence not marked as unavailable).

Solution 3.

Solution 3 is a different method to mark the availability of a potential candidate bock in so far as no direct test related to a positional location of the candidate block with respect to the current block is used here. However, the MER may be interpreted to be formed as a result of the grouping of the coding blocks, where the blocks within each group create a MER for this group. The MER is therefore here to be understood in terms of a membership to a group, i.e. the MER.

The method includes, grouping K coding blocks together according to the processing order in the encoder and decoder, wherein K is an integer bigger than or equal to 2, marking a potential candidate coding block as unavailable for prediction of a current coding block, if the potential candidate coding block and the current coding block are grouped into one (i.e. same) group, encoding/decoding the current coding block independent to the potential candidate coding block.

Figure 15:
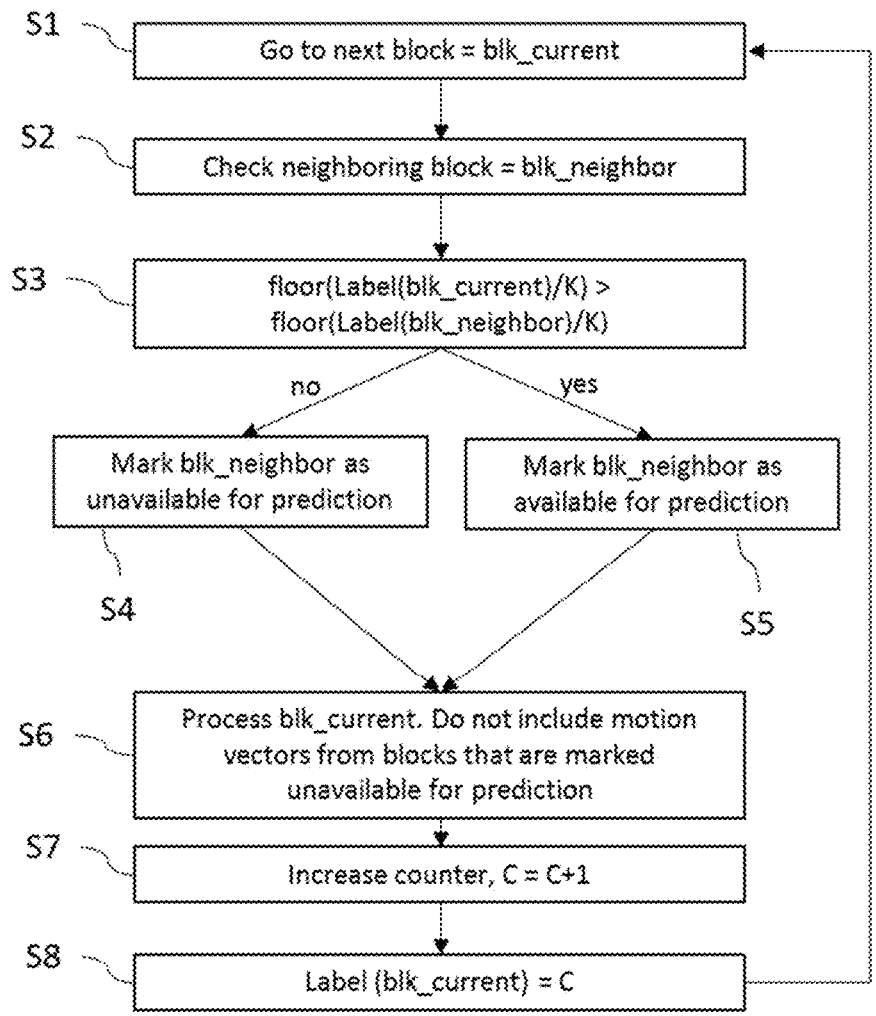
FIG. 15 is a working flow showing availability checking for a potential merge estimation coding blocks according to the present disclosure.

A specific working flow chart of solution 3 is illustrated in FIG. 15. The floor function in the inequality "floor(Label (blk_current)/K)>floor(Label(blk_neighbor)/K)" in step S3 is a function that takes as input a real number x and gives as output the greatest integer less than or equal to x. K describes a window size for group the coding blocks. The inequality condition groups the blocks into groups of K blocks. Based on the floor function, a potential candidate coding block (blk_neighbor) can be marked an unavailable or available for prediction of a current coding block.

For instance, the right branch in FIG. 15 is selected if the current block and the neighbor block are in the different groups. The left branch is selected if the 2 blocks are in the same group. As an example, assume K=5, Label (blk_current)=33 and Label (blk_neigbour)=32. In this case, the inequality of the floor function used in the previous step is evaluated as false and left right branch is selected. The computation steps are as follows:

Floor((33−1)/5)>?Floor((32−1)/5)

Floor(6.4)>?Floor(6.2)

6>?26

No.

Then the current coding block can be processed independently of the unavailable potential candidate coding blocks, after the marking of the availability of the potential candidate coding blocks in step S4. Because, the dependency between the current coding block and the unavailable potential candidate coding block are broken by the solution 3. If the candidate block and the current block are in different groups, the candidate block is marked as available (step S5).

Finally, the counter C is incremented by one, C=C+1 (step S7), after the processing of each block (current coding block) in step S6. As a result the coding blocks are labeled in step S8 according to processing order in the encoder and decoder since the processing order is identical both in the encoder and decoder, labelling will be same in both encoder and decoder. In step S1, a next candidate block is taken and the above steps a repeated for all the candidate blocks.

Figure 16:
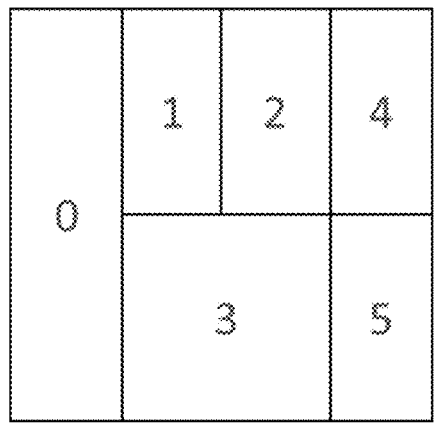
FIG. 16 illustrates a diagram of an example of labeled block partitions where the availability checking

An exemplary embodiment according to solution 3 is elaborated as follows accompanying with FIG. 16. According to the solution 3, all of the coding blocks are labeled according to their processing order as 0~5. The processing window (defined by length K) groups together blocks according to processing order in the encoder and decoder. For instance if K is equal to 3, then the blocks {0,1, 2} and blocks {3,4,5} are grouped together. According to this exemplary embodiment, if a current block and a neighbor block belong to the same group, the neighbor block is marked as unavailable for prediction during the processing of current block. Which means that the motion information of the neighbor block is not used to predict the motion information of the current block. On the other hand, if the current block and the coding block do not belong to the same group, then the neighbor block is set available for prediction by current block. In the example above (K=3), block 5 cannot predict from blocks 3 and 4. However it can predict from block 2 as example. It must be noted that the rule in solution 3 also allows the prediction of block 5 from blocks 1 and 0. However blocks 1 and 0 are not normally candidates for prediction according to merge list construction rules (which was explained with respect to FIG. 12).

By solution 3, a new availability marking method is provided to mark coding blocks, by checking if any of the coding blocks is grouped into same group of a current coding block, which is an alternative way to eliminate the technical problem discussed above.

Solution 4.

Figure 17:
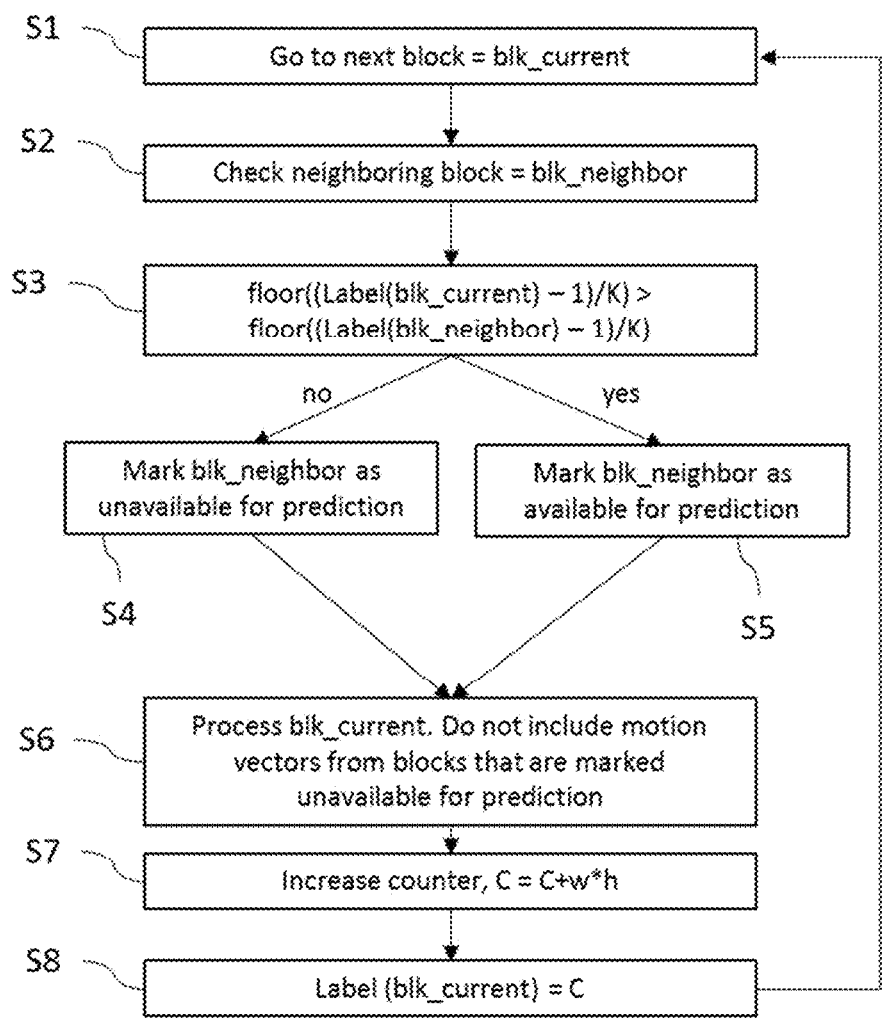
FIG. 17 is a working flow showing availability checking for a potential merge estimation coding blocks according to the present disclosure.
Figure 18:
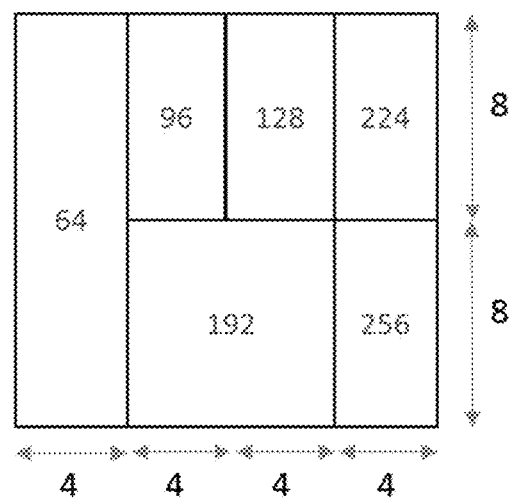
FIG. 18 illustrates a diagram of an example of labeled block partitions where the availability checking

Solution 4 is similar to solution 3, and the difference is that the labeling of each coding block is based on the processing order of the coding blocks and the area spanned by the coding block. A specific working flow chart of solution is illustrated in FIG. 17. The working flow in FIG. 17 is the same as the working flow in FIG. 15, so that the same steps are not repeated here. Solution 4 and 3 differ in the counter step (step S7), specifically, the step "Increase counter, C=C+w*h" which means the coding block is labeled by its spanning region, the pixels/samples it contains. By referring FIG. 18, the first block in processing order has a width equal to 4 and height equal to 16. It is labeled C=0+w*h=64, assuming the counter is at C=0 at the beginning. Given K is equal to 128, the blocks labeled 64, 96 and 128 are grouped together and the block 192, 224 and 256 are grouped to in the second group together. After that as in solution 3, a current block cannot be predicted from motion information of a neighbor block if they are in the same group.

As compared to solution 3, solution 4 results in MERs that are more balanced in terms of area covered. In solution 4 the sliding window creates parallel processing regions that contain more or less same number of samples. Please note that the number of samples are in the regions are not always exactly same. As a result the hardware implementations for solution 4 are easier than solution 3.

MER Determination.

According to solutions 1 and 2, the MER can be determined as a fixed grid of partitions with size N×M in the −x and −y directions. In other words the video picture can be partitioned with same sized N×M rectangles each of which represents a MER.

According to solutions 3 and 4, the MER can be determined as a positive integer number K, which represents either the number of coding blocks or the number of samples inside a MER.

The positive integer numbers N, M and K can be numbers that are encoded into bitstream, preferably in a parameter set, such as a sequence parameter set or a picture parameter set.

The numbers N, M and K can be encoded in the bitstream using a transformation operation, whose inverse exists and known to the decoder. For example, the numbers can be encoded using a logarithm operation in base two and whose inverse is defined as exponentiation of base two.

Alternatively the numbers N, M and K might have predetermined values. In this case an indication can be encoded in the bitstream that selects between predetermined values of N, M and K according to a table of predetermined values.

Solution 5.

Solution 5 provides an option to harmonize the solutions 1~4 with the history-based motion vector prediction. The History based motion vector prediction is proposed in JVET-K0104, which is an input document to JVET of ITU-T SG 16 WP 3 and ISO/IEC JTC 1/SC 29/WG 11, 11th Meeting: Ljubljana, SI, 10-18 Jul. 2018. The history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded block, the associated motion information is added to the last entry of the table as a new HMVP candidate. HMVP candidates could be used in the merge candidate list construction process. All HMVP candidates from the last entry to the first entry in the table are inserted after the TMVP candidate. Pruning is applied on the HMVP candidates. Once the total number of available merge candidates reaches the signaled maximally allowed merge candidates, the merge candidate list construction process is terminated. Similarly, HMVP candidates could also be used in the advanced MVP (AMVP) candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. K preferably is set to 4. The HMVP allows for motion vector prediction from non-adjacent spatial neighbor blocks. As an example according to HMVP, it would be possible that block F as shown in FIG. 14 can be predicted the motion information of block A, since the motion information of block A would be stored in the aforementioned table with HMVP candidates. In this case, the solutions 1-4 apply without change in to the candidates that are stored in the table.

As an embodiment, in addition to the motion information, top-left or bottom right coordinate of the block must also be stored in association with the table entries, in order to apply the rules given in solutions 1 and 2.

Alternatively, the present disclosure further discloses the following solutions which allow more flexibility in parallel processing of merge estimation.

Similar to the previous solutions, different forms of MER conditions may be used to check whether a specific point of the candidate block is located in the extended MER. This check or the outcome of the respective MER test depends on the positional relation between the specific point and a position (e.g. a corner) of the current coding block. The candidate block is then marked as unavailable depending on whether or not the condition(s) is satisfied. This is further exemplified by the following embodiments.

As a common bases, the following assumption is made for easily understanding the present disclosure by exemplifying embodiments.

Figure 19:
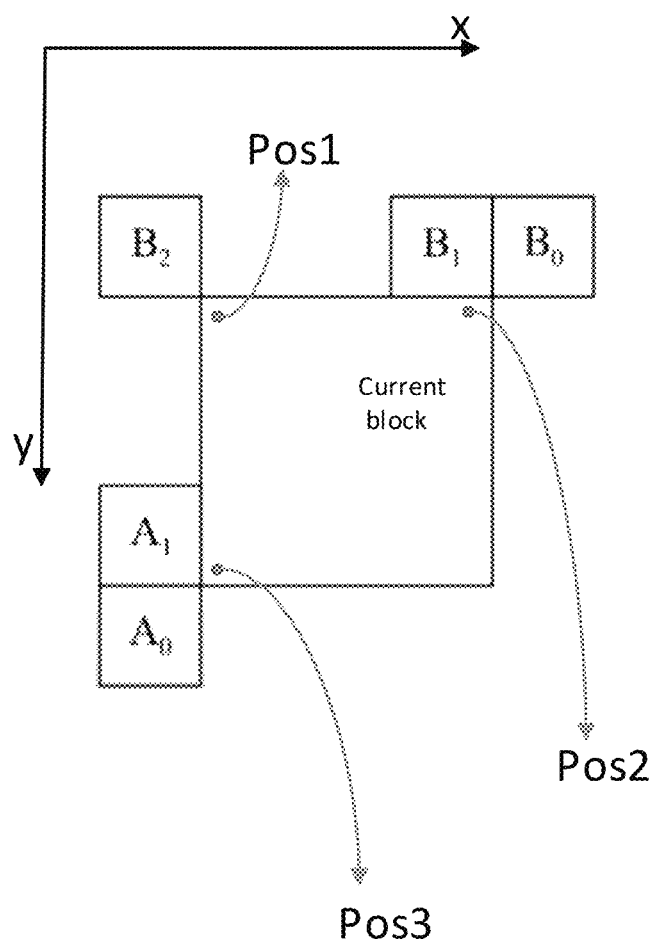
FIG. 19 illustrates an example about a current block and its spatial neighbor blocks.

As shown in FIG. 19, a current block and its spatial neighbors are illustrated as an example. The formal definitions of the spatial neighboring blocks are as follows. Note that here Coord1 refers to the current coding block and Coord2 refers to the candidate block.

Assume that the top-left (top-left corner), top-right (top-right corner) and bottom-left (bottom-left corner) coordinate of the current block are denoted by Pos1=(x1, y1), Pos2=(x2, y2) and Pos3=(x3, y3) respectively, wherein (x,y) are the coordinates in the −x and −y direction. Pos1.x denotes the −x coordinate of Pos1 and Pos1.y denotes the −y coordinate of Pos1.

The left spatial neighbor block (A1) is defined as the block that contains the point PosA1=(x3−1, y3). The left-bottom spatial neighbor block (A0) is defined as the block that contains the point PosA0=(x3−1, y3+1). The above-left spatial neighbor block (B2) is defined as the block that contains the point PosB2=(x1−1, y1−1). The above spatial neighbor block (B1) is defined as the block that contains the point PosB1=(x2, y2−1). The above-right spatial neighbor block (B0) is defined as the block that contains the point PosB0=(x2+1, y2−1).

Based on the assumption shown in FIG. 19, the sixth solution is as follows accompanying with the FIG. 20A.

Solution 6.

Mer_width and Mer_height define the width and height of the MER region.

New MER condition. Depending on the neighboring block that is going to be checked. If neighbor block is $A_1$, Coord1 is set equal to Pos3, Coord2 is set equal to $PosA_1$. If neighbor block is $A_0$, Coord1 is set equal to Pos3, Coord2 is set equal to $PosA_0$. If neighbor block is $B_0$, Coord1 is set equal to Pos2, Coord2 is set equal to $PosB_0$. If neighbor block is $B_1$, Coord1 is set equal to Pos2, Coord2 is set equal to $PosB_1$. If neighbor block is B2, Coord1 is set equal to Pos1, Coord2 is set equal to PosB2. If both of the following conditions are true, the neighboring block is set unavailable for prediction by current block:

floor(Coord2.x/mer_width) is equal to floor(Coord1.x/mer_width);

floor(Coord2.y/mer_height)>=floor(Coord1.y/mer_height).

Alternatively, If both of the following conditions are true, the neighboring block is set unavailable for prediction by current block:

floor(Coord2.y/mer_height) is equal to floor(Coord1.y/mer_height);

floor(Coord2.x/mer_width)>=floor(Coord1.x/mer_width).

Note. the floor function is the function that takes as input a real number X and gives as output the greatest integer less than or equal to X.

Note throughout the present disclosure, coordinate x increases from left to right. Coordinate y increases from top to bottom.

Note it is assumed that a process precedes the process of this disclosure that sets the neighbor block available for prediction by current block. For example, the process that precedes the current disclosure might check whether the neighbor block is inside the picture boundaries, or whether it is inside the same slice, whether the neighbor block precedes the current block in coding order etc.

Neighbor blocks A0, . . . B2 are exemplary spatial neighbor positions. The present disclosure is applicable to any other spatial neighbor arrangements and also spatial non-neighbor arrangements.

It is possible to have implementations logically identical to solution 6 keeping in the conditions Coord2.x>=Coord1.x and Coord2.y>=Coord1.y cannot hold true at the same time. One alternative implementation of solution 6 can be formulated as follows.

New MER Condition.

Depending on the neighboring block that is going to be checked. If neighbor block is $A_1$, Coord1 is set equal to Pos3, Coord2 is set equal to $PosA_1$. If neighbor block is $A_0$, Coord1 is set equal to Pos3, Coord2 is set equal to $PosA_0$.

If neighbor block is $B_0$, Coord1 is set equal to Pos2, Coord2 is set equal to $PosB_0$. If neighbor block is $B_1$, Coord1 is set equal to Pos2, Coord2 is set equal to $PosB_1$. If neighbor block is B2, Coord1 is set equal to Pos1, Coord2 is set equal to PosB2. If both of the following conditions are true, the neighboring block is set unavailable for prediction by current block:

floor(Coord2.x/mer_width) is equal to floor(Coord1.x/mer_width),

Coord2.y/mer_height>=Coord1.y/mer_height.

Alternatively, if both of the following conditions are true, the neighboring block is set unavailable for prediction by current block:

floor(Coord2.y/mer_height) is equal to floor(Coord1.y/mer_height),

Coord2.x/mer_width>=Coord1.x/mer_width.

Alternatively, if the following conditions is true, the neighboring block is set unavailable for prediction by current block:

Coord2 is inside the same MER as Coord1.

Figure 20A:
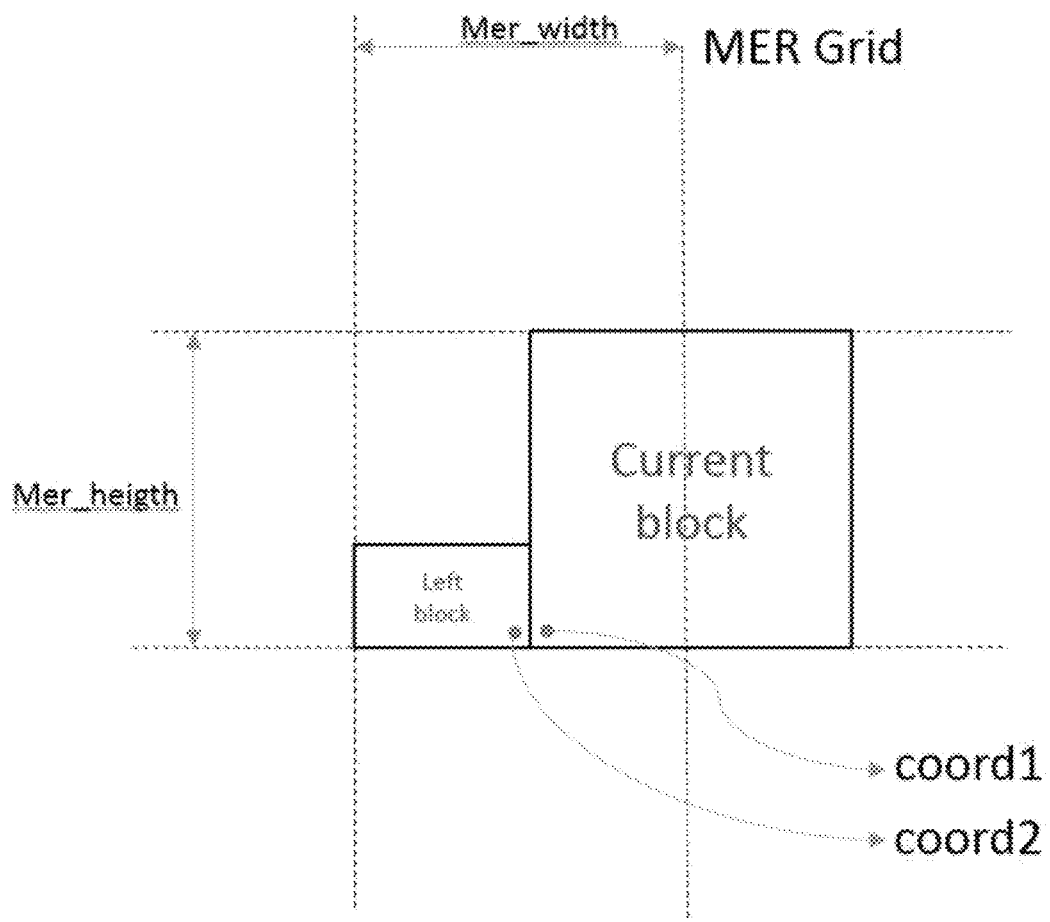
FIG. 20A illustrates an example about the sixth solution.
Figure 20B:
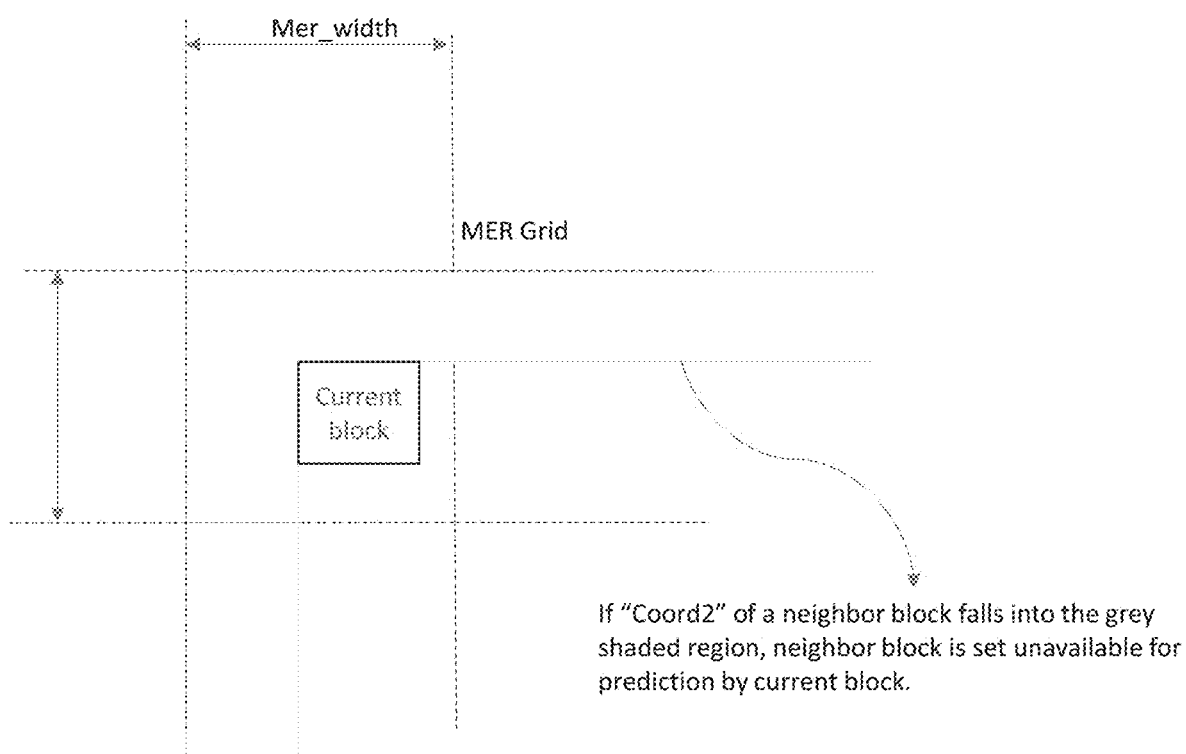
FIG. 20B illustrates an example of where a neighbor blocks will be marked unavailable.
Figure 20C:
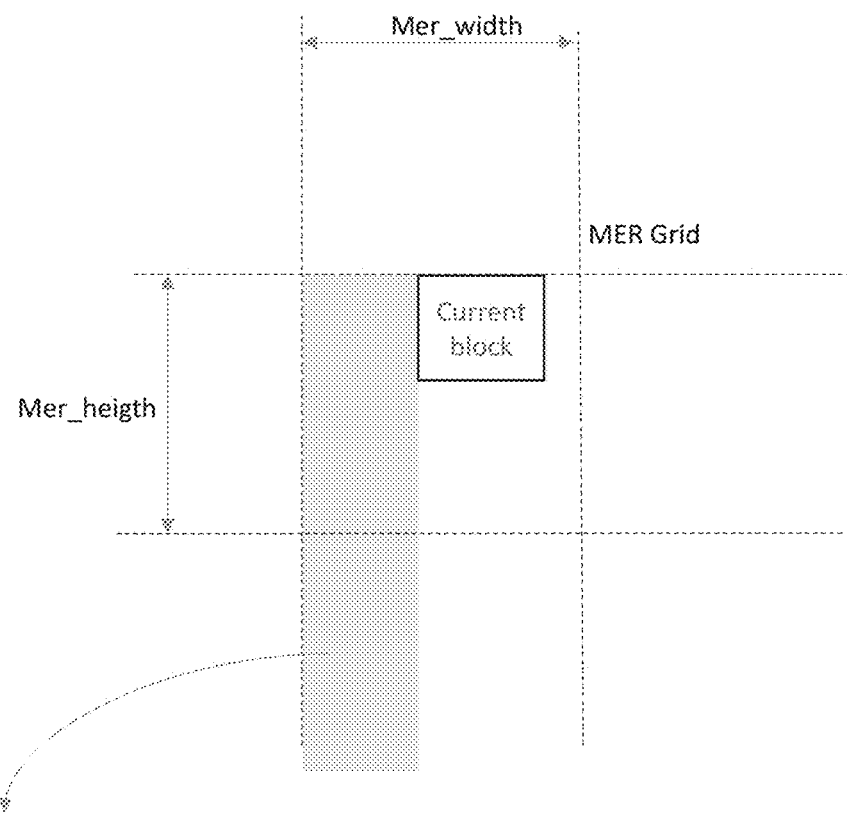
FIG. 20C illustrates another example of where a neighbor blocks will be marked unavailable.

FIGS. 20A and 20B show examples of where a neighbor blocks falls into around the current block and hence will be marked unavailable.

Solution 7.

Solution 7 is a harmonizing solution to have the solution 6 adoptive to history-based motion vector prediction as disclosed in "CE4-related: History-based Motion Vector Prediction", it might be possible that some of the neighbor blocks might not be spatially adjacent to the current block. In other words the method described in the referenced technology constructs a list of motion vectors from blocks that might not be adjacent to the current block.

In this case according, solution 7 is made as follows Mer_width and Mer_height define the width and height of the MER region. New MER condition, depending on the neighboring block that is going to be checked. If neighbor block belongs to the history based candidate list, Coord2 is set equal to bottom-right coordinate of the neighbor block, Coord1 is set equal to top-left coordinate of the current block. As an alternative, instead of bottom-right coordinate of the neighbor block, top-left coordinate of the neighbor block can be used, specifically, Coord2 is set equal to top-left coordinate of the neighbor block, Coord1 is set equal to top-left coordinate of the current block. If both of the following conditions are true, the neighboring block is set unavailable for prediction by current block:

floor(Coord2.x/mer_width) is equal to floor(Coord1.x/mer_width), floor(Coord2.y/mer_height)>=floor(Coord1.y/mer_height).

If both of the following conditions are true, the neighboring block is set unavailable for prediction by current block:

floor(Coord2.y/mer_height) is equal to floor(Coord1.y/mer_height), floor(Coord2.x/mer_width)>=floor(Coord1.x/mer_width).

Solution 8.

Figure 21:
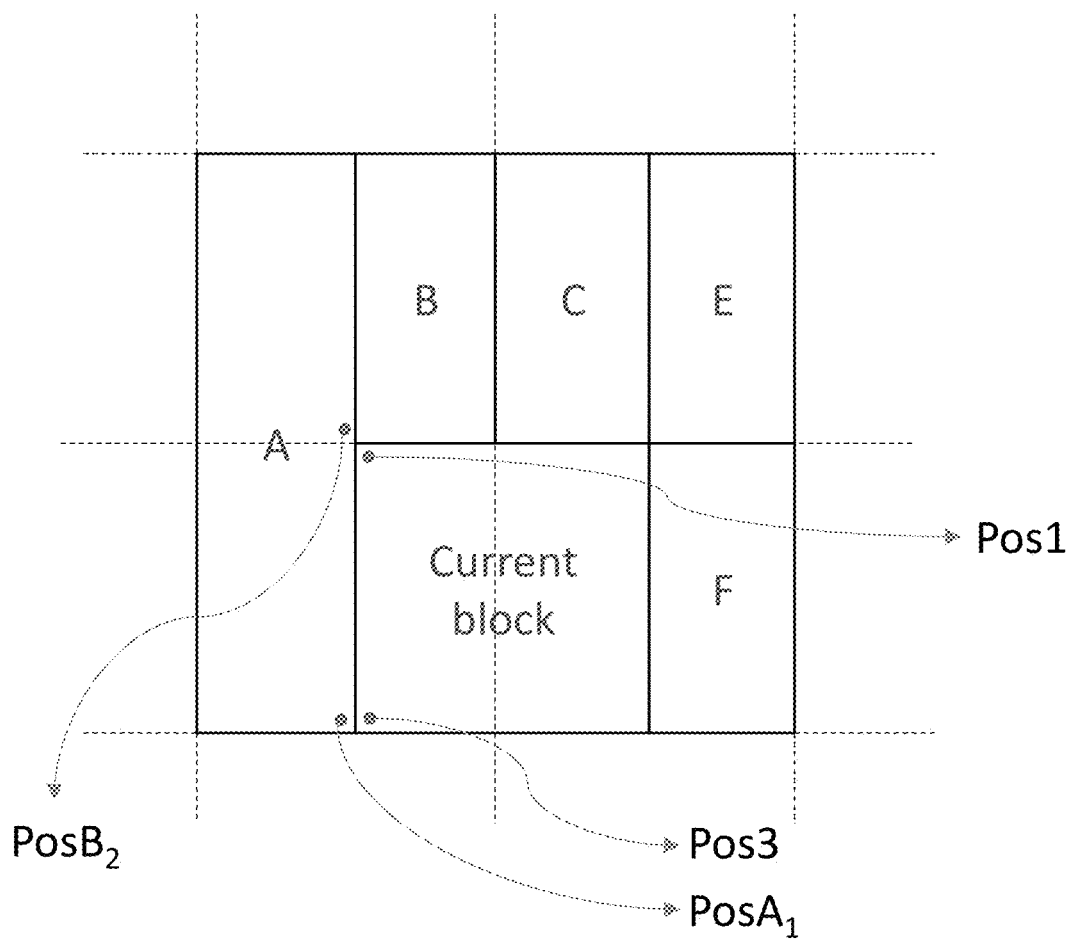
FIG. 21 illustrates an example of do merge estimation to remove the parallel processing restriction.

To further improve the parallelism as doing merge estimation to remove the parallel processing restriction as shown in FIG. 21. In FIG. 21, Block A is both the left (A1) and top-left (B2) neighbor of the current block. According to previously solution, the block A is set unavailable for prediction when it is considered as left-neighbor (using Pos3, PosA1 pair). It is set available for prediction when it is considered as left-top neighbor (using Pos1, PosB2 pair). At the end block A and current block cannot be processed in parallel since motion information of block A is used as predictor by current block.

Figure 22:
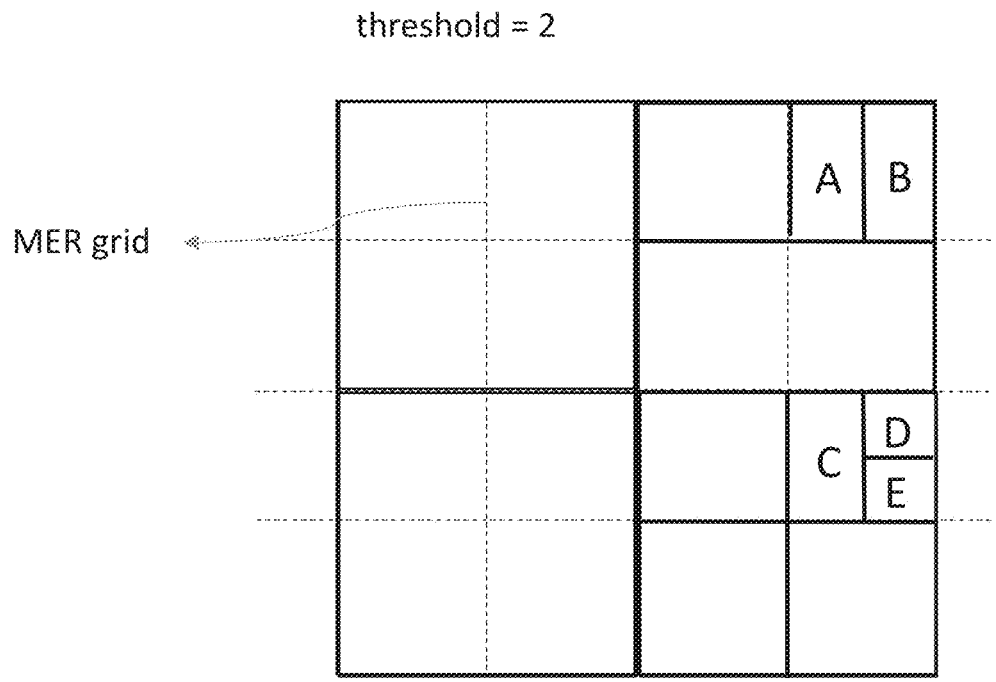
FIG. 22 illustrates an example of determine the availability of neighboring blocks.

The solution 8 is shown in FIG. 22, a rule of determining the availability of neighboring blocks is shown, which is elaborated as follows. Mer_width and Mer_height define the width and height of the MER region. MER condition. Depending on the neighboring block that is going to be checked. If neighbor block is $A_1$, Coord1 is set equal to pos3, Coord2 is set equal to $PosA_1$. If neighbor block is $A_0$, Coord1 is set equal to pos3, Coord2 is set equal to $PosA_0$. If neighbor block is $B_0$, Coord1 is set equal to pos2, Coord2 is set equal to $PosB_0$. If neighbor block is $B_1$, Coord1 is set equal to pos2, Coord2 is set equal to $PosB_1$. If neighbor block is $B_2$, Coord1 is set equal to pos1, Coord2 is set equal to $PosB_2$. If the following condition is true, the neighboring block is set unavailable for prediction by current block:

floor(Coord2.x/mer_width) is equal to floor(Coord1.x/mer_width)

If the following condition is true, the neighboring block is set unavailable for prediction by current block:

floor(Coord2.y/mer_height) is equal to floor(Coord1.y/mer_height).

Solution 9.

Solution 9 comes for adopt the restriction of CTU partitions. According to the draft video coding standard "Versatile Video Coding (Draft 2)", it is possible to partition a picture frame into blocks using QT split, binary split or ternary split (document: JVET-K1001-v4 which is accessible @ http://phenix.it-sudparis.eu/jvet). The split operation starts with a CTB and the CTB is hierarchically partitioned into coding blocks using QT split, binary split or ternary split.

The terms CTB, and CTU, are used synonymously.

Definitions are as follows.

QT. A tree in which a parent node can be split into four child nodes, each of which may become parent node for another split.

MTT. A tree in which a parent node can be split either into two child nodes using a binary split or into three child nodes using a ternary split, each of which may become parent node for another split into either two or three child nodes.

A restriction is imposed in the document that a binary split or a ternary split cannot be followed by a QT split in the child node.

QT partition depth, or cqtDepth is incremented in the child node of a parent node, if QT splitting is performed to generate the child node. Similarly mttDepth is incremented if binary or ternary split is performed.

According to a first embodiment, an apparatus is provided for marking availability of a candidate coding block, for merge estimation of a current coding block within a CTU, wherein the apparatus comprises a processing circuitry configured to mark the candidate coding block as unavailable when a splitting depth of the current coding block is equal to or larger than a predetermined threshold, and a first location of the candidate coding block and a second location of the current coding block are included within a same MER, and mark the candidate coding block as available otherwise.

This means that the first location of the candidate block is in the MER of the current coding block.

According to an embodiment, the splitting depth corresponds to a QT partition depth, cqtDepth, of the current coding block.

According to an embodiment, a width and a height of the MER belonging to a fixed MER grid are determined by MER-width=(width of CTU)/2qtDepthThr, and MER-height=(height of CTU)/2qtDepthThr, wherein qtDepthThr corresponds to the threshold.

The predetermined threshold qtDepthThr may be signaled in the bitstream.

According to an embodiment, the processing circuitry is configured to obtain, as the second location, coordinates (x, y) of a corner of the current coding block, and obtain, as the first location, the coordinates of a specific point (x+a, y+b) in the candidate coding block, wherein a∈(−1,0,1), b∈(−1,0,1), and a and b are selected in dependence on the relationship of the relative position between the specific point and the corner, select, for the one candidate coding block, one value from (−1,0,1) as the a, and one value from the (−1,0,1) as the b.

According to an embodiment, the corner is a bottom-left corner, and the specific point is located on where there is left to the current coding block, a=−1, b=0, or the corner is a bottom-left corner, and the specific point is located on where there is bottom-left to the current coding block, a=−1, b=1, or the corner is an upper-left corner, and the specific point is located on where there is upper-left to the current coding block, a=−1, b=−1, or the corner is an upper-right corner, and the specific point is located on where there is upper-right to the current coding block, a=1, b=−1, or the corner is an upper-right corner, and the specific point is located on where there is upper to the current coding block, a=0, b=−1.

A candidate block with its specific point left to the current block means that the candidate block is an A1 neighbor block.

A candidate block with its specific point bottom-left to the current block means that the candidate block is an A0 neighbor block.

A candidate block with its specific point upper-left to the current block means that the candidate block is a B2 neighbor block.

A candidate block with its specific point upper-right to the current block means that the candidate block is a B0 neighbor block.

A candidate block with its specific point upper to the current block means that the candidate block is a B1 neighbor block.

According to an embodiment, the processing circuitry is configured to obtain, as the second location, coordinates (x, y) of a corner of the current coding block, obtain, as the first location, the coordinates of a specific point (x1, y1) in the candidate coding block, wherein the specific point is a top-left corner or a bottom-right corner of the candidate coding block.

According to an embodiment, the corner of the candidate coding block is a top-left corner and the specific point is the top-left corner.

In the solution 9, the following is new neighboring block availability checking rule is provided, with reference to the neighbor block notation A0, A1, B0, B1, and B2.

New MER condition. Depending on the neighboring block that is going to be checked If neighbor block is $A_1$, Coord1 is set equal to pos3, Coord2 is set equal to $PosA_1$. If neighbor block is $A_0$, Coord1 is set equal to pos3, Coord2 is set equal to $PosA_0$. If neighbor block is $B_0$, Coord1 is set equal to pos2, Coord2 is set equal to $PosB_0$. If neighbor block is $B_1$, Coord1 is set equal to pos2, Coord2 is set equal to $PosB_1$. If neighbor block is $B_2$, Coord1 is set equal to pos1, Coord2 is set equal to $PosB_2$. If both of the following conditions are true, the neighboring block, i.e. the candidate (coding) block is set unavailable for prediction of the current (coding) block:

Coord2 and Coord1 are inside the same MER;
cqtDepth of the current block is greater than or equal to a threshold (qtDepthThr).

In this exemplary embodiment, the coordinates/positions Coord1 refers to the second location of the current block and Coord2 refers to the first location of the candidate block.

Note threshold is an integer number such as 0, 1, 2.

An exemplary embodiment of solution 9 is provided as follows accompanying FIG. 22. For blocks A and B, cqtDepth is equal to 1 and mttdepth is equal to 3, since 1 QT split followed by 3 binary split are performed to generate blocks A and B. For block C, cqtDepth is equal to 2 and mttdepth is equal to 1, since 2 QT splits followed by 1 binary split are performed to generate block C. For blocks D and E, cqtDepth is equal to 2 and mttdepth is equal to 2, since 2 QT splits followed by 2 binary split are performed to generate blocks D and E.

According to the example, the threshold is set equal to 2. This means that at least 2 QT splits need to be performed (cqtDepth>=2) in order for the current block and a neighbor block to be processed in parallel.

In the example on the left, block B (current block) cannot be processed in parallel to block A (neighbor block), although cqtDepth of block B is 1, since blocks A and B are inside the same MER.

Block E (current block) can be processed in parallel to block C and D (neighbor blocks) since the cqtDepth of block E is equal to 2, which is equal to the threshold. Note, as mentioned earlier, the JVET-K1001 prohibits QT splits after binary or ternary split.

Solution 10 is a harmonizing solution to have solution 9 adapted to history-based motion vector prediction as disclosed in "CE4-related: History-based Motion Vector Prediction", it might be possible that some of the neighbor blocks might not be spatially adjacent to the current block. In other words the method described in the referenced technology constructs a list of motion vectors from blocks that might not be adjacent to the current block.

Solution 10.

New MER Condition.

Depending on the neighboring block that is going to be checked.

If neighbor block belongs to the history based candidate list, Coord2 is set equal to top-left coordinate of the neighbor block, Coord1 is set equal to top-left coordinate of the current block. Alternatively, Coord2 is set equal to bottom-right coordinate of the neighbor block, Coord1 is set equal to top-left coordinate of the current block.

If the following conditions are true, the neighboring block is set unavailable for prediction by current block:

Coord2 and Coord1 are inside the same MER;
cqtDepth of the current block is greater than or equal to a threshold (qtDepthThr).

Advantageously in solutions 9 and 10, the QT depth threshold (qtDepthThr) and the size of the MER are preferably obey the following equations:

$$\text{Width of MER} = (\text{width of CTB})/2^{qtDepthThr};$$

$$\text{Height of MER} = (\text{height of CTB})/2^{qtDepthThr}.$$

Advantageously width and height of the MER is equal to each other according to the above equations in solutions 1 to 10, since the width and height of the CTB are defined to be equal in JVET-K1001-v4.

Advantageously in solutions 9 and 10.

qtDepthThr and/or size of the MER can be signalled in a parameter set such as Sequence Parameter Set, Picture Parameter Set, slice header etc.

Advantageously, in the solutions 1 to 10, a neighbor block is set unavailable for prediction by the current block if the current block is coded using merge mode.

Advantageously, in the solutions 1 to 10, a neighbor block is set unavailable for prediction by the current block if the current block is coded using affine merge mode.

Advantageously in the solutions 1 to 10, a neighbor block is set unavailable for prediction by the current block if the current block is coded using an inter prediction mode where motion vector difference is not signaled. Please note that the motion vector used for inter prediction of a current block is given by the summation of a motion vector predictor and motion vector difference. According to present disclosure, a neighbor block is set unavailable for prediction by the current block if the current block is coded using an inter prediction mode where motion vector difference is not signaled and inferred to be zero in length.

Advantageously in the solutions 1 to 10, a neighbor block is set unavailable for prediction by the current block if the current block is coded using an inter prediction mode where the motion vector difference can only have predefined values. For example one such inter prediction mode is exemplified in document JVET-K0115, "CE4 Ultimate motion vector expression in J0024 (Test 4.2.9)" of JVET of ITU-T SG 16 WP 3 and ISO/IEC JTC 1/SC 29/WG 11, 11th Meeting: Ljubljana, SI, 10-18 Jul. 2018. In this document a inter prediction mode is exemplified where the motion vector difference cannot have any arbitrary value, instead the motion vector difference can only assume specific predefined values. If the current coding block is coded using this inter prediction mode it is advantageous to apply solutions 1 to 10. In the document JVET-K0115 it is also mentioned that the proposed method applied when the current block is coded using merge mode.

Solution 11.

New MER condition. Assume that the [X,Y] are the top-left coordinate of the current block. Assume [X2, Y2] are the bottom-right coordinate of a second block. Assume that the width and height of the MER region given by MER_width and MER_height. If floor(X2/MER_width) is equal to floor(X/MER_width) and Y2>=Y, motion information candidates of second block are set unavailable for prediction. If floor(Y2/MER height) is equal to floor(Y/MER_height) and X2>=X, motion information candidates of second block are set unavailable for prediction. If floor (Y2/MER_height) is equal to floor(Y/MER_height) and floor(X2/MER_width) is equal to floor(X/MER_width), motion information candidates of second block are set unavailable for prediction.

Solution 11 can be implemented in an alternative way as follows. If floor(X2/MER_width) is equal to floor(X/MER_ width) and floor(Y2/MER_height)>=floor(Y/MER_ height) motion information candidates of second block are set unavailable for prediction. If floor(X2/MER_width) is equal to floor(X/MER_width) and floor(Y2/MER_Height)>=floor (Y/MER_height) motion information candidates of second block are set unavailable for prediction.

The neighboring block might have been set available/ unavailable for prediction by a preceding process. The disclosure modifies the setting. This solution is actually identical to solution 2 if only adjacent spatial neighbor blocks are used for motion vector prediction (like in the case of H.265/HEVC video coding standard). However if non-adjacent spatial neighbors are used, such as in another approach "CE4-related: History-based Motion Vector Prediction" then present solution 10 would increase the coding gain with respect to solution 2.

As an example, the solution 11 is applied to the VVC with the following form.

Derivation process for neighboring block availability according to parallel merge estimation.

Inputs to this process are a luma location (xCb, yCb) of the top-left sample of the current luma coding block relative to the top-left luma sample of the current picture, a luma location (xNb, yNb) inside the neighboring luma coding block relative to the top-left luma sample of the current picture, a variable availableFlag indicating the availability of the neighboring block. Output of this process is the modified availableFlag. xNbBR and yNbBR are set equal to CbPosX[xNb][yNb]+CbWidth[xNb][yNb]−1 and CbPosY [xNb][yNb]+CbHeight[xNb][yNb]−1, which means the bottom right pixel of the neighboring block. If the variable availableFlag is equal to 1 and if any of the following conditions are true, the availableFlag is set equal to 0 which means the neighboring luma coding block is not available:

xCb>>Log 2ParMrgLevel is equal to xNbBR>>Log 2ParMrgLevel and yNbBR>>Log 2ParMrgLevel is greater than or equal to yCb>>Log 2ParMrgLevel, yCb>>Log 2ParMrgLevel is equal to yNbBR>>Log 2ParMrgLevel and xNbBR>>Log 2ParMrgLevel is greater than or equal to xCb>>Log 2ParMrgLevel.

In VVC a CTB can be recursively split into progressively smaller coding blocks using BT, TT and QT splitting. If a coding block (parent) is split using QT split, 4 child blocks are generated. If a coding block (parent) is split using ternary split, 3 child blocks are generated. Similarly 2 child blocks are generated after binary split. The block that is split is called a parent block and the resulting partitions are called child blocks. The child-parent block relationships are established recursively until the child block is decided to be not further split. In this case the resulting child block is called a leaf block (or can be called a leaf node). The splitting decisions are inserted in the bitstream. As a result of the splitting process, a CTB is split into one or more leaf nodes that have different sizes and shapes. Total number of splitting operations (starting from a CTB) might be different for different child blocks.

Solution 12.

According to an embodiment, an apparatus for marking availability of a candidate coding block for merge estimation of a current coding block within a CTU, wherein the apparatus comprises a processing circuitry configured to obtain a parent block, parentCurr, of the current coding block, wherein the current coding block is obtained by splitting of the parentCurr, obtain a parent block, parentCand, of the candidate coding block, wherein the candidate coding block is obtained by splitting of the parentCand, and mark the candidate coding block as unavailable, when the parentCand and the parentCurr are the same block, and when a size of the parentCand is smaller than a threshold, and mark the candidate coding block as available otherwise.

In an example, the splitting process for the parent blocks of the candidate block and the candidate block may be performed one or multiple times, for example, according to a recursive process.

In an example, the size of the parentCand is obtained according to width multiplied by height of the parentCand.

According to an embodiment, motion information of the candidate coding block is not used in the prediction of the current coding block when the candidate coding block is marked unavailable.

According to an embodiment, motion information of the candidate coding block is not used in the prediction of the current coding block when the current coding block is predicted using merge prediction mode and when the candidate coding block is marked unavailable.

According to solution 12, two leaf blocks are considered to be in the same MER if both of the following conditions are satisfied two leaf blocks belong to a same parent block (or parent of a parent block, or parent of a parent of a parent block etc.) and the same parent block is smaller in size than a threshold.

If the two leaf blocks are considered to be in the same MER, motion information of the first leaf block in coding order is set unavailable, for prediction by the second block. Otherwise, the motion information of the first leaf block is set available for prediction by the first block.

It is noted that due to the recursive splitting process, a leaf block might have more than one parent block at different hierarchy levels (direct parent, parent of parent etc.). According to the solution 12, if there is at least one parent block (at any hierarchy level) that contains the two leaf blocks, they (the two leaf blocks) are considered to belong to the same parent block. Moreover the hierarchy level might be different for the two leaf blocks, meaning that number of splitting operations starting from the parent block to obtain the leaf block might be different for the two leaf blocks.

According to one specific implementation, the size threshold is computed as the number of pixel samples inside a parent coding block, which is computed as width multiplied by height of that coding block. According to another implementation of solution 12, the threshold is a positive integer number and the size of a block is computed based on the width of the block. According to a third specific implementation of solution 12 the threshold is a positive integer number and the size of a block is computed based on the height of the block. In general the size of a block is computed based on the width and the height of the block, taking both of them into account.

Solution 13.

According to an embodiment, an apparatus is provided for marking availability of a candidate coding block for merge estimation of a current coding block within a CTU, wherein the apparatus comprises a processing circuitry configured to obtain a parent block, parentCurr, of the current coding block, wherein the current coding block is obtained by splitting of the parentCurr, obtain a parent block, parentCand, of the candidate coding block, wherein the candidate coding block is obtained by splitting of the parentCand, and mark the candidate coding block as unavailable, when the parentCand and the parentCurr are the same block, and when a function of a number of QT, TT, and BT splitting operations that are performed to obtain the parentCand is greater than a threshold, and mark the candidate coding block as available otherwise.

According to solution 13, two leaf blocks are considered to be in the same MER if both of the following conditions are satisfied they belong to a same parent block (or recursively parent of a parent block, or parent of a parent of a parent block etc.) and the number of splitting operations that are performed in order to obtain the parent block are greater than a threshold.

If the two leaf blocks are considered to be in the same MER, motion information of the first block in coding order (i.e. the candidate block) is set unavailable for prediction of the second block (i.e. the current block). Otherwise, the motion information of the first block is set available for prediction of the second block.

According to solution 13, the threshold comparison is performed based on the number of QT, BT and TT splitting operations that were performed in order to obtain the parent block. As an example, assume that the number of QT splitting operations that are performed to obtain the parent block is represented by qtDepthThr, and the number of binary and TT splitting operations that are performed are represented collectively by mttDepth (the terms qtDepth and mttDepth are used according to the document JVET-L1001-v1, VVC (Draft 3), which can be obtained from the website http://phenix.it-sudparis.eu/jvet. qtDepth denotes the QT partition depth, which is equivalent to number of QT splitting operations that are performed to obtain a block. mttDepth denotes the multi-type tree partition depth, which is equivalent to number of BT and TT splitting operations that are performed to obtain a block). Then according to solution 13, any two leaf blocks that belong to the same parent block are considered to be in the same MER if the qtDepth plus K multiplied by mttDepth is greater than a specified threshold value (qtDepth+K×mttDepth>Thr). K and Thr can be an integer number 0, 1, 2, . . . K and the threshold value can be predetermined or signalled in the bitstream. In one preferred implementation K has a predetermined value of 2.

K and Thr can be an integer number 0, 1, 2, . . . K and the threshold value can be predetermined or signalled in the bitstream. In one preferred implementation, K has a predetermined value of 2. In other words, Thr may be included into the bitstream and K may be a positive integer number or be zero.

The counting of number of QT, BT and TT splitting operations can be explained using FIG. 10 and FIG. 11A. As an example block 34 has been obtained by one QT splitting of block 50. According to FIG. 11A block 34 is a leaf block, which was obtained by one QT splitting operation and zero ternary and zero binary splitting operations.

According to FIG. 11A, block 45 has been obtained by two QT splitting operations and one BT splitting operation. Block 50 (which is the CTB) is first split using QT splitting to obtain block 58, block 58 is split using QT splitting to obtain block 62 and finally block 62 is split using binary splitting to obtain block 45.

It is noted that the number of splitting operations are counted with respect to the CTB which is considered as the starting point of the splitting operation.

Figure 23:
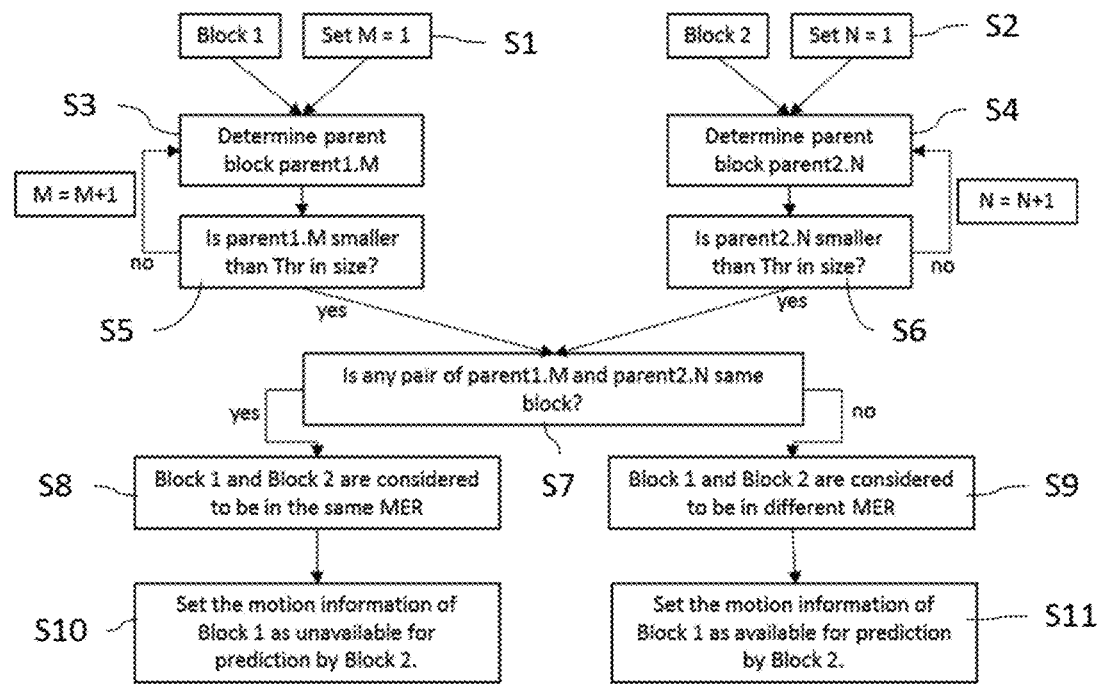
FIG. 23 illustrates an example of the flowchart of the solution 12.

Explanation of Solution 12. Accompanying FIG. 23 presents the flowchart of the solution 12. It is noted that Block 1 is assumed to precede Block 2 in coding order. According to solution 12, first the parent blocks that are smaller than a specified threshold "Thr" of Block 1 and Block 2 are determined, in a recursive manner in steps (S3, S5) and in steps (S4, S6), respectively. Parent1.1 represents the parent block of Block 1 and parent1.2 represents the parent block of parent1.1, and so on. Similarly parent2.1 represents the parent block of Block 2.

If, as a result of the test in step S7, a parent block of Block1 is the same block of a parent block of Block 2 (step S8) and if the parent block is smaller than Thr in size, then the motion information of Block 1 is set unavailable for prediction of Block 2 (step S10). If a parent block of Block1 is different from a parent block of Block1 (step S9), the motion information of Block1 is then set as available for prediction of Block 2 (step S11).

Similarly FIG. 23 can also be used to explain the Solution 13, where the size comparison is replaced by a comparison based on the number of QT, BT and TT splitting operations that were performed in order to obtain the parent block.

According to an embodiment, MVCs are derived from the candidate coding block marked as available, and the current coding block is coded by referring to the MVCs.

According to an embodiment, an encoder for encoding a current coding block within a CTU, comprising a candidate list generator for generating a list of prediction candidates, including the apparatus for marking availability of a candidate coding block for merge estimation of the current coding block within the CTU according to any of the previous embodiments, a PU for determining prediction of the current coding block according to at least one prediction candidate out of the generated list, and a compression unit for encoding the current coding block by using the prediction of the current coding block.

According to an embodiment, a decoder is provided for decoding a current coding block within a CTU, comprising a candidate list generator for generating a list of prediction candidates, including the apparatus for marking availability of a candidate coding block for merge estimation of the current coding block within the CTU according to any of the previous embodiments, a PU for determining prediction of the current coding block according to at least one prediction candidate out of the generated list, and a decompression unit for decoding the current coding block by using the prediction of the current coding block.

According to the encoder and/or decoder according to any of the previous embodiments, the list of prediction candidates is a list of MVs.

According to an embodiment, a method is provided for marking availability of a candidate coding block for merge estimation of a current coding block within a CTU, comprising the steps of marking the candidate coding block as unavailable when a splitting depth of the current coding block is equal to or larger than a predetermined threshold, and a first location of the candidate coding block and a second location of the current coding block are included within a same MER, and marking the candidate coding block as available otherwise.

According to an embodiment, method is provided for marking the availability of a candidate coding block for merge estimation of a current coding block within a CTU, comprising the steps of obtaining a parent block, parentCurr, of the current coding block, wherein the current coding block is obtained by splitting of the parentCurr, obtaining a parent block, parentCand, of a candidate coding block (denoted as parentCand), wherein the candidate coding block is obtained by splitting of the parentCand, and marking the candidate coding block as unavailable, when the parentCand and the parentCurr are the same block, and when a size of the parentCand is smaller than a threshold, and marking the candidate coding block as available otherwise.

According to an embodiment, a method is provided for marking availability of a candidate coding block for merge estimation of a current coding block within an CTU, comprising the steps of obtaining a parent block, parentCurr, of the current coding block, wherein the current coding block is obtained by splitting of the parentCurr, obtaining a parent block, parentCand, of a candidate coding block, wherein the candidate coding block is obtained by splitting of the parentCand, marking the candidate coding block as unavailable, when the parentCand and the parentCurr are the same block, and when a function of number of QT, TT, and BT splitting operations that are performed to obtain the parentCand block is greater than a threshold, and marking the candidate coding block as available otherwise.

According to an embodiment, a computer-readable non-transitory medium is provided for storing a program, including instructions which when executed on a processor cause the processor to perform the method according to any of the above embodiments.

The motion compensation unit is configured to obtain, e.g. receive, an inter prediction parameter and to perform inter prediction based on or using the inter prediction parameter to obtain an inter prediction block 245. Motion compensation, performed by motion compensation unit (not shown in FIG. 2), may involve fetching or generating the prediction block based on the motion/block vector determined by motion estimation, possibly performing interpolations to sub-pixel precision. Interpolation filtering may generate additional pixel samples from known pixel samples, thus potentially increasing the number of candidate prediction blocks that may be used to code a picture block. Upon receiving the motion vector for the PU of the current picture block, the motion compensation unit 246 may locate the prediction block to which the motion vector points in one of the reference picture lists. Motion compensation unit 246 may also generate syntax elements associated with the blocks and the video slice for use by video decoder 300 in decoding the picture blocks of the video slice.

The intra PU 254 is configured to obtain, e.g. receive, the picture block 203 (current picture block) and one or a plurality of previously reconstructed blocks, e.g. reconstructed neighbor blocks, of the same picture for intra estimation. The encoder 200 may, e.g., be configured to select an intra prediction mode from a plurality of (predetermined) intra prediction modes.

The arithmetic right shift operation is defined as follows.

x>>y Arithmetic right shift of a two's complement integer representation of x by y binary digits. This function is defined only for non-negative integer values of y. Bits shifted into the most significant bits (MSBs) as a result of the right shift have a value equal to the MSB of x prior to the shift operation.

The binary logarithm can be defined as follows.

The binary logarithm log 2 (n) is the power to which the number 2 must be raised to obtain the value n.

If x=log 2(n), then 2x=n.

According to above definitions, the following equality holds:

floor(X/mer_width)=X>log 2_mer_width, where log 2_mer_width is the binary logarithm of mer_width.

Embodiments of the encoder 200 may be configured to select the intra-prediction mode based on an optimization criterion, e.g. minimum residual (e.g. the intra-prediction mode providing the prediction block 255 most similar to the current picture block 203) or minimum rate distortion.

The intra PU 254 is further configured to determine based on intra prediction parameter, e.g. the selected intra prediction mode, the intra prediction block 255. In any case, after selecting an intra prediction mode for a block, the intra PU 254 is also configured to provide intra prediction parameter, i.e. information indicative of the selected intra prediction mode for the block to the entropy encoding unit 270. In one example, the intra PU 254 may be configured to perform any combination of the intra prediction techniques described later.

The entropy encoding unit 270 is configured to apply an entropy encoding algorithm or scheme (e.g. a variable length coding (VLC) scheme, an context adaptive VLC scheme (CALVC), an arithmetic coding scheme, a CABAC, syntax-based context-adaptive binary arithmetic coding (SBAC), probability interval partitioning entropy (PIPE) coding or another entropy encoding methodology or technique) on the quantized residual coefficients 209, inter prediction parameters, intra prediction parameter, and/or loop filter parameters, individually or jointly (or not at all) to obtain encoded picture data 21 which can be output by the output 272, e.g. in the form of an encoded bitstream 21. The encoded bitstream 21 may be transmitted to video decoder 30, or archived for later transmission or retrieval by video decoder 30. The entropy encoding unit 270 can be further configured to entropy encode the other syntax elements for the current video slice being coded.

Other structural variations of the video encoder 200 can be used to encode the video stream. For example, a non-transform based encoder 200 can quantize the residual signal directly without the transform processing unit 206 for certain blocks or frames. In another implementation, an encoder 200 can have the quantization unit 208 and the inverse quantization unit 210 combined into a single unit.

FIG. 3 shows an exemplary video decoder 300 that is configured to implement the techniques of this present application. The video decoder 300 configured to receive encoded picture data (e.g. encoded bitstream) 271, e.g. encoded by encoder 200, to obtain a decoded picture 331. During the decoding process, video decoder 300 receives video data, e.g. an encoded video bitstream that represents picture blocks of an encoded video slice and associated syntax elements, from video encoder 200.

In the example of FIG. 3, the decoder 300 comprises an entropy decoding unit 304, an inverse quantization unit 310, an inverse transform processing unit 312, a reconstruction unit 314 (e.g. a summer 314), a buffer 316, a loop filter 320, a decoded picture buffer 330 and a prediction processing unit 360. The prediction processing unit 360 may include an inter PU344, an intra PU 354, and a mode selection unit 362. Video decoder 300 may, in some examples, perform a decoding pass generally reciprocal to the encoding pass described with respect to video encoder 200 from FIG. 2.

The entropy decoding unit 304 is configured to perform entropy decoding to the encoded picture data 271 to obtain, e.g., quantized coefficients 309 and/or decoded coding parameters (not shown in FIG. 3), e.g. (decoded) any or all of inter prediction parameters, intra prediction parameter, loop filter parameters, and/or other syntax elements. Entropy decoding unit 304 is further configured to forward inter prediction parameters, intra prediction parameter and/or other syntax elements to the prediction processing unit 360. Video decoder 300 may receive the syntax elements at the video slice level and/or the video block level.

The inverse quantization unit 310 may be identical in function to the inverse quantization unit 110, the inverse transform processing unit 312 may be identical in function to the inverse transform processing unit 112, the reconstruction unit 314 may be identical in function reconstruction unit 114, the buffer 316 may be identical in function to the buffer 116, the loop filter 320 may be identical in function to the loop filter 120, and the decoded picture buffer 330 may be identical in function to the decoded picture buffer 130.

The prediction processing unit 360 may comprise an inter PU 344 and an intra PU 354, wherein the inter PU 344 may resemble the inter PU 144 in function, and the intra PU 354 may resemble the intra PU 154 in function. The prediction processing unit 360 are typically configured to perform the block prediction and/or obtain the prediction block 365 from the encoded data 21 and to receive or obtain (explicitly or implicitly) the prediction related parameters and/or the information about the selected prediction mode, e.g. from the entropy decoding unit 304.

When the video slice is coded as an I slice, intra PU 354 of prediction processing unit 360 is configured to generate prediction block 365 for a picture block of the current video slice based on a signaled intra prediction mode and data from previously decoded blocks of the current frame or picture. When the video frame is coded as an inter-coded (i.e., B, or P) slice, inter PU 344 (e.g. motion compensation unit) of prediction processing unit 360 is configured to produce prediction blocks 365 for a video block of the current video slice based on the motion vectors and other syntax elements received from entropy decoding unit 304. For inter prediction, the prediction blocks may be produced from one of the reference pictures within one of the reference picture lists. Video decoder 300 may construct the reference frame lists, List 0 and List 1, using default construction techniques based on reference pictures stored in decoded picture buffer 330.

Prediction processing unit 360 is configured to determine prediction information for a video block of the current video slice by parsing the motion vectors and other syntax elements, and uses the prediction information to produce the prediction blocks for the current video block being decoded. For example, the prediction processing unit 360 uses some of the received syntax elements to determine a prediction mode (e.g., intra or inter prediction) used to code the video blocks of the video slice, an inter prediction slice type (e.g., B slice, P slice, or GPB slice), construction information for one or more of the reference picture lists for the slice, motion vectors for each inter encoded video block of the slice, inter prediction status for each inter coded video block of the slice, and other information to decode the video blocks in the current video slice.

Inverse quantization unit 310 is configured to inverse quantize, i.e., de-quantize, the quantized transform coefficients provided in the bitstream and decoded by entropy decoding unit 304. The inverse quantization process may include use of a QP calculated by video encoder 100 for each video block in the video slice to determine a degree of quantization and, likewise, a degree of inverse quantization that should be applied.

Inverse transform processing unit 312 is configured to apply an inverse transform, e.g., an inverse DCT, an inverse integer transform, or a conceptually similar inverse transform process, to the transform coefficients in order to produce residual blocks in the pixel domain.

The reconstruction unit 314 (e.g. Summer 314) is configured to add the inverse transform block 313 (i.e. reconstructed residual block 313) to the prediction block 365 to obtain a reconstructed block 315 in the sample domain, e.g. by adding the sample values of the reconstructed residual block 313 and the sample values of the prediction block 365.

The loop filter unit 320 (either in the coding loop or after the coding loop) is configured to filter the reconstructed block 315 to obtain a filtered block 321, e.g. to smooth pixel transitions, or otherwise improve the video quality. In one example, the loop filter unit 320 may be configured to perform any combination of the filtering techniques described later. The loop filter unit 320 is intended to represent one or more loop filters such as a de-blocking filter, a SAO filter or other filters, e.g. a bilateral filter or an ALF or a sharpening or smoothing filters or collaborative filters. Although the loop filter unit 320 is shown in FIG. 3 as being an in loop filter, in other configurations, the loop filter unit 320 may be implemented as a post loop filter.

The decoded video blocks 321 in a given frame or picture are then stored in decoded picture buffer 330, which stores reference pictures used for subsequent motion compensation.

The decoder 300 is configured to output the decoded picture 311, e.g. via output 312, for presentation or viewing to a user.

Other variations of the video decoder 300 can be used to decode the compressed bitstream. For example, the decoder 300 can produce the output video stream without the loop filtering unit 320. For example, a non-transform based decoder 300 can inverse-quantize the residual signal directly without the inverse-transform processing unit 312 for certain blocks or frames. In another implementation, the video decoder 300 can have the inverse-quantization unit 310 and the inverse-transform processing unit 312 combined into a single unit.

FIG. 4 is a schematic diagram of a network device 400 (e.g., a coding device) according to an embodiment of the disclosure. The network device 400 is suitable for implementing the disclosed embodiments as described herein. In an embodiment, the network device 400 may be a decoder such as video decoder 300 of FIG. 1A or an encoder such as video encoder 200 of FIG. 1A. In an embodiment, the network device 400 may be one or more components of the video decoder 300 of FIG. 1A or the video encoder 200 of FIG. 1A as described above.

The network device 400 comprises ingress ports 410 and receiver units (Rx) 420 for receiving data, a processor, logic unit, or central processing unit (CPU) 430 to process the data, transmitter units (Tx) 440 and egress ports 450 for transmitting the data, and a memory 460 for storing the data. The network device 400 may also comprise optical-to-electrical (OE) components and electrical-to-optical (EO) components coupled to the ingress ports 410, the Rx 420, the Tx 440, and the egress ports 450 for egress or ingress of optical or electrical signals.

The processor 430 is implemented by hardware and software. The processor 430 may be implemented as one or more CPU chips, cores (e.g., as a multi-core processor), FPGAs, ASICs, and DSPs. The processor 430 is in communication with the ingress ports 410, Rx 420, Tx 440, egress ports 450, and memory 460. The processor 430 comprises a coding module 470. The coding module 470 implements the disclosed embodiments described above. For instance, the coding module 470 implements, processes, prepares, or provides the various coding operations. The inclusion of the coding module 470 therefore provides a substantial improvement to the functionality of the network device 400 and effects a transformation of the network device 400 to a different state. Alternatively, the coding module 470 is implemented as instructions stored in the memory 460 and executed by the processor 430.

The memory 460 comprises one or more disks, tape drives, and solid-state drives and may be used as an overflow data storage device, to store programs when such programs are selected for execution, and to store instructions and data that are read during program execution. The memory 460 may be volatile and/or non-volatile and may be read-only memory (ROM), random access memory (RAM), ternary content-addressable memory (TCAM), and/or static RAM (SRAM).

Figure 5:
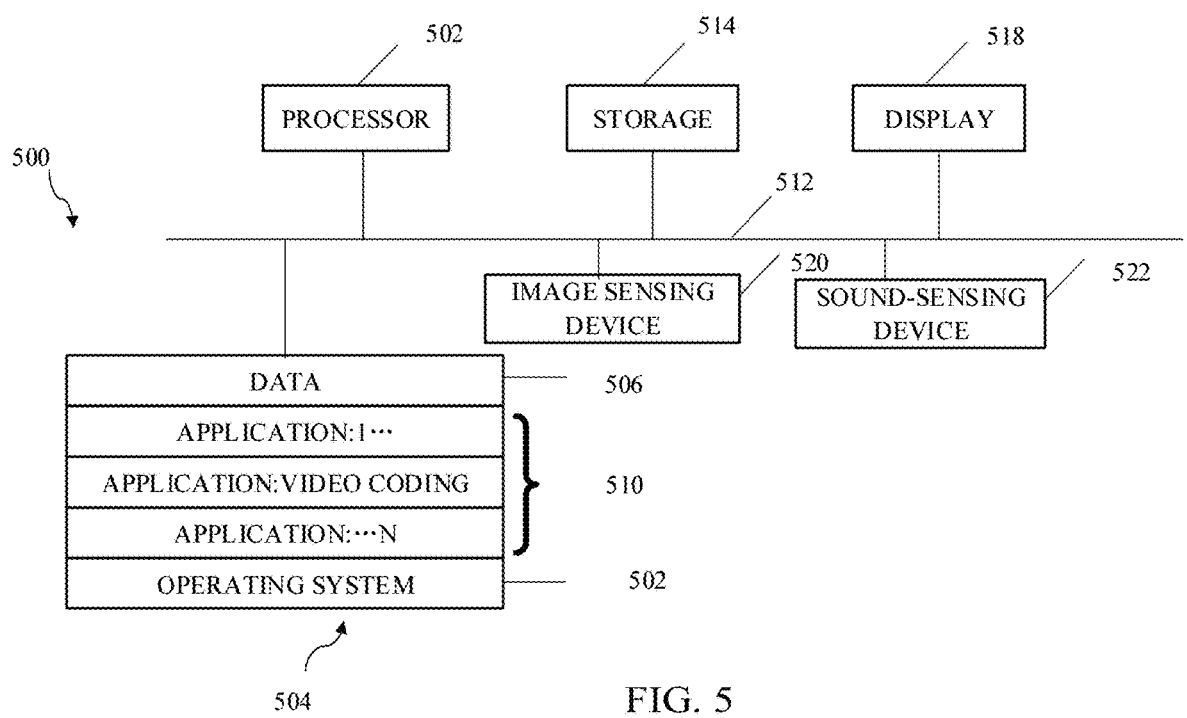
FIG. 5 is a simplified block diagram of an apparatus 500 that may be used as either or both of the source device 12 and the destination device 14 from FIG. 1A according to an exemplary embodiment.

FIG. 5 is a simplified block diagram of an apparatus 500 that may be used as either or both of the source device 12 and the destination device 14 from FIG. 1A according to an exemplary embodiment. The apparatus 500 can implement techniques of this present application. The apparatus 500 can be in the form of a computing system including multiple computing devices, or in the form of a single computing device, for example, a mobile phone, a tablet computer, a laptop computer, a notebook computer, a desktop computer, and the like.

A processor 502 in the apparatus 500 can be a CPU. Alternatively, the processor 502 can be any other type of device, or multiple devices, capable of manipulating or processing information now-existing or hereafter developed. Although the disclosed implementations can be practiced with a single processor as shown, e.g., the processor 502, advantages in speed and efficiency can be achieved using more than one processor.

A memory 504 in the apparatus 500 can be a ROM device or a RAM device in an implementation. Any other suitable type of storage device can be used as the memory 504. The memory 504 can include code and data 506 that is accessed by the processor 502 using a bus 512. The memory 504 can further include an operating system 508 and application programs 510, the application programs 510 including at least one program that permits the processor 502 to perform the methods described here. For example, the application programs 510 can include applications 1 through N, which further include a video coding application that performs the methods described here. The apparatus 500 can also include additional memory in the form of a secondary storage 514, which can, for example, be a memory card used with a mobile computing device. Because the video communication sessions may contain a significant amount of information, they can be stored in whole or in part in the secondary storage 514 and loaded into the memory 504 as needed for processing.

The apparatus 500 can also include one or more output devices, such as a display 518. The display 518 may be, in one example, a touch sensitive display that combines a display with a touch sensitive element that is operable to sense touch inputs. The display 518 can be coupled to the processor 502 via the bus 512. Other output devices that permit a user to program or otherwise use the apparatus 500 can be provided in addition to or as an alternative to the display 518. When the output device is or includes a display, the display can be implemented in various ways, including by a LCD, a CRT display, a plasma display or light emitting diode (LED) display, such as an OLED display.

The apparatus 500 can also include or be in communication with an image-sensing device 520, for example a camera, or any other image-sensing device 520 now existing or hereafter developed that can sense an image such as the image of a user operating the apparatus 500. The image-sensing device 520 can be positioned such that it is directed toward the user operating the apparatus 500. In an example, the position and optical axis of the image-sensing device 520 can be configured such that the field of vision includes an area that is directly adjacent to the display 518 and from which the display 518 is visible.

The apparatus 500 can also include or be in communication with a sound-sensing device 522, for example a microphone, or any other sound-sensing device now existing or hereafter developed that can sense sounds near the apparatus 500. The sound-sensing device 522 can be positioned such that it is directed toward the user operating the apparatus 500 and can be configured to receive sounds, for example, speech or other utterances, made by the user while the user operates the apparatus 500.

Although FIG. 5 depicts the processor 502 and the memory 504 of the apparatus 500 as being integrated into a single unit, other configurations can be utilized. The operations of the processor 502 can be distributed across multiple machines (each machine having one or more of processors) that can be coupled directly or across a local area or other network. The memory 504 can be distributed across multiple machines such as a network-based memory or memory in multiple machines performing the operations of the apparatus 500. Although depicted here as a single bus, the bus 512 of the apparatus 500 can be composed of multiple buses. Further, the secondary storage 514 can be directly coupled to the other components of the apparatus 500 or can be accessed via a network and can comprise a single integrated unit such as a memory card or multiple units such as multiple memory cards. The apparatus 500 can thus be implemented in a wide variety of configurations.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, electrically erasable programmable ROM (EEPROM), CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc, laser disc, optical disc, DVD, floppy disk and BLU-RAY disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an IC or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Summarizing, the present disclosure relates to an apparatus and method for marking availability of a candidate coding block for merge estimation of a current coding block within a CTU. The candidate block may be marked as unavailable if a splitting depth of the current coding block is equal to or larger than a predetermined threshold and a first location of the of the candidate block and a second location of the current block are included in a same MER. Otherwise, the candidate block is marked as available. A candidate block may be marked as unavailable also, when a parent block "parentCurr" of the current block and a parent block "parentCand" of the candidate block, with both parent blocks obtained by splitting, are the same block and when the size of the parentCand is smaller than a threshold. Instead of thresholding the size of the parentCand, the number of partitions to obtain the parentCand, including QT, TT, and BT splittings, the candidate block may be marked unavailable if parentCurr and parentCand are the same block and said number is larger than a predetermined threshold.

Additional embodiments are summarized in the following clauses.

Clause 1. A method of coding implemented by an encoding/decoding device for marking the availability of a potential candidate coding block for merge estimation of a current coding block, comprising obtaining the coordination (x, y)

of a corner of the current coding block, and the coordination of a specific point in the potential candidate coding block, wherein the coordination of the specific point in the potential candidate coding block is (x+a, y+b), a∈(−1,0,1), b∈(−1,0, 1), and a and b are selected depends on the relationship of the relative position between the potential candidate coding block and the current coding block, and for one potential candidate coding block, one value from (−1,0,1) is selected as the a, and one value from the (−1,0,1) is selected as the b, and marking the potential candidate coding block as unavailable, if floor((x+a)/mer_width) is equal to floor(x/mer_width), where the mer_width is the width of a MER, or if floor((y+b)/mer_width) is equal to floor(y/mer_height), where the mer_height is the height of the MER, and the floor function that takes as input a real number X and gives as output the greatest integer less than or equal to X.

Clause 2. The method of clause 1, wherein, the potential candidate coding block neighbors to the corner of the current coding block, and the corner of the current coding block is bottom left corner, and the potential candidate coding block located on where there is left to the current coding block, a=−1, b=0, or the corner of the current coding block is bottom left corner, and the potential candidate coding block located on where there is bottom-left to the current coding block, a=−1, b=1, or the corner of the current coding block is upper left corner, and the potential candidate coding block located on where there is upper-left to the current coding block, a=−1, b=−1, or the corner of the current coding block is upper right corner, and the potential candidate coding block located on where there is upper-right to the current coding block, a=1, b=−1, or the corner of the current coding block is upper right corner, and the potential candidate coding block located on where there is upper to the current coding block, a=0, b=−1.

Clause 3. A method of coding implemented by a encoding/decoding device for marking the availability of a potential candidate coding block for merge estimation of a current coding block, comprising obtaining the coordination (x, y) of a corner of the current coding block, and the coordination of a specific point in the potential candidate coding block, wherein the potential candidate coding block neighbors to the corner of the current coding block and the coordination of the specific point in the potential candidate coding block is (x+a, y+b), a∈(−1,0,1), b∈(−1,0,1), and a and b are not both equal to 0 or 1 and selected depends on the relationship of the relative position between the potential candidate coding block and the current coding block, and for one potential candidate coding block, one value from (−1,0,1) is selected as the a, and one value from the (−1,0,1) is selected as the b, and marking the potential candidate coding block as unavailable, when floor((x+a)/mer_width) is equal to floor(x/mer_width), and floor((y+b)/mer_height)>=floor(y/mer_height), or when floor((y+b)/mer_height) is equal to floor(y/mer_height) and floor((x+a)/mer_width)>=floor(x/mer_width), where the mer_height and mer_width are the height and the width of the MER, and the function that takes as input a real number X and gives as output the greatest integer less than or equal to X.

Clause 4. The method of clause 4, wherein, the corner of the current coding block is bottom left corner, and the potential candidate coding block located on where there is left to the current coding block, a=−1, b=0, or the corner of the current coding block is bottom left corner, and the potential candidate coding block located on where there is bottom-left to the current coding block, a=−1, b=1, or the corner of the current coding block is upper left corner, and the potential candidate coding block located on where there is upper-left to the current coding block, a=−1, b=−1, or the corner of the current coding block is upper right corner, and the potential candidate coding block located on where there is upper-right to the current coding block, a=1, b=−1, or the corner of the current coding block is upper right corner, and the potential candidate coding block located on where there is upper to the current coding block, a=0, b=−1.

Clause 5. A method of coding implemented by a encoding/decoding device for marking the availability of a potential candidate coding block for merge estimation of a current coding block, comprising obtaining the coordination (x, y) of a corner of the current coding block, and the coordination of a specific point in the potential candidate coding block, wherein the coordination of the specific point in the potential candidate coding block is the coordination (x1, y1) of the bottom right corner of the potential candidate coding block or the top-left corner of the potential candidate coding block, and marking the potential candidate coding block as unavailable, if floor(x1/mer_width) is equal to floor(x/mer_width), or floor(y1/mer_height) is equal to floor(y/mer_height), the mer_height and mer_width are the height and the width of the MER, and the function that takes as input a real number X and gives as output the greatest integer less than or equal to X.

Clause 6. A method of coding implemented by a encoding/decoding device for marking the availability of a potential candidate coding block for merge estimation of a current coding block, comprising obtaining the coordination (x, y) of a corner of the current coding block, and the coordination of a specific point in the potential candidate coding block, wherein the coordination of the specific point in the potential candidate coding block is the coordination (x1, y1) of the bottom right corner of the potential candidate coding block or the top-left corner of the potential candidate coding block, and marking the potential candidate coding block as unavailable, if floor(x1/mer_width) is equal to floor(x/mer_width) and floor(y1/mer_height)>=floor(y/mer_height), or floor(y1/mer_height) is equal to floor(y/mer_height) and floor(x1/mer_width)>=floor(x/mer_width), the mer_height and mer_width are the height and the width of the MER, and the function that takes as input a real number X and gives as output the greatest integer less than or equal to X.

Clause 7. A method of coding implemented by a encoding/decoding device for marking the availability of a potential candidate coding block for merge estimation of a current coding block, comprising obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0, 1), and a and b are selected depends on the relationship of the relative position between the potential candidate coding block and the current coding block, and for one potential candidate coding block, one value from (−1,0,1) is selected as the a, and one value from the (−1,0,1) is selected as the b, and marking the potential candidate coding block as unavailable, when the (x, y) and the (x+a, y+b) are located within one MER, and the cqtDepth of the current coding block is greater or equal to a threshold, where the cqtDepth is a parameter that decide the QT partition depth of a CTB to which the current coding block belongs.

Clause 8. The method of clause 7, wherein, the corner of the current coding block is bottom left corner, and the potential candidate coding block located on where there is left to the current coding block, a=−1, b=0, or the corner of the current coding block is bottom left corner, and the potential candidate coding block located on where there is bottom-left to the current coding block, a=−1, b=1, or the corner of the current coding block is upper left corner, and the potential candidate coding block located on where there is upper-left to the current coding block, a=−1, b=−1, or the corner of the current coding block is upper right corner, and the potential candidate coding block located on where there is upper-right to the current coding block, a=1, b=−1, or the corner of the current coding block is upper right corner, and the potential candidate coding block located on where there is upper to the current coding block, a=0, b=−1.

Clause 9. A method of coding implemented by a encoding/decoding device for marking the availability of a potential candidate coding block for merge estimation of a current coding block, comprising obtaining the coordination (x, y) of a corner of the current coding block, and the coordination of a specific point in the potential candidate coding block, wherein the coordination of the specific point in the potential candidate coding block is the coordination (x1, y1) of the top-left corner of the potential candidate coding block, or the bottom-right corner of the potential candidate coding block, and when the (x, y) and the (x1, y1) are located within one MER, and the cqtDepth of the current coding block is greater or equal to a threshold, qtDepthThr, where the cqtDepth is a parameter that decide the QT partition depth of a CTB to which the current coding block belongs.

Clause 10. The method of clause 9, where in the width of MER=(width of CTB)/2qtDepthThr, the height of MER=(height of CTB)/2qtDepthThr.

Clause 11. A device for coding image, which comprises a processer and a memory storing a series of instructions and coupling with the processor, the processor implementing the instructions for performing any of clauses 1 to 10.

Clause 12. An encoding/decoding device for marking the availability of a potential candidate coding block for merge estimation of a current coding block, comprising coordination obtaining module, configured for, obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0,1), and a and b are selected depends on the relationship of the relative position between the potential candidate coding block and the current coding block, and for one potential candidate coding block, one value from (−1, 0,1) is selected as the a, and one value from the (−1,0,1) is selected as the b, and marking module, configured for, marking the potential candidate coding block as unavailable, if floor((x+a)/mer_width) is equal to floor(x/mer_width), where the mer_width is the width of a MER, or floor((y+b)/mer_height) is equal to floor(y/mer_height), where the mer_height is the height of the MER, and the function that takes as input a real number X and gives as output the greatest integer less than or equal to X.

Clause 13. The device of clause 12, wherein, the potential candidate coding block neighbors to the corner of the current coding block, and the corner of the current coding block is bottom left corner, and the potential candidate coding block located on where there is left to the current coding block, a=−1, b=0, or the corner of the current coding block is bottom left corner, and the potential candidate coding block located on where there is bottom-left to the current coding block, a=−1, b=1, or the corner of the current coding block is upper left corner, and the potential candidate coding block located on where there is upper-left to the current coding block, a=−1, b=−1, or the corner of the current coding block is upper right corner, and the potential candidate coding block located on where there is upper-right to the current coding block, a=1, b=−1, or the corner of the current coding block is upper right corner, and the potential candidate coding block located on where there is upper to the current coding block, a=0, b=−1.

Clause 14. An encoding/decoding device for marking the availability of a potential candidate coding block for merge estimation of a current coding block, comprising coordination obtaining module, configured for, obtaining the coordination (x, y) of a corner of the current coding block, and the coordination of a specific point in the potential candidate coding block, wherein the potential candidate coding block neighbors to the corner of the current coding block and the coordination of the specific point in the potential candidate coding block is (x+a, y+b), a∈(−1,0,1), b∈(−1,0,1), and a and b are not both equal to 0 or 1 and selected depends on the relationship of the relative position between the potential candidate coding block and the current coding block, and for one potential candidate coding block, one value from (−1, 0,1) is selected as the a, and one value from the (−1,0,1) is selected as the b, and marking module, configured for, marking the potential candidate coding block as unavailable, when floor((x+a)/mer_width) is equal to floor(x/mer_width) and floor ((y+b)/mer_height)>=floor(y/mer_height), or floor ((y+b)/mer_height) is equal to floor(y/mer_height) and floor ((x+a)/mer_width)>=floor(x/mer_width), where the mer_height and mer_width are the height and the width of the MER, and the function that takes as input a real number X and gives as output the greatest integer less than or equal to X and when where the mer_height is the height of the MER.

Clause 15. The device of clause 14, wherein, the corner of the current coding block is bottom left corner, and the potential candidate coding block located on where there is left to the current coding block, a=−1, b=0, or the corner of the current coding block is bottom left corner, and the potential candidate coding block located on where there is bottom-left to the current coding block, a=−1, b=1, or the corner of the current coding block is upper left corner, and the potential candidate coding block located on where there is upper-left to the current coding block, a=−1, b=−1, or the corner of the current coding block is upper right corner, and the potential candidate coding block located on where there is upper-right to the current coding block, a=1, b=−1, or the corner of the current coding block is upper right corner, and the potential candidate coding block located on where there is upper to the current coding block, a=0, b=−1.

Clause 16. An encoding/decoding device for marking the availability of a potential candidate coding block for merge estimation of a current coding block, comprising coordination obtaining module, configured for, obtaining the coordination (x, y) of a corner of the current coding block, and the coordination of a specific point in the potential candidate coding block, wherein the coordination of the specific point in the potential candidate coding block is the coordination (x1, y1) of the bottom right corner of the potential candidate coding block or the top-left corner of the potential candidate coding block, and marking module, configured for, marking the potential candidate coding block as unavailable, if floor (x1/mer_width) is equal to floor(x/mer_width) and floor(y1/mer_height)>=floor(y/mer_height), or floor(y1/mer_height) is equal to floor(y/mer_height) and floor (x1/mer_width)>=floor(x/mer_width), where the mer_width and mer_height are the width and the height of a MER, and the function that takes as input a real number X and gives as output the greatest integer less than or equal to X.

Clause 17. An encoding/decoding device for marking the availability of a potential candidate coding block for merge estimation of a current coding block, comprising obtaining the coordination (x, y) of a corner of the current coding block, and the coordination of a specific point in the potential candidate coding block, wherein the coordination of the specific point in the potential candidate coding block is the coordination (x1, y1) of the bottom right corner of the potential candidate coding block or the top-left corner of the potential candidate coding block, and marking module, configured for, marking the potential candidate coding block as unavailable, if floor(x1/mer_width) is equal to floor(x/mer_width) and floor((y+b)/mer_height)>=floor(y/mer_height), or floor((y+b)/mer_height) is equal to floor(y/mer_height) and floor ((x+a)/mer_width)>=floor(x/mer_width), where the mer_width and mer_height are the width and the height of a MER, and the function that takes as input a real number X and gives as output the greatest integer less than or equal to X.

Clause 18. An encoding/decoding device for marking the availability of a potential candidate coding block for merge estimation of a current coding block, comprising coordination obtaining module, configured for, obtaining the coordination (x, y) of a corner of the current coding block, and the coordination of a specific point in the potential candidate coding block, wherein the coordination of the specific point in the potential candidate coding block is (x+a, y+b), a∈(−1,0,1), b∈(−1,0,1), and a and b are selected depends on the relationship of the relative position between the potential candidate coding block and the current coding block, and for one potential candidate coding block, one value from (−1, 0,1) is selected as the a, and one value from the (−1,0,1) is selected as the b, and marking module, configured for, marking the potential candidate coding block as unavailable, when the (x, y) and the (x+a, y+b) are located within one MER, and the cqtDepth of the current coding block is greater or equal to a threshold, where the cqtDepth is a parameter that decide the QT partition depth of a CTB to which the current coding block belongs.

Clause 19. The device of clause 18, wherein, the corner of the current coding block is bottom left corner, and the potential candidate coding block located on where there is left to the current coding block, a=−1, b=0, or the corner of the current coding block is bottom left corner, and the potential candidate coding block located on where there is bottom-left to the current coding block, a=−1, b=1, or the corner of the current coding block is upper left corner, and the potential candidate coding block located on where there is upper-left to the current coding block, a=−1, b=−1, or the corner of the current coding block is upper right corner, and the potential candidate coding block located on where there is upper-right to the current coding block, a=1, b=−1, or the corner of the current coding block is upper right corner, and the potential candidate coding block located on where there is upper to the current coding block, a=0, b=−1.

Clause 20. An encoding/decoding device for marking the availability of a potential candidate coding block for merge estimation of a current coding block, comprising coordination obtaining module, configured for, obtaining the coordination (x, y) of a corner of the current coding block, and the coordination of a specific point in the potential candidate coding block, wherein the coordination of the specific point in the potential candidate coding block is the coordination (x1, y1) of the top-left corner of the potential candidate coding block, or the bottom-right corner of the potential candidate coding block, and marking module, configured for, when the (x, y) and the (x1, y1) are located within one MER, and the cqtDepth of the current coding block is greater or equal to a threshold, qtDepthThr, where the cqtDepth is a parameter that decide the QT partition depth of a CTB to which the current coding block belongs.

Clause 21. The device of clause 20, where in the width of MER=(width of CTB)/2qtDepthThr, the height of MER=(height of CTB)/2qtDepthThr.

Clause 22. A method of coding implemented by an encoding/decoding device for marking the availability of a potential candidate coding block for merge estimation of a current coding block, comprising obtaining the coordination of a specific point in the potential candidate coding block, and the coordination of the left-top pixel of the current coding block, determining if the coordination of the specific point in the potential candidate coding block is located within a MER where the top-left pixel of the current coding block is located, by comparing the coordination of a specific point in the potential candidate coding block and the coordination of the left-top pixel of the current coding block, wherein the coordination is consisting of horizontal axis directing to right hand direction and labelled as X and a vertical axis directing to gravity direction and labelled as Y, the coordination of the specific point in the potential candidate coding block is indicated as (X2, Y2), and the coordination of the top-left pixel of the current coding block is indicated as (X, Y), and if the coordination of the specific point in the potential candidate coding block is located within the MER, marking the potential candidate coding block as unavailable.

Clause 23. The method of clause 22, wherein, the specific point in the potential candidate coding block is the bottom-right pixel of the potential candidate coding block, and the determining if the coordination of the specific point in the potential candidate coding block is located within the MER is performed on any of the following rules if [X−1, Y] and [X, Y] are in the same MER, and if X2<X and Y2>=Y, the potential candidate coding block is set unavailable, if [X, Y−1] and [X, Y] are in the same MER, and if Y2<Y and X2>=X, the potential candidate coding block is set unavailable, and if [X−1, Y−1] and [X, Y] are in the same MER, the potential candidate coding block is set unavailable.

Clause 24. The method of clause 22, wherein, the specific point in the potential candidate coding block is the bottom-right pixel of the potential candidate coding block, and the determining if the coordination of the specific point in the potential candidate coding block is located within the MER is performed on any of the following rules if floor(X2/mer_width) is equal to floor(X/mer_width) and floor(Y2/mer_height)>=floor(Y/mer_height), the potential candidate coding block is set unavailable, and if floor(Y2/mer_height) is equal to floor(Y/mer_height) and floor(X2/mer_width)> = floor(X/mer_width), the potential candidate coding block is set unavailable, where the mer_height and mer_width are the height and the width of the MER, and the function that takes as input a real number X and gives as output the greatest integer less than or equal to X.

Clause 25. A method of coding implemented by an encoding/decoding device for marking the availability of a potential candidate coding block for merge estimation of a current coding block, comprising obtaining the coordination (X, Y) of a corner of the current coding block, and the coordination (X2, Y2) of a specific point in the potential candidate coding block, wherein the coordination of the specific point in the potential candidate coding block is bottom right corner of the potential candidate coding block, and marking the potential candidate coding block as unavailable if any of the following condition is satisfied, if floor (X2/mer_width) is equal to floor(X/mer_width) and floor (Y2/mer_height)>=floor(Y/mer_height), the potential candidate coding block is set unavailable, and if floor(Y2/mer_height) is equal to floor(Y/mer_height) and floor(X2/mer_width)>=floor(X/mer_width), the potential candidate coding block is set unavailable, where the mer_height and mer_width are the height and the width of the MER, and the function that takes as input a real number X and gives as output the greatest integer less than or equal to X.

Clause 26. A method of coding implemented by an encoding/decoding device for marking the availability of a potential candidate coding block for merge estimation of a current coding block, comprising obtaining the coordination (X, Y) of a corner of the current coding block, and the coordination (X2, Y2) of a specific point in the potential candidate coding block, wherein the coordination of the specific point in the potential candidate coding block is bottom right corner of the potential candidate coding block, and marking the potential candidate coding block as unavailable if any of the following condition is satisfied, if X2/mer_width is equal to X/mer_width and Y2/mer_height>=Y/mer_height, the potential candidate coding block is set unavailable, and if Y2/mer_height is equal to Y/mer_height and X2/mer_width>=X/mer_width, the potential candidate coding block is set unavailable, where the mer_height and mer_width are the height and the width of the MER.

Clause 27. A method of coding implemented by an encoding/decoding device for marking the availability of a potential candidate coding block for merge estimation of a current coding block, comprising obtaining the coordination (X, Y) of a corner of the current coding block, and the coordination (X2, Y2) of a specific point in the potential candidate coding block, wherein the coordination of the specific point in the potential candidate coding block is bottom right corner of the potential candidate coding block, and marking the potential candidate coding block as unavailable if any of the following condition is satisfied, if X2>>log 2_mer_width is equal to X>>log 2_mer_width and Y2>>log 2_mer_height>=Y>>log 2_mer_height, and if Y2>>log 2_mer_height is equal to Y>>log 2_mer_height and X2>>log 2_mer_width>=X>>log 2_mer_width, where the log 2_mer_height and log 2_mer_width are the binary logarithm of the height and the width of the MER and >> specifies the arithmetic right shift operation.

Clause 28. A method of coding implemented by an encoding/decoding device for marking the availability of a potential candidate coding block for merge estimation of a current coding block, comprising obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand, and marking the potential candidate coding block as unavailable, when parentCand and parentCurr are the same block, and when a size of the parentCand (In an example, the size of the parentCand is obtained according to width multiplied by height of the parentCand) is smaller than a threshold.

Clause 29. A method according to clause 28, wherein the motion information of the candidate coding block is not used in the prediction of the current block when the potential candidate coding block is marked unavailable.

Clause 30. A method according to clause 28, wherein the motion information of the candidate coding block is not used in the prediction of the current block when the current block is predicted using merge prediction mode and when the potential candidate coding block is marked unavailable.

Clause 31. A method of coding implemented by an encoding/decoding device for marking the availability of a potential candidate coding block for merge estimation of a current coding block, comprising obtaining a parent block of the current coding block (denoted as parentCurr), and a parent block of a candidate coding block (denoted as parentCand), wherein the current coding block is obtained by splitting (in an example, the splitting process could be performed one or multiple times, for example, according to a recursive process) of the parentCurr, the candidate coding block is obtained by splitting (in an example, the splitting process could be performed one or multiple times, for example, according to a recursive process) of the parentCand, and marking the potential candidate coding block as unavailable, when parentCand and parentCurr are the same block, and when a function of number of QT, TT and BT splitting operations that are performed to obtain parentCand block is greater than a threshold In an example, the function of splitting operations to obtain parentCand block greater than a threshold is implemented by qtDepth+K×mttDepth>Thr, the qtDepth indicates the number of QT split operations that had been performed to obtain parentCand, mttDepth indicates the number of binary split and ternary split operations that had been performed to obtain parentCand, Thr is the threshold. In a second example, the function of splitting operations to obtain parentCand block greater than a threshold is implemented by number of "quadtree splitting+K×number of BT splitting+M×number of TT splitting>Thr", Thr is the threshold.

Clause 32. A method according to clause 31, K is equal to 2.

Clause 33. A method according to clause 31, K is a positive integer number or zero.

Clause 34. A method according to any of the clauses 28, 29, 30, 31, 32 and 33, Thr is included in the bitstream and has a positive integer value or zero.

Clause 35. An encoder/decoder comprising processing circuitry for carrying out the method according to any one of clauses 25 to 34.

Clause 36. A computer program product comprising a program code for performing the method according to any one of clauses 25 to 34.

Clause 37. An encoder/decoder, comprising one or more processors, and a non-transitory computer-readable storage medium coupled to the processors and storing programming for execution by the processors, wherein the programming, when executed by the processors, configures the decoder to carry out the method according to any one of clauses 25 to 34.

The invention claimed is:

1. An apparatus comprising:
a processor; and
a memory coupled to the processor and configured to store instructions that, when executed by the processor, cause the apparatus to be configured to:
mark a candidate coding block as unavailable when a splitting depth of a current coding block is equal to or larger than a predetermined threshold and when a first location of the candidate coding block and a second location of the current coding block are within a same merge estimation region (MER); and
mark the candidate coding block as available when the splitting depth is less than the predetermined threshold and when the first location and the second location are not within the same MER.

2. The apparatus of claim 1, wherein the splitting depth corresponds to a quad-tree partition depth of the current coding block.

3. The apparatus of claim 1, wherein the instructions further cause the apparatus to be configured to compute a width and a height of the MER belonging to a fixed MER grid according to the following equations:

MER-width=(width of CTU)/2qtDepthThr; and

MER-height=(height of CTU)/2qtDepthThr, wherein qtDepthThr corresponds to the predetermined threshold.

4. The apparatus of claim 1, wherein the instructions further cause the apparatus to be configured to:
obtain, as the second location, a first coordinate and a second coordinate, wherein the first coordinate and the second coordinate represent a corner of the current coding block;
obtain, as the first location, a third coordinate and a fourth coordinate of a specific point in the candidate coding block, wherein the third coordinate is a first distance from the first coordinate, wherein the fourth coordinate is a second distance from the second coordinate, wherein the first distance is one of −1 pixels, 0 pixels, or 1 pixel, wherein the second distance is one of −1 pixels, 0 pixels, or 1 pixel, and wherein the first distance and the second distance are based on a relationship of a relative position between the specific point and the corner;
select, for the candidate coding block, a first value from the first set as the first distance; and
select, for the candidate coding block, a second value from the second set as the second distance.

5. The apparatus of claim 4, wherein the corner is a bottom-left corner, wherein the specific point is on a left side of the current coding block, wherein the first distance is equal to −1 pixels, and wherein the second distance is equal to 0 pixels.

6. The apparatus of claim 4, wherein the corner is a bottom-left corner, wherein the specific point is on a bottom-left side of the current coding block, wherein the first distance is equal to −1 pixels, and wherein the second distance is equal to 1 pixel.

7. The apparatus of claim 4, wherein the corner is an upper-left corner, wherein the specific point is on an upper-left side of the current coding block, wherein the first distance is equal to −1 pixels, and wherein the second distance is equal to −1 pixels.

8. The apparatus of claim 4, wherein the corner is an upper-right corner, wherein the specific point is on an upper-right side of the current coding block, wherein the first distance is equal to 1 pixel, and wherein the second distance is equal to −1 pixels.

9. The apparatus of claim 4, wherein the corner is an upper-right corner, wherein the specific point is on an upper side of the current coding block, wherein the first distance is equal to 0 pixels, and wherein the second distance is equal to −1 pixels.

10. The apparatus of claim 1, wherein the instructions further cause the apparatus to be configured to:
obtain, as the second location, first coordinates of a corner of the current coding block; and
obtain, as the first location, second coordinates of a specific point in the candidate coding block, wherein the specific point is a top-left corner or a bottom-right corner of the candidate coding block.

11. The apparatus of claim 10, wherein the corner of the candidate coding block is the top-left corner and the specific point is the top-left corner.

12. An apparatus comprising:
a processor; and
a memory coupled to the processor and configured to store instructions that, when executed by the processor, cause the apparatus to be configured to:
obtain a first parent block of a current coding block;
obtain the current coding block is from splitting the first parent block;
obtain a second parent block of a candidate coding block;
obtain the candidate coding block by splitting the first parent block and splitting the second parent block;
mark the candidate coding block as unavailable when the second parent block and the first parent block are a same block and when a size of the second parent block is smaller than a threshold; and
mark the candidate coding block as available when the second parent block and the first parent block are the same block and when the size of the second parent block is larger than the threshold.

13. The apparatus of claim 12, wherein the apparatus does not predict the current coding block using motion information of the candidate coding block when the candidate coding block is marked unavailable.

14. The apparatus of claim 12, wherein the apparatus does not predict the current coding block using motion information of the candidate coding block, wherein the current coding block is predicted using a merge prediction mode, and wherein the candidate coding block is marked unavailable.

15. An apparatus comprising:
a processor; and
a memory coupled to the processor and configured to store instructions that, when executed by the processor, cause the apparatus to be configured to:
obtain a first parent block of a current coding block;
obtain the current coding block is from splitting the first parent block;
obtain a second parent block of a candidate coding block;
obtain the candidate coding block from splitting the second parent block;
mark the candidate coding block as unavailable when the second parent block and the first parent block are a same block and when a number of quadtree, ternary-tree, and binary-tree splitting operations to obtain the second parent block is greater than a threshold; and
mark the candidate coding block as available when the second parent block and the first parent block are the same block and when the size of the second parent block is larger than the threshold.

16. The apparatus of claim 15, wherein the instructions further cause the apparatus to be configured to:
derive motion vector candidates (MVCs) from the candidate coding blocks marked as available; and
refer to the MVCs to code the current coding block.

17. An encoder comprising:
a processor; and
a memory coupled to the processor and configured to store instructions that, when executed by the processor, cause the encoder to be configured to:

mark a candidate coding block as unavailable when a splitting depth of a current coding block is equal to or larger than a predetermined threshold and when a first location of the candidate coding block and a second location of the current coding block are within a same merge estimation region (MER); and mark the candidate coding block as available when the splitting depth is less than the predetermined threshold and when the first location and the second location are not within the same MER;

determine a prediction of the current coding block according to at least one prediction candidate of the prediction candidates from a list of prediction candidates; and encode the current coding block using the prediction.

18. The encoder of claim 17, wherein the list is a list of motion vectors (MVs).

19. A decoder comprising:
a processor; and
a memory coupled to the processor and configured to store instructions that, when executed by the processor, cause the decoder to be configured to:
mark a candidate coding block as unavailable when a splitting depth of a current coding block is equal to or larger than a predetermined threshold and when a first location of the candidate coding block and a second location of the current coding block are within a same merge estimation region (MER); and mark the candidate coding block as available when the splitting depth is less than the predetermined threshold and when the first location and the second location are not within the same MER;

determine a prediction of the current coding block according to at least one prediction candidate of the prediction candidates from a list of prediction candidates; and decode the current coding block using the prediction.

20. A method comprising:
marking a candidate coding block as unavailable when a splitting depth of a current coding block is equal to or larger than a predetermined threshold and when a first location of the candidate coding block and a second location of the current coding block are within a same merge estimation region (MER); and marking the candidate coding block as available when the splitting depth is less than the predetermined threshold and when the first location and the second location are not within the same MER.

* * * * *